United States Patent
Nakajima

(10) Patent No.: US 7,025,511 B2
(45) Date of Patent: Apr. 11, 2006

(54) MICRO LENS ARRAY AND ITS MANUFACTURE

(75) Inventor: Toshihiro Nakajima, Hamamatsu (JP)

(73) Assignee: Yamaha Corporation, Shizuoka-ken (JP)

( * ) Notice: Subject to any disclaimer, the term of this patent is extended or adjusted under 35 U.S.C. 154(b) by 110 days.

(21) Appl. No.: 10/678,067

(22) Filed: Oct. 6, 2003

(65) Prior Publication Data

US 2004/0067015 A1 Apr. 8, 2004

(30) Foreign Application Priority Data

| Oct. 4, 2002 | (JP) | ............................................. 2002-292525 |
| Oct. 21, 2002 | (JP) | ............................................. 2002-305996 |
| May 2, 2003 | (JP) | ............................................. 2003-127225 |

(51) Int. Cl.
*G02B 6/36* (2006.01)

(52) U.S. Cl. .................... 385/93; 385/88; 385/92; 385/31; 385/33; 385/52

(58) Field of Classification Search ............ 385/31, 385/33, 34, 52, 88, 92, 93, 94
See application file for complete search history.

(56) References Cited

U.S. PATENT DOCUMENTS

| 5,627,923 | A | * | 5/1997 | Kakizaki | ....................... 385/14 |
| 6,016,185 | A | * | 1/2000 | Cullman et al. | ............... 355/52 |
| 6,587,274 | B1 | * | 7/2003 | Border et al. | ................ 359/619 |
| 6,594,084 | B1 | * | 7/2003 | Border et al. | ................ 359/619 |
| 6,736,553 | B1 | * | 5/2004 | Stiehl et al. | .................. 385/89 |
| 2002/0181854 | A1 | * | 12/2002 | Steinberg et al. | ............. 385/20 |
| 2003/0117482 | A1 | * | 6/2003 | Border et al. | ............... 347/224 |
| 2003/0201462 | A1 | * | 10/2003 | Pommer et al. | ............ 257/200 |

FOREIGN PATENT DOCUMENTS

| JP | 8-5863 | 1/1996 | ............... 385/31 X |
| JP | 9-90162 | 4/1997 | ............... 385/31 X |
| JP | 2000-266965 | 9/2000 | |
| JP | 2000-304966 | 11/2000 | |

OTHER PUBLICATIONS

Copy of The People's Republic of China Office Action dated Dec. 17, 2004 (and English translation of same).

* cited by examiner

*Primary Examiner*—Brian M. Healy
(74) *Attorney, Agent, or Firm*—Dickstein, Shapiro, Morin & Oshinsky, LLP.

(57) ABSTRACT

A micro lens array has a quartz substrate and a coupling plate made of plated metal and mounted on the substrate. On one principal surface of the substrate, lenses and fitting pins made of plated metal are formed. The coupling plate has a transparent window which allows light from the lenses to pass therethrough and guide pin insertion holes gradually increasing the size from one principal surface toward the other principal surface. A taper of an opening end of each guide pin insertion hole defined by a plated layer can be formed by forming a plating seed layer and a plating area defining pillar on the substrate, with the plating seed layer being spaced apart from the pillar by a predetermined distance.

33 Claims, 39 Drawing Sheets

MICRO LENS ARRAY AND ITS MANUFACTURE

CROSS REFERENCE TO RELATED APPLICATION

This application is based on and claims priority of Japanese Patent Applications No. 2002-292525 filed on Oct. 4, 2002, No. 2002-305996 filed on Oct. 21, 2002 and No. 2003-127225 filed on May 2, 2003, the entire contents of which are incorporated herein by reference.

BACKGROUND OF THE INVENTION

A) Field of the Invention

The present invention relates to a micro lens array suitable for coupling to an optical component such as an optical fiber array and to a method of manufacturing such a micro lens array.

B) Description of the Related Art

A conventional micro lens array such as shown in FIG. 102 is known. For example, refer to Japanese Patent Laid-open Publication No. 9-90162. FIGS. 99 to 101 are diagrams illustrating a method of manufacturing a micro lens array.

In a process shown in FIG. 99, on one principal surface of a silicon substrate 3 having a thickness of 500 μm, a quartz glass layer 4 having a thickness of 50 μm is formed and thereafter resist layers 5a to 5c corresponding to a desired lens pattern are formed on the quartz glass layer 4 and shaped in a convex spherical shape by photolithography and heat treatment.

In a process shown in FIG. 100, the resist layers 5a to 5c and quartz glass layer 4 are etched by reactive ion etching (RIE) to transfer the resist pattern of the resist layers 5a to 5c to the upper surface layer of the quartz glass layer 4 to form convex lenses 4a to 4c corresponding to the resist layers 5a to 5c. The diameter of each convex lens may be 60 μm. Thereafter, on the other principal surface of the substrate 3, a resist layer 6 having holes 6a to 6c for forming contact holes are formed by photolithography.

In a process shown in FIG. 101, by using the resist layer 6 as a mask, contact holes 3a to 3c facing the convex lenses 4a to 4c are formed in the silicon substrate 3 by dry etching. Each contact hole may have a depth of 500 μm and a diameter of 125 μm (corresponding to the diameter of an optical fiber).

FIG. 102 shows an optical fiber 7 inserted into the contact hole 3a of the micro lens array shown in FIG. 101. Since the depth of the contact hole 3a is twice or more the diameter of the contact hole 3a, the optical fiber 7 can be held reliably in the contact hole 3a. The center axis of the convex lens 4a is coincident with the center axis of the contact hole 3a, and the focal length of the convex lens 4a is coincident with the distance between the apex of the convex lens 4a and the bottom of the contact hole 3a. Therefore, if the optical fiber 7 is inserted into the contact hole 3a so as to make the front end of the optical fiber 7 contact the bottom of the contact hole 3a, the focal point of the convex lens 4a can be theoretically made coincident with the center point of the front end of the optical fiber.

According to the above-described prior art, in the processes shown in FIGS. 100 and 101, it is practically difficult to form the contact hole 3a so as to match the center axis and focal length of the convex lens 4a. In order to properly collimate light from the optical fiber 7 at the convex lens 4a, it is necessary to adjust the position of the optical fiber by entering light into the fiber each time each fiber is inserted into the contact hole. This is a time-consuming and cumbersome work.

Since the micro lens array with optical fiber contact holes is formed by working a composite substrate made of the silicon substrate 3 formed with the quartz glass layer 4, it is not possible to form convex lenses on a surface of the quartz glass layer 4 opposite to the surface of the quartz glass layer 4 formed with the convex lenses 4a to 4c or to perform oblique polishing of the opposite surface. In other words, it is necessary to use both surfaces of the quartz glass layer 4 in order to form a micro lens array of a both-side convex lens type or a micro lens array having a polished surface for suppressing reflection return light. In this case, the optical fiber contact holes cannot be formed by using the silicon substrate 3 and coupling to an optical fiber array is impossible.

SUMMARY OF THE INVENTION

An object of this invention is to provide a novel micro lens array and its manufacture method capable of coupling the micro lens array to an optical device such as an optical fiber array easily and at a high precision.

According to one aspect of the present invention, there is provided a micro lens array comprising: a transparent substrate having a plurality of lenses and a plurality of fitting pins made of metal, respectively formed on one principal surface of the substrate; and a coupling plate made of metal and having a stacking region to be stacked on the one principal surface and a non-stacking region extending continuously with the stacking region and not to be stacked on the one principal surface, the stacking region having a transparent window corresponding to the plurality of lenses and a plurality of fitting holes corresponding to the plurality of fitting pins, the non-stacking region having a plurality of guide pin insertion holes, and the coupling plate being mounted on the substrate by fitting the plurality of fitting pins in the plurality of fitting holes in a state that the stacking region is stacked upon the one principal surface.

According to this micro lens array of the invention, it is possible to form a plurality of lenses and metal fitting pins by a thin film forming process on the one principal surface of the transparent substrate with ease and at high precision. The coupling plate having a plurality of fitting holes and guide pin insertion holes can be formed by a thin film forming process easily and at high precision. The fitting precision of the fitting pin relative to the fitting hole can be improved and the fitting precision of the guide pin relative to the guide pin insertion hole can be improved. By inserting a plurality of guide pins of an optical device such as a optical fiber array into the guide pin insertion holes of the micro lens array of the invention, the coupling between the optical device and micro lens array can be achieved with ease and at high precision.

In the micro lens array of this invention, the fitting hole and/or guide pin insertion hole may be formed gradually increasing the size toward a principal surface of the coupling plate on the side of the substrate. The size means a diameter, a side length or the like. It is therefore easy to insert the fitting pin into the fitting hole or to insert the guide pin into the guide pin insertion hole. The fitting hole and/or guide pin insertion hole can be formed as small as possible while precise fitting is ensured.

According to another aspect of the present invention, there is provided a method of manufacturing a micro lens array comprising steps of: preparing a transparent substrate and a coupling plate, the transparent substrate having a plurality of lenses and a plurality of fitting pins made of plated metal, respectively formed on one principal surface of the substrate, and the coupling plate made of plated metal and having a stacking region to be stacked on the one principal surface and a non-stacking region extending continuously with the stacking region and not to be stacked on the one principal surface, the stacking region having a transparent window corresponding to the plurality of lenses and a plurality of fitting holes corresponding to the plurality of fitting pins, the non-stacking region having a plurality of guide pin insertion holes; and mounting the coupling plate on the substrate by fitting the plurality of fitting pins in the plurality of fitting holes in a state that the stacking region is stacked upon the one principal surface.

According to this micro lens array manufacture method of the invention, a micro lens array can be formed with ease and at high precision by using a thin film forming process including a plating process and the like.

As above, the lens forming surface of the substrate is formed with a plurality of metal fitting pins and the metal coupling plate is provided with the light transmission window corresponding to the lenses on the substrate, the fitting holes corresponding to the fitting pins and the guide pin insertion holes. The fitting pins are fitted in the fitting holes to mount the coupling plate on the substrate and form the micro lens array. Accordingly, by inserting a plurality of guide pins of an optical device such as an optical fiber array into the guide pin insertion holes of the micro lens array, the coupling between the optical device and micro lens array can be achieved with ease and at high precision. The micro lens array of the invention can be formed with ease and at high precision by using a thin film forming process including a plating process and the like.

According to another aspect of the present invention, there is provided a micro lens array comprising: a transparent substrate having a plurality of lenses formed on one principal surface of the substrate; and a coupling plate made of metal and having a stacking region to be stacked on the one principal surface and a non-stacking region extending continuously with the stacking region and not to be stacked on the one principal surface, the stacking region having a transparent window corresponding to the plurality of lenses and the non-stacking region having a plurality of guide pin insertion holes.

According to this micro lens array, a plurality of lenses can be formed on the one principal surface of a transparent substrate by a thin film forming process with ease and at high precision. The coupling plate having the light transmission window and a plurality of guide pin insertion holes can be formed by a thin film forming process including a plating process and the like with ease and at high precision. The position precision of the guide pin insertion holes relative to the lenses can be improved and the fitting precision of the guide pins relative to the guide pin insertion holes can be improved. Accordingly, by inserting a plurality of guide pins inserted into the guide pin insertion holes of the micro lens array into guide pin insertion grooves (or holes) of an optical device such as an optical fiber array, the coupling between the optical device and micro lens array can be achieved with ease and at high precision.

In this micro lens array, the plurality of guide pin insertion holes may be formed so as to gradually increase the size toward the principal surface of the coupling plate on the side opposite to the substrate. The size means a diameter, a side length or the like. It is easy to insert the guide pin into the guide pin insertion hole. The guide pin insertion hole can be formed as small as possible while precise fitting is ensured.

In this micro lens array, the plurality of lenses may be disposed in line in such a manner that a line interconnecting centers of the plurality of lenses is a straight line on the one principal surface, another principal surface of the substrate may be formed with a slanted plane for directing light incident upon the plurality of lenses and reflected therefrom in a direction different from an array direction of the plurality of lenses; and the plurality of guide pin insertion holes may be formed on both sides of the lens array including the plurality of lenses, centers of the plurality of guide pin insertion holes being set to positions displaced from the straight line by an amount corresponding to a displacement of an optical axis from each lens center caused by the slanted plane. In this structure, by simply inserting the guide pins inserted in to the guide pin insertion holes of the micro lens array into guide pin insertion grooves (or holes) of the optical device such as an optical fiber aligned with the optical axis of the optical device, a proper optical path can be easily established along the lens center.

According to another aspect of the present invention, there is provided a method of manufacturing a micro lens array comprising steps of: preparing a transparent substrate formed with a plurality of lenses on one principal surface of the substrate; forming a plating seed film on the one principal surface of the substrate, the plating seed film surrounding the plurality of lens; forming a coupling plate made of metal on the plating seed film by selective plating, the coupling plate having a transparent window corresponding to the plurality of lenses and a plurality of guide pin insertion holes; and removing the substrate stacked on the plurality of guide pin insertion holes so as to make open the plurality of guide pin insertion holes on a side of the substrate.

According to this micro lens array manufacture method, the micro lens array can be formed with ease and at high precision by using a thin film forming process including a plating process and the like.

According to another aspect of the present invention, there is provided a micro lens array comprising: a transparent substrate having a plurality of lenses formed on one principal surface of the substrate; and a positioning member coupled to the substrate and having a plurality of guide pin insertion holes.

According to this micro lens array, lenses and guide pin insertion holes can be formed on and through a transparent substrate with ease and at high precision by using a thin film forming process. The position precision of the guide pin insertion holes relative to the lenses can be improved and the fitting precision of the guide pins relative to the guide pin insertion holes can be improved. Accordingly, by inserting a plurality of guide pins inserted into the guide pin insertion holes of the micro lens array into guide pin insertion grooves (or holes) of an optical device such as an optical fiber array, the coupling between the optical device and micro lens array can be achieved with ease and at high precision.

In this micro lens array, the plurality of guide pin insertion holes may be formed to gradually increase the size toward the one principal surface of the substrate. Similarly, the guide pins can be easily inserted into the guide pin insertion holes and precise fitting of the guide pins relative to the guide pin insertion holes is ensured.

In this micro lens array, the plurality of lenses may be disposed in line in such a manner that a line interconnecting centers of the plurality of lenses is a straight line on the one principal surface; another principal surface of the substrate may be formed with a slanted plane for directing light incident upon the plurality of lenses and reflected therefrom in a direction different from an array direction of the plurality of lenses; and the plurality of guide pin insertion holes may be formed on both sides of the lens array including the plurality of lenses, centers of the plurality of guide pin insertion holes being set to positions displaced from the straight line by an amount corresponding to a displacement of an optical axis from each lens center caused by the slanted plane. Similarly, a proper optical path can be easily established along the lens center by utilizing the guide pins inserted into the guide pin insertion holes.

According to another aspect of the present invention, there is provided a method of manufacturing a micro lens array comprising steps of: preparing a transparent substrate formed with a plurality of lenses on one principal surface of the substrate; forming a plurality of recesses in the one principal surface of the substrate by selective etching; and polishing another principal surface of the substrate bottoms of the plurality of recesses to change the plurality of recesses to a plurality of guide pin insertion holes.

According to this micro lens array manufacture method, the micro lens array can be formed with ease and at high precision by using a thin film forming process including a selective etching process and the like.

This micro lens array manufacture method may further comprise a step of, after the plurality of recesses are formed, making an opening of each of the plurality of recesses gradually increase a size at an upper level by selective etching before the other principal surface of the substrate is polished. The guide pin insertion hole gradually increasing the size at the upper level on the one principal surface of the substrate.

As above, the substrate having a plurality of lenses formed on the one principal surface and the metal coupling plate having the light transmission window corresponding to the lenses and a plurality of guide pin insertion holes are adhered together to form the micro lens array. Accordingly, by inserting a plurality of guide pins inserted into the guide pin insertion holes of the micro lens array into guide pin insertion grooves (or holes) of an optical device such as an optical fiber array, the coupling between the optical device and micro lens array can be achieved with ease and at high precision. The micro lens array can be formed with ease and at high precision by a thin film forming process including a plating process and the like.

In the micro lens array having the transparent substrate and formed with a plurality of lenses on the one principal surface thereof, a plurality of guide pin insertion holes are formed through the substrate. Accordingly, by inserting a plurality of guide pins inserted into the guide pin insertion holes of the micro lens array into guide pin insertion grooves (or holes) of an optical device such as an optical fiber array, the coupling between the optical device and micro lens array can be achieved with ease and at high precision. The micro lens array can be formed with ease and at high precision by a thin film forming process including a plating process and the like.

Another object of the invention is to provide a device with guide pin insertion holes capable of preventing cleavage and crack to be caused when a guide pin is inserted into or pulled out of the guide pin insertion hole.

According to another aspect of the present invention, there is provided a device with guide pin insertion holes, comprising: a substrate made of nonmetal and formed with through holes for forming the guide pin insertion holes; and a metal layer covering an inner wall of each of the through holes to form a guide pin insertion hole having a size smaller than a size of the through hole.

According to this device with guide pin insertion holes, the guide pin insertion hole is defined by the metal layer covering the inner wall of the through hole formed through the nonmetal substrate made of quartz for example. Accordingly, while a guide pin is inserted into or pulled out of the guide pin insertion hole, the guide pin contacts the metal layer. Even if the substrate is made of quartz or the like, it is possible to prevent cleavage and crack to be caused when the guide pin is inserted into or pulled out of the guide pin insertion hole.

In the device with guide pin insertion holes, a metal plate having a pin insertion hole having a size smaller than a size of the through hole may be disposed on one of two principal surfaces of the substrate, the metal plate covering a peripheral area of one opening end of the through hole and the pin insertion hole being aligned in position with the through hole, and the metal layer may be formed continuously with the metal plate and cover a peripheral area of another opening end of sid through hole on the other principal surface of the substrate. The metal layer is therefore engaged with the peripheral area of one opening end of the through hole by the metal plate on the one principal surface of the substrate, and with the peripheral area of the other opening end of the through hole by a portion of the metal layer on the other principal surface of the substrate. The metal layer is therefore firmly fixed to the substrate so that the metal layer is prevented from being removed from the substrate while the guide pin is inserted into or pulled out of the guide pin insertion hole.

In the device with guide pin insertion holes, the metal layer may formed covering peripheral areas of the opening ends of the through hole on both two principal surfaces of the substrate. The metal layer can be engaged with the peripheral areas of the opening ends of the through hole on both two principal surfaces of the substrate so that the metal layer is prevented from being removed from the substrate while the guide pin is inserted into or pulled out of the guide pin insertion hole.

According to another aspect of the present invention, there is provided a method of manufacturing a device with guide pin insertion holes, comprising: preparing a substrate made of nonmetal and formed with through holes for forming the guide pin insertion holes; disposing a metal plate having a pin insertion hole having a size smaller than a size of the through hole is disposed on one of two principal surfaces of the substrate, the metal plate covering a peripheral area of one opening end of the through hole and the pin insertion hole is aligned in position with the through hole, and disposing hole forming pins made of nonmetal, and disposing hole forming pins in such a manner that while the hole forming pins are inserted into the pin insertion holes of the metal plate, the hole forming pins are extended toward the other of the two principal surfaces of the substrate via the through holes; performing a metal plating process by using the metal plate as a plating seed layer to form a metal layer made of plated metal and covering an inner wall of each of the through holes, in a state that the metal plated is disposed in a manner described above and the hole forming pins are disposed in a manner described above; and dismounting the hole forming pins from the pin insertion holes of the metal plate and the metal layer to provide the metal layer with the guide pin insertion holes having a size corresponding to a size of the hole forming pins.

According to the manufacture method of a device with guide pin insertion holes, on the one principal surface of the substrate, the metal plate having a pin insertion hole covers the peripheral area of one opening end of the through hole and the pin insertion hole is aligned in position with the pin insertion hole. A nonmetal hole forming pin is inserted into the pin insertion hole of the metal plate and protruded out of the other principal surface of the substrate via the through hole. In this state, by using the metal plate as a plating seed plate, a metal plating process is performed to form the metal layer having the guide pin insertion hole in the through hole. The size and position of the guide pin insertion hole relative to the hole forming pin can be formed at high precision.

In the manufacture method of a device with guide pin insertion holes, the pin insertion holes of the metal plate to be used in the step of disposing the metal plate may gradually increase a size toward a surface of the metal plate opposite to a side of the through holes. Since it becomes easy to fit the hole forming pin in the pin insertion hole of the metal plate and realize precise fitting, the precision of the guide pin insertion hole can be improved further. By leaving the metal plate as the guide pin guiding hole, the guide pin can be inserted easily.

According to another aspect of the present invention, there is provided a method of manufacturing a device with guide pin insertion holes, comprising: forming a plating seed layer on one principal surface of a fixing plate; adhering a substrate made of nonmetal and formed with through holes for forming guide pin insertion holes to the plating seed layer via an adhesive layer and fixing the substrate to the fixing plate; forming a resist layer smaller than a size of each of the through holes and thicker than a thickness between two principal surfaces of the substrate in each of the through holes, in a state that the substrate is fixed to the fixing plate, and selectively removing the adhesive layer around the resist layer by using the resist layer as a mask to expose a portion of the plating seed layer in a pattern surrounding the resist layer and leave a portion of the adhesive layer under the resist layer; by using as a mask the resist layer, the portion of the adhesive layer under the resist layer, the adhesive layer and the substrate, plating metal on the plating seed layer to form a metal layer made of plated metal and covering an inner wall of the through holes; providing the metal layer with the guide pin insertion holes by removing the resist layer and the portion of the adhesive layer; removing the plating seed layer to separate the fixing plate from the substrate having the metal layer provided with the guide pin insertion holes.

According to the method of manufacturing a device with guide pin insertion holes, a resist layer is formed by photolithography in the through hole of the substrate fixed to the fixing plate via the plating seed layer by using an adhesive layer, and by using this resist layer as a mask, the adhesive layer is selectively removed by the removing process to expose the plating seed layer surrounding the resist layer and leave the adhesive layer under the resist layer. Next, by using as a mask the resist layer, underlying adhesive layer portion, adhesive layer and substrate, metal is plated on the plating seed layer to form the metal layer having the guide pin insertion hole in the through hole. Accordingly, the size and position of the guide pin insertion hole can be set at high precision in correspondence with the size and position of the lamination structure of the resist layer and underlying adhesive layer portion.

In this method of manufacturing a device with guide pin insertion holes, the substrate to be used in the step of fixing the substrate to the fixing plate may have each of the through holes gradually increasing a size toward a principal surface of the substrate on a side opposite to a side where the substrate is fixed to the fixing plate. Since the metal plating growth becomes slow near at the resist layer at the upper level and the opening end of the through hole increases the size at the upper level, it is easy to insert the guide pin into the guide pin insertion hole.

As above, the guide pin insertion hole is formed by covering the inner wall of the through hole formed through the nonmetal substrate with the metal layer. Accordingly, even if the substrate is made of quartz or the like, it is possible to prevent cleavage and crack to be caused when the guide pin is inserted into or pulled out of the guide pin insertion hole.

DESCRIPTION OF THE PREFERRED EMBODIMENTS

Figure 1:
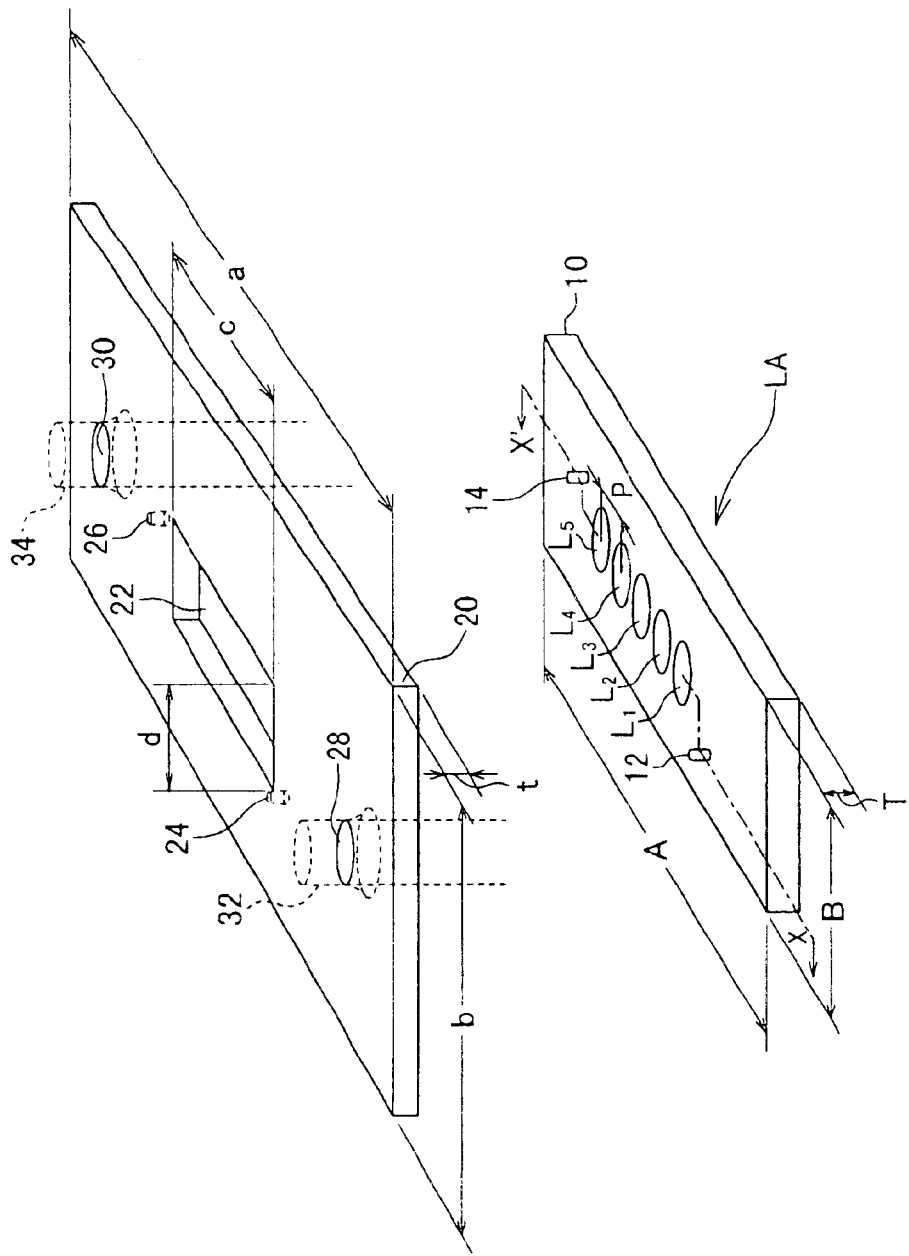
FIG. 1 is a perspective view of a micro lens array before assembly according to an embodiment of the invention.
Figure 2:
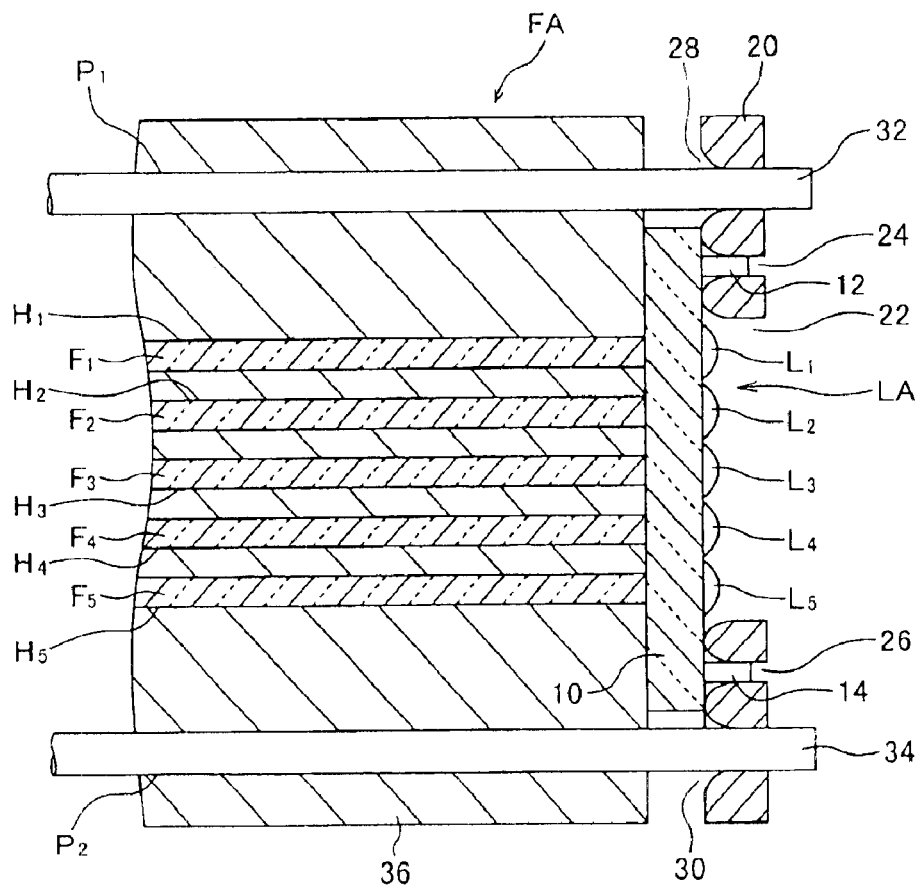
FIG. 2 is a cross sectional view of the micro lens array shown in FIG. 1 assembled and coupled to an optical fiber array.

FIG. 1 shows a micro lens array before assembly according to an embodiment of the present invention, and FIG. 2 shows the micro lens array after assembly. FIG. 2 is a cross sectional view taken along line X–X' shown in FIG. 1. The micro lens array LA has a quartz substrate 10 and a coupling plate 20 made of metal and fitted on the substrate.

On one principal surface of the quartz substrate 10, convex lenses $L_1$ to $L_5$ are arranged in line and fitting pins 12 and 14 are formed on both sides of a lens line on which the lenses $L_1$ to $L_5$ are disposed. The lenses $L_1$ to $L_5$ are formed by transferring a lens pattern made of resist on the one principal surface of the substrate 10 by means of etching. The fitting pins 12 and 14 are both made of metal such as Ni—Fe alloy plated on the one principal surface of the substrate 10 by using a plating seed layer. The plating seed layer corresponds to Cu/Cr lamination layers 50 and 52 shown in FIG. 13 and is omitted drawn in FIGS. 1 to 5.

The substrate 10 is, for example, of a rectangular shape having a longer side length A of 6 mm, a shorter side length of 1.5 mm and a thickness T of 1.25 mm. For example, the diameter of each lens such as $L_1$ is 0.5 mm and a pitch P between centers of adjacent lenses is 0.5 mm.

The coupling plate 20 has a stacking region to be stacked on the one principal surface of the substrate 10 and a non-stacking region extending from the stacking region and not to be stacked on the one principal surface of the substrate 10. The stacking region is provided with a light transmission window 22 corresponding to the lenses $L_1$ to $L_5$ and fitting holes 24 and 26 corresponding to the fitting pins 12 and 14, respectively. The non-stacking region is provided with guide pin insertion holes 28 and 30 whose inner surfaces are covered with plated metal such as Ni—Fe alloy. The light transmission window 22 transmits light propagated from the lenses $L_1$ to $L_5$. Such a light transmission window may be formed for each lens such as $L_1$. The fitting holes 24 and 26 are formed passing through the coupling plate 20 from one principal surface thereof to the other principal surface and increasing the diameter (size) toward the other principal surface. The guide pin insertion holes 28 and 30 are formed passing through the coupling plate 20 from one principal surface thereof to the other principal surface and increasing the diameter (size) toward the other principal surface.

The coupling plate 20 is, for example, of a rectangular shape having a longer side length a of 11 mm, a shorter side length b of 3 mm and a thickness t of 50 to 100 µm. The light transmission window 22 is, for example, of a rectangular shape having a longer side length c of 3 mm and a shorter side length d of 1 mm. In the guide pin insertion holes 28 and 30, guide pins 32 and 34 formed on a coupling partner optical device (e.g., optical fiber array) are inserted (fitted). An opening size of the guide pin insertion hole at the smaller size on the one principal surface side of the coupling plate 20 is 1 mm for example, and that at the larger size on the other principal surface side of the coupling plate 20 is 1.2 mm for example. The guide pins 32 and 34 are both of a circular column shape and made of stainless steel or ceramic. The diameter of the guide pin is 1 mm for example.

The fitting holes 24 and 26 are positioned on a diagonal line of the light transmission window 22 and the fitting pins 12 and 14 are formed at the positions corresponding to the fitting holes 24 and 26. The fitting holes and pins may be disposed near at the four corners of the light transmission window 22. The positions and the number of holes or pins may be changed as desired. This change is also applicable to the guide pin insertion holes 28 and 30.

As shown in FIG. 2, in assembling the micro lens array LA, the fitting pins 12 and 14 are fitted in the fitting holes 24 and 26 in the state that the principal surface of the coupling plate 20 is stacked upon the principal surface of the substrate 10 to couple together the coupling plate 20 and substrate 10. In this case, the fitting pins are inserted into the fitting holes from the large size side so that the insertion is easy and smooth.

The fitting pins 12 and 14 are formed on the lens forming surface of the substrate 10 by thin film forming processes using the lens position as the reference as will be later described. It is therefore possible to set the position precision (error from a design position) of the fitting pins 12 and 14 relative to the lens position in a range of ±0.2 µm. The fitting precision of the fitting pins 12 and 14 relative to the fitting holes 24 and 26 is therefore set in a range of ±0.3 µm and the fitting precision of the guide pins 32 and 34 relative to the guide pin insertion holes 28 and 30 is therefore set in a range of ±0.5 µm.

Figure 3:
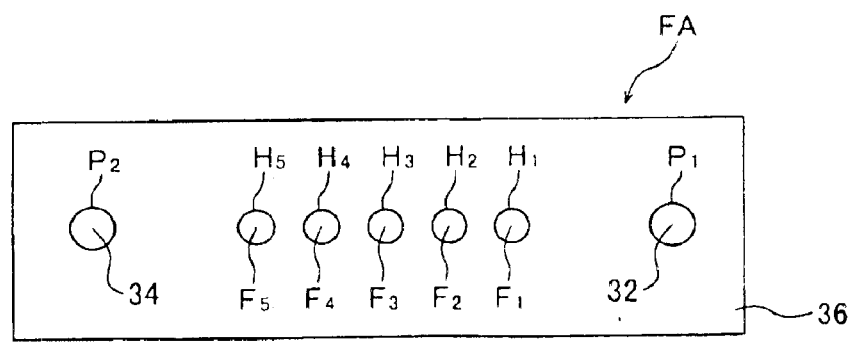
FIG. 3 is a plan view of the optical fiber array shown in FIG. 2.

In the example shown in FIG. 2, an optical fiber array FA is coupled to the micro lens array LA. As shown in FIGS. 2 and 3, the optical fiber array FA holds optical fibers $F_1$ to $F_5$ in holding holes $H_1$ to $H_5$ formed in parallel through an optical holder 36 from one end face to the other end face thereof. End faces of the optical fibers are exposed on one end face of the optical fiber holder 36 and are flush with the one end face forming a common flat plane. Guide pin insertion holes $P_1$ and $P_2$ are formed through the optical fiber holder 36 from one end surface thereof to the other end surface, on both sides of the holding hole group of $H_1$ to $H_5$. Guide pins 32 and 34 are inserted into the guide pin insertion holes $P_1$ and $P_2$ in a slidable manner in the holes.

In coupling the micro lens array LA to the optical fiber array FA, the guide pins 32 and 34 are inserted into (fitted in) the guide pin holes 28 and 30 in the state that the end face of the optical fiber array FA is faced toward the principal surface (surface opposite to the lens forming surface) of the substrate 20 to make the end face of the array FA come near or in contact with the principal surface of the substrate 10. In this case, the guide pins are inserted into the guide pin insertion holes from the large size side so that the insertion is easy and smooth. Thereafter, the position of the micro lens array LA is adjusted along the optical axis direction to obtain desired collimated light, and the micro lens array LA is fixed to the optical fiber array FA with adhesive. Since the adjustment work can be performed in the unit of micro lens array LA, the work efficiency can be improved. The micro lens array LA of this invention can achieve the position precision of ±1 µm or shorter relative to the optical fiber array.

The guide pins 32 and 34 of the optical fiber array FA are slidable, and they may be protrusions formed on the one end face of the optical fiber holder 36. Not only the optical fiber array, but also a light emitting device array, a light receiving device array and the like are also used. The micro lens substrate is not limited to a one-side convex lens type, but other types such as shown in FIGS. 4 and 5 may also be used.

Figure 4:
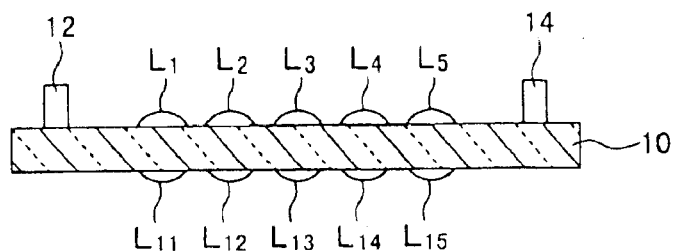
FIG. 4 is a cross sectional view showing another example of a micro lens substrate.

A micro lens substrate shown in FIG. 4 has convex lenses $L_1$ to $L_5$ and metal fitting pins 12 and 14 formed on one principal surface of a quartz substrate 10 in the manner described above, and convex lenses $L_{11}$ to $L_{15}$ formed on the principal surface of the quartz substrate 10 and facing the lenses $L_1$ to $L_5$. Similar to the lenses $L_1$ to $L_5$, the lenses $L_{11}$ to $L_{15}$ are formed by transferring a resist pattern to the other principal surface of the substrate 10 by means of etching.

Figure 5:
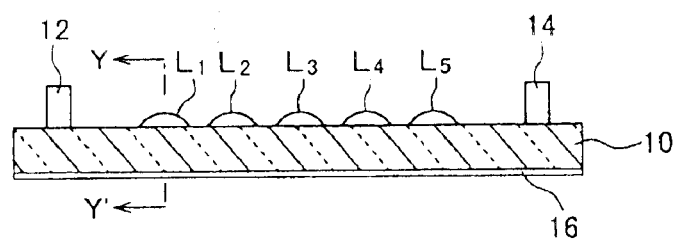
FIG. 5 is a cross sectional view showing still another example of a micro lens substrate.
Figure 6:
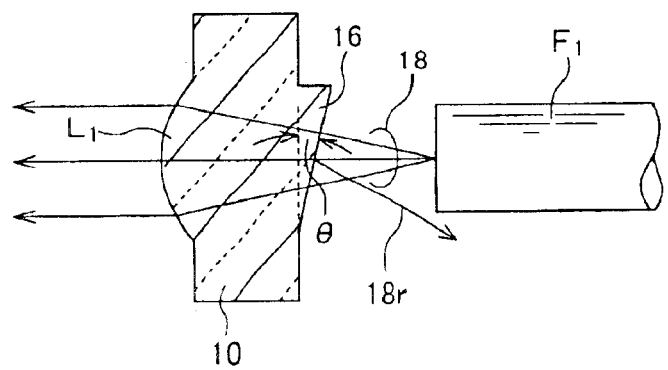
FIG. 6 is a cross sectional view of the micro lens substrate taken along line Y–Y' shown in FIG. 5.

A micro lens substrate shown in FIGS. 5 and 6 has convex lenses $L_1$ to $L_5$ and metal fitting pins 12 and 14 formed on one principal surface of a quartz substrate 10 in the manner described above, and slanted surface forming region regions 16 formed on the principal surface of the quartz substrate 10 facing the lens group $L_1$ to $L_5$. The slanted surface forming region 16 has slanted surfaces having an inclination angle $\theta=5$ to $15°$ (preferably $8°$) relative to the other principal surface of the substrate 10 as shown in FIG. 6. The direction of the slanted surface is perpendicular to the array direction of the lenses $L_1$ to $L_5$.

In use of the micro lens array, as in the representative example of the lens $L_1$ shown in FIG. 6, light 18 is incident upon the lens $L_1$ from an optical fiber $F_1$ via the slanted surface forming region 16, and collimated (made parallel light fluxes) by the lens $L_1$. In this case, light $18r$ reflected at the slanted surface of the slanted surface forming region 16 will not enter the optical fiber $F_1$, turning away from the optical fiber $F_1$ as shown in FIG. 6. Namely, the slanted surface forming region 16 reduces reflected light entering the optical fiber $F_1$ and reflected light entering an adjacent optical fiber.

Next, with reference to FIGS. 7 to 16, description will be made on a method of manufacturing a micro lens substrate of a one-side convex lens type such as shown in FIGS. 1 and 2.

Figure 7:
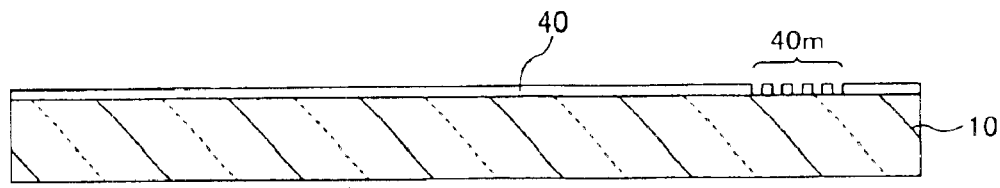
FIGS. 7 to 16 are cross sectional views illustrating a micro lens array manufacture method according to the invention, the method including a resist layer forming process (FIG. 7), a sputtering process and a lift-off process (FIG. 8), a resist layer forming process (FIG. 9), a resist reflow process (FIG. 10), a lens forming process (FIG. 11), a resist layer forming process (FIG. 12), a sputtering process (FIG. 13), a lift-off process and a resist layer forming process (FIG. 14), a selective plating process (FIG. 15) and a resist removing process (FIG. 16).

In a process shown in FIG. 7, a resist layer 40 is formed on one principal surface of a quartz substrate 10 by photolithography, the resist pattern 40 having a pattern $40m$ for forming a position alignment mark.

Figure 8:

In a process shown in FIG. 8, a Cr film is formed on the resist layer 40 to a thickness of about 300 nm by sputtering. At this time, some portions of the Cr film attach the surface of the substrate 10 via the position alignment mark forming pattern $40m$. The resist layer 40 together with the Cr film deposited thereon is thereafter removed by lift-off. A position alignment mark M of the attached Cr film is left on the principal surface of the substrate 10.

Figure 9:
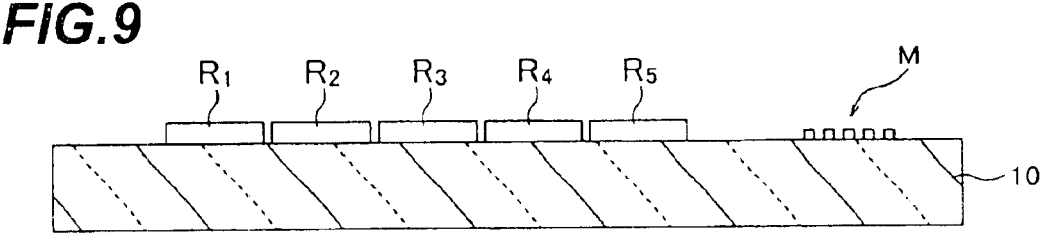

In a process shown in FIG. 9, resist layers $R_1$ to $R_5$ corresponding to five lenses are formed on the surface of the substrate 10 by photolithography utilizing the position alignment mark M.

Figure 10:
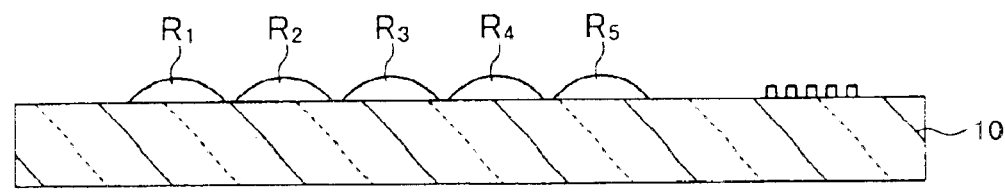

In a process shown in FIG. 10, the resist layers $R_1$ to $R_5$ are subjected to a heat reflow process to make each resist layer have a convex spherical shape.

Figure 11:
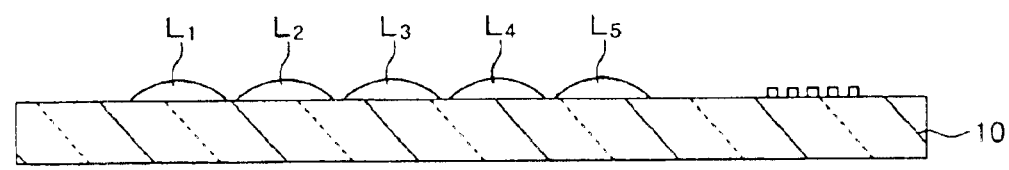

In a process shown in FIG. 11, the resist layers $R_1$ to $R_5$ and the surface of the quartz substrate 10 are subjected to a dry etching process using etching gas containing freon gas such as $CF_4$, $CHF_3$ and $C_3F_8$ to transfer the resist pattern of the resist layers $R_1$ to $R_5$ to the surface of the quartz substrate 10 and form lenses $L_1$ to $L_5$ corresponding to the resist layers $R_1$ to $R_5$.

Figure 12:
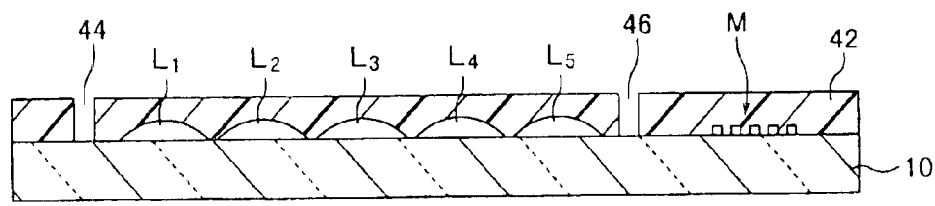

In a process shown in FIG. 12, a resist layer 42 is formed on the surface of the substrate 10 by photolithography using as a reference the position alignment mark M, the resist layer 42 having two holes 44 and 46 corresponding fitting pins. The lenses $L_1$ to $L_5$ and position alignment mark M are covered with the resist layer 42.

Figure 13:
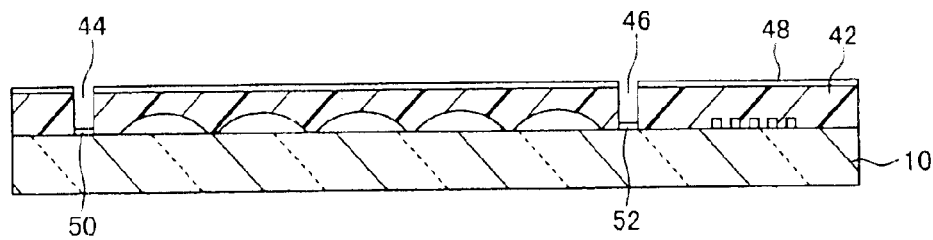

In a process shown in FIG. 13, a Cu/Cr lamination layer (a lamination having a Cu layer stacked on a Cr layer) 48 is formed on the resist layer 42 by sputtering. At this time, lamination layers 50 and 52 of upper Cu and lower Cr attach the substrate surface exposed in the holes 44 and 46 of the resist layer 42. For example, the thicknesses of the Cu layer and Cu layer are 30 nm and 300 nm, respectively. The Cr layer is used for improving tight contact of the Cu layer relative to the substrate 10.

Figure 14:
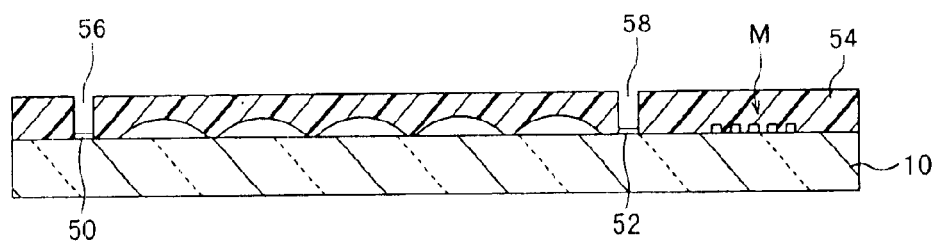

In a process shown in FIG. 14, the resist layer 42 and the Cu/Cr lamination layer 48 are removed by lift-off to leave the Cu/Cr lamination layers 50 and 52 on the surface of the substrate 10. A resist layer 54 is formed on the surface of the substrate 10 by photolithography using as a reference the position alignment mark M, the resist mark having holes 56 and 58 exposing the Cu/Cr lamination layers 50 and 52. The thickness of the resist layer 54 is about 50 to 100 µm for example.

Figure 15:
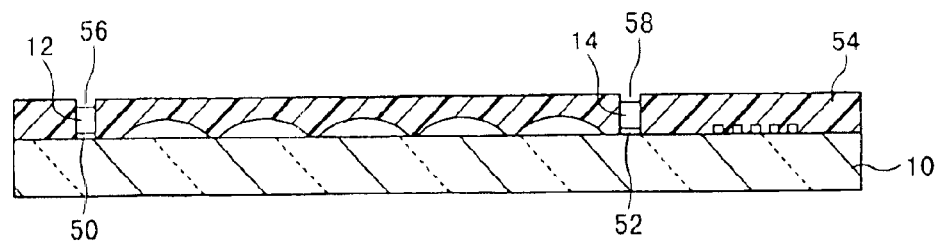

In a process shown in FIG. 15, by using the resist layer 54 as a mask, selective plating of Ni—Fe is performed so that fitting pins 12 and 14 of Ni—Fe alloy are formed on the Cu/Cr lamination layers 50 and 52 in the holes 56 and 50 of the resist layer 54.

Figure 16:
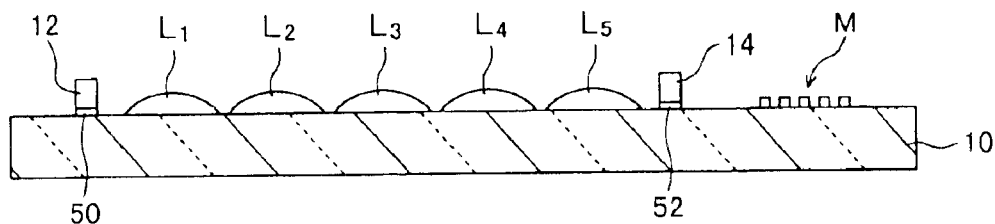

In a process shown in FIG. 16, the resist layer 54 is removed by chemicals or other means. The finished micro lens substrate has the convex lenses $L_1$ to $L_5$ formed on the surface of the quartz substrate 10 and the fitting pins 12 and 14 stacked on the Cu/Cr lamination layers 50 and 52 on both sides of the lens array of lenses $L_1$ to $L_5$.

According to this method described with FIGS. 7 to 16, both the photolithography process for the lenses $L_1$ to $L_5$ and the photolithography process for the fitting pins 12 and 14 are performed by using the position alignment mark M as a reference of a demagnification projection aligner. A good position precision was obtained corresponding to an error of ±0.2 µm or shorter relative to the design position.

In the micro lens substrate manufacture method described above, although a linear array of the lenses $L_1$ to $L_5$ is used, a micro lens substrate having a two-dimensional array of lenses can be manufactured in a similar manner.

Next, with reference to FIGS. 17 to 22, an example of a manufacture method for a coupling plate will be described.

Figure 17:
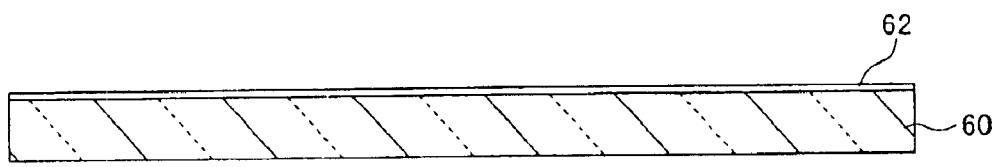
FIGS. 17 to 22 are cross sectional views illustrating a coupling plate manufacture method according to the invention, the method including a plating seed layer forming process (FIG. 17), a resist layer forming process (FIG. 18), a resist layer forming process (FIG. 19), a selective plating process (FIG. 20), a resist removing process (FIG. 21) and a separating process (FIG. 22).

In a process shown in FIG. 17, an upper Cu- lower Cr lamination layer 62 as a plating seed layer is formed by sputtering on one principal surface of a substrate 60 made of glass, quartz, silicon or the like. For example, the thicknesses of the Cr layer and Cu layer are 30 nm and 300 nm, respectively.

Figure 18:
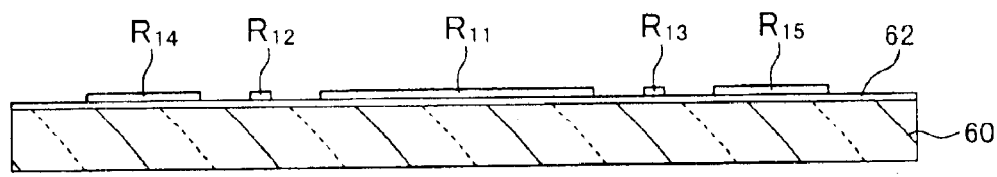

In a process shown in FIG. 18, formed on the Cu/Cr lamination layer 62 by photolithography are: a resist layer $R_{11}$ corresponding to a desired light transmission window pattern; resist layers $R_{12}$ and $R_{13}$ corresponding to desired fitting hole patterns; and resist layers $R_{14}$ and $R_{15}$ corresponding to desired guide pin insertion hole patterns. The resist layer $R_{11}$ is formed to have a size slightly larger than that of the light transmission widow. The resist layers $R_{12}$ and $R_{13}$ are formed to have a size (diameter) slightly larger than that of the light transmission window, and the resist layers $R_{14}$ and $R_{15}$ are formed to have a size (diameter) slightly larger than that of the guide pin insertion hole. The resist layers $R_{11}$ to $R_{15}$ allow the size of the openings to gradually increase toward the upper opening end.

Figure 19:
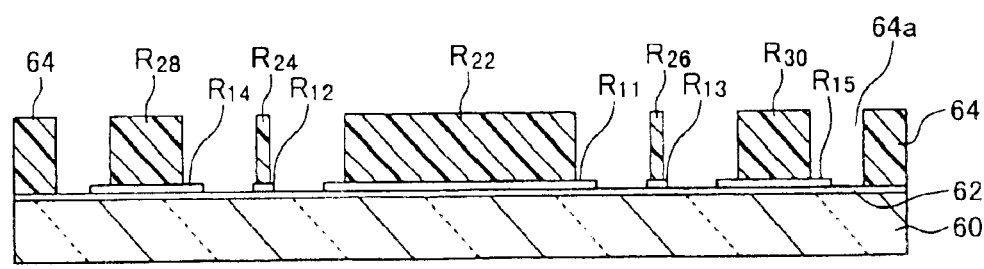

In a process shown in FIG. 19, patterns $R_{22}$ to $R_{30}$ of a resist layer 64 are formed on the substrate by photolithography. The resist layer 64 has a hole 64a corresponding to a plan shape of a desired coupling plate. The resist patterns $R_{22}$, $R_{24}$, $R_{26}$, $R_{28}$, and $R_{30}$ are formed on the resist layers $R_{11}$, $R_{12}$, $R_{13}$, $R_{14}$ and $R_{15}$. The resist pattern $R_{22}$ is formed to have a size corresponding to that of the light transmission window. The resist patterns $R_{24}$ and $R_{26}$ are formed to have the size (diameter) corresponding to that of the fitting holes. The resist patterns $R_{28}$ and $R_{30}$ are formed to have the size (diameter) corresponding to that of the guide pin insertion holes.

Figure 20:
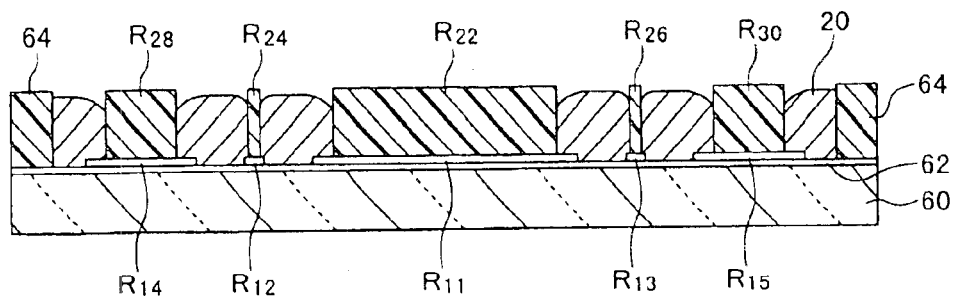

In a process shown in FIG. 20, by using the resist layer 64 and resist layers $R_{11}$ to $R_{15}$ and the resist patterns $R_{22}$ to $R_{30}$ as a mask, selective plating of Ni—Fe alloy is performed to form a coupling plate 20 made of an Ni—Fe alloy layer. At this time, progress of plating is suppressed under the resist layers $R_{11}$ to $R_{15}$ and plating starts at the positions corresponding to the side walls of the resist layers. The Ni-alloy layer is formed turning away from the resist patterns $R_{22}$ to $R_{30}$ at the upper level (gradually increasing the size of the opening at the upper level). Progress of plating is delayed more than that at the position just above the Cu/Cr lamination layer 62 because the Cu/Cr lamination layer 62 as the plating seed layer is covered with the resist layer such as $R_{11}$ at the peripheral area of each resist pattern such as $R_{22}$.

Figure 21:
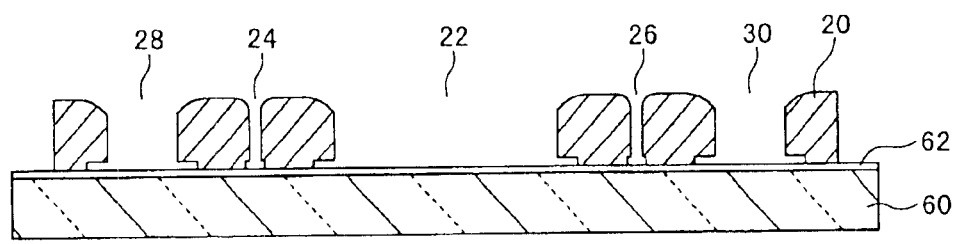

In a process shown in FIG. 21, the resist layer is removed by chemicals or other means to provide the coupling plate 20 with the light transmission window 22, fitting holes 24 and 26 and guide pin insertion holes 28 and 30.

Figure 22:
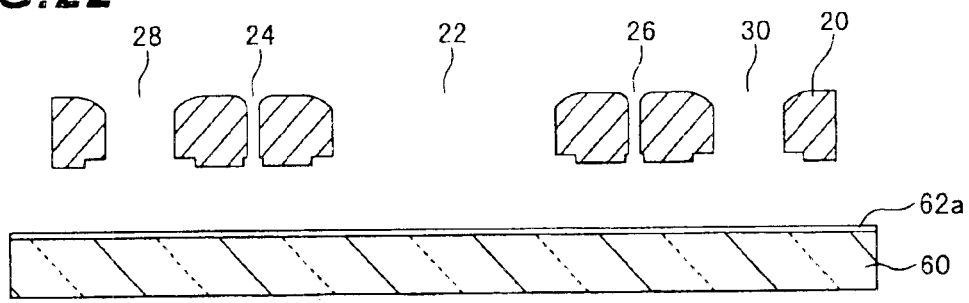

In a process shown in FIG. 22, the Cu layer of the Cu/Cr lamination layer 62 is removed by etching to separate the coupling plate 20 from the substrate 60. The Cr layer 62a is left on the substrate 60. By forming a Cu layer on the Cr layer 62a, the substrate 60 can be used repetitively.

FIGS. 23 to 26 illustrate another manufacture method for a coupling plate. In FIGS. 23 to 26, like elements to those shown in FIGS. 17 to 22 are represented by identical reference numerals/characters and the detailed description thereof is omitted.

Figure 23:
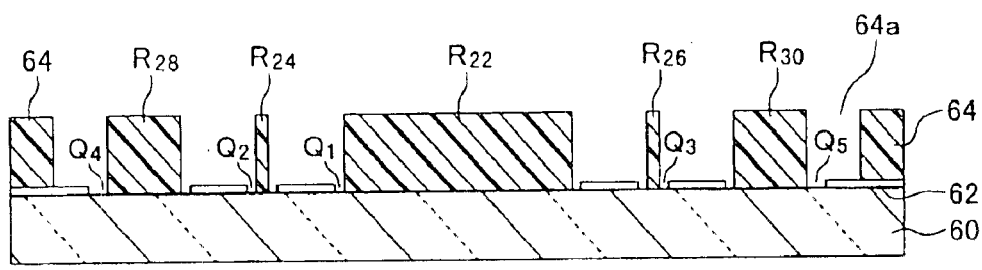
FIGS. 23 to 26 are cross sectional views illustrating another example of a coupling plate manufacture method according to the invention, the method including a plating seed layer forming process and a resist layer forming process (FIG. 23), a selective plating process (FIG. 24), a resist removing process (FIG. 25) and a separating process (FIG. 26).

In a process shown in FIG. 23, a Cu/Cr lamination layer 62 as a plating seed layer 62 is formed on one principal surface of a substrate 60. The Cu/Cr lamination layer 62 has a hole $Q_1$ corresponding to a desired light transmission window pattern, holes $Q_2$ and $Q_3$ corresponding to desired fitting holes, and holes $Q_4$ and $Q_5$ corresponding to desired guide pin insertion holes. The hole $Q_1$ has a size slightly larger than that of the light transmission window. The holes $Q_2$ and $Q_3$ have the size (diameter) slightly larger than that of the fitting holes, and the holes $Q_4$ and $Q_5$ have the size (diameter) slightly larger than that of the guide pin insertion holes. The holes $Q_1$ to $Q_5$ allow the size of the openings to gradually increase toward the upper opening end.

The Cu/Cr lamination layer 62 having the holes $Q_1$ to $Q_5$ is formed in the following processes. After lift-off resist layers corresponding to the holes $Q_1$ to $Q_5$ are formed on the surface of the substrate 60, a Cu/Cr lamination layer 62 is formed on the substrate surface by sputtering, covering the resist layers, and the resist layers and the Cu/Cr lamination layer formed thereon are removed by lift-off. For example, the thicknesses of the Cr layer and Cu layer of the Cu/Cr lamination layer 62 formed by sputtering are 15 nm and 200 nm, respectively.

Next, similar to the process shown in FIG. 19, a resist layer 64 having resist patterns $R_{22}$ to $R_{30}$ is formed on the surface of the substrate 60. The resist layer 64 has a hole 64a corresponding to the plan shape of a desired coupling plate. The resist patterns $R_{22}$, $R_{24}$, $R_{26}$, $R_{28}$ and $R_{30}$ are formed inside the hole 64a and inside the holes $Q_1$, $Q_2$, $Q_3$, $Q_4$ and $Q_5$, respectively, The surface of the substrate 60 is exposed in a rectangular shape and ring shapes in the peripheral areas of the resist patterns $R_{22}$ to $R_{30}$.

Figure 24:
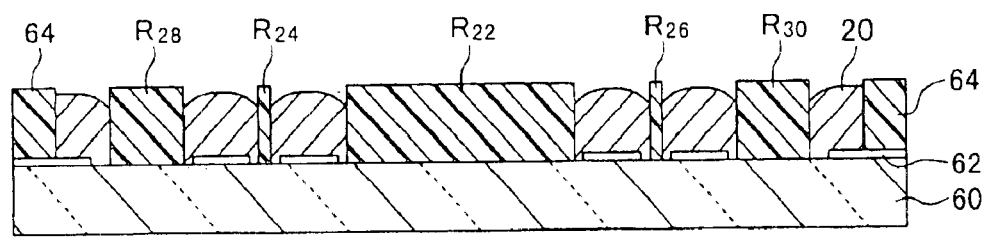

In a process shown in FIG. 24, by using the resist layer 64 and resist patterns $R_{22}$ to $R_{30}$ as a mask, selective plating of Ni—Fe alloy is performed to form a coupling plate 20 made of an Ni—Fe alloy layer. At this time, since the Cu/Cr lamination layer 62 as the plating seed layer is not formed in the rectangle- or ring-shaped peripheral area of each resist pattern such as $R_{22}$, progress of plating starts at the positions corresponding to the side walls of the plating underlying layer 62. Therefore, progress of plating in the rectangle- or ring-shaped area is slower than that in the area just above the Cu/Cr lamination layer 62. The coupling plate 20 is therefore formed turning away from the resist patterns $R_{22}$ to $R_{30}$ at the upper level (gradually increasing the size of the opening at the upper level).

Figure 25:
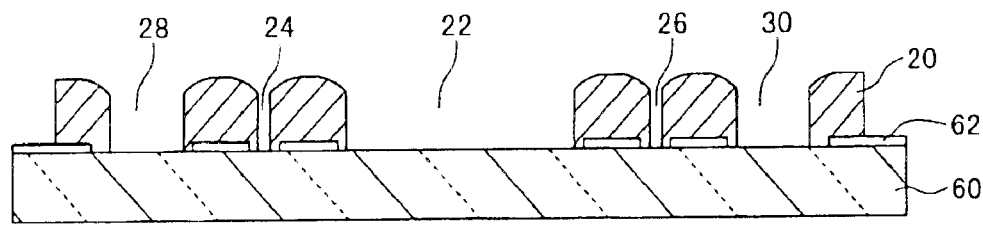

In a process shown in FIG. 25, the resist layer 64 is removed by chemicals or other means to provide the coupling plate 20 with the light transmission window 22, fitting holes 24 and 26 and guide pin insertion holes 28 and 30.

Figure 26:
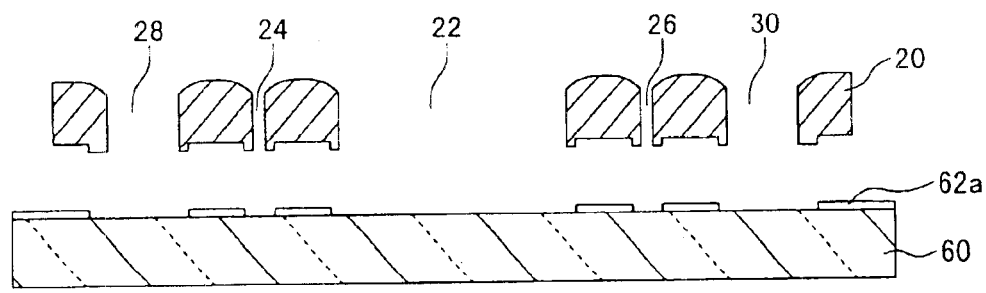

In a process shown in FIG. 26, the Cu layer of the Cu/Cr lamination layer 62 is removed by etching to separate the coupling plate 20 from the substrate 60. The Cr layer 62a is left on the substrate 60.

Figure 27A:
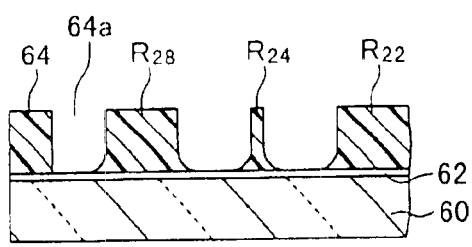
FIGS. 27A and 27B are cross sectional views illustrating another example of a coupling plate manufacture method according to the invention, the method including a resist layer forming process (FIG. 27A) and a selective plating process and a resist removing process (FIG. 27B).
Figure 27B:
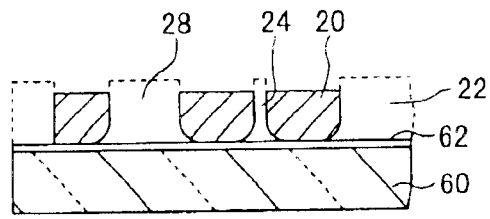

FIGS. 27A and 27B illustrate still another manufacture method for the coupling plate. In FIGS. 27A and 27B, like elements to those shown in FIGS. 17 to 26 are represented by identical reference numerals/characters and the detailed description thereof is omitted.

In a process shown in FIG. 27A, resist patterns $R_{22}$, $R_{24}$ and $R_{28}$ of a resist layer 64 are formed on a Cu/Cr lamination layer 62 covering one principal surface of the substrate 60. The resist layer 64 has a hole 64a corresponding to a plan shape of a desired coupling plate. The resist patterns $R_{22}$, $R_{24}$ and $R_{28}$ gradually increase the size at the lower level in each opening 64a. In order to form the resist patterns $R_{22}$, $R_{24}$ and $R_{28}$ having a normal taper shape, one of the following methods is used if a stepper (demagnification projection aligner) is used:

(1) setting a focussing position inside the resist layer;

(2) setting an exposure amount small in a lower region of the resist layer (for positive resist); and (3) gradually changing a transmission factor of a mask portion of an exposure mask (forming a halftone region in a peripheral area of an opening region so as to raise a transmission factor at a deeper level).

In a process shown in FIG. 27B, by using the resist layer 64 and resist patterns $R_{22}$, $R_{24}$ and $R_{28}$ as a mask, selective plating of Ni—Fe alloy is performed to form a coupling plate 20 made of Ni—Fe alloy. The resist layer 64 and resist patterns $R_{22}$, $R_{24}$ and $R_{28}$ are removed by chemicals or other means. Since the resist patterns $R_1$ to $R_4$ ad $R_{21}$ to $R_{24}$ are removed, the coupling plate 20 is provided with a light transmission window 22, a fitting hole 24 and a guide pin insertion hole 28. The sizes of the light transmission window 22, fitting hole 24 and guide pin insertion hole 28 all increase at the lower level of the coupling plate 20 because the sizes of the corresponding resist pattern all increase at the lower level. Thereafter, the Cu layer of the Cu/Cr lamination layer 62 is removed by etching to separate the coupling plate 20 from the substrate 60. In FIGS. 27A and 27B, although about a half of the coupling plate is shown, the remaining half is formed in the manner similar to that described above.

According to the coupling plate manufacture methods described with FIGS. 23 to 26, the following additional effects (a) and (b) can be obtained.

(a) In the process shown in FIG. 18, the degree of irregularity of the substrate surface is large because the thickness of the resist patterns $R_{11}$ to $R_{15}$ is 2 µm or thicker. Therefore, resist coating flatness in the process shown in FIG. 19 is likely to be degraded and the size of the resist layer 64 and resist patterns $R_{22}$ to $R_{30}$ is likely to be varied. In contract, in the process shown in FIG. 23, since the resist layer to be used for lift-off is removed and the thickness of the Cu/Cr lamination layer 62 is as thin as about 200 nm, the degree of substrate surface flatness is good. Therefore, in the process shown in FIG. 23, uniformity of resist coating is improved and a variation in sizes of the resist layer 64 and resist pattern $R_{22}$ to $R_{30}$ can be suppressed. The manufacture yield of coupling plates 20 can also be improved.

(b) In the process shown in FIG. 20, plating is performed under the conditions that the resist patterns $R_{11}$, $R_{12}$, $R_{13}$, $R_{14}$ and $R_{15}$ exist on the resist patterns $R_{22}$, $R_{24}$, $R_{26}$, $R_{28}$ and $R_{30}$. Therefore, even if the resist removing process shown in FIG. 21 and the Cu etching process shown in FIG. 22 are performed, some resist is left in the fitting holes 24 and 26 and guide pin insertion holes 28 and 30 of the coupling plate 20 so that contamination is likely to occur. This contamination lowers a position alignment precision of inserting the guide pins and fitting pins into the coupling plate 20 such as shown in FIG. 2. In contrast, in the process shown in FIG. 24, since the plating process is performed under the conditions that no resist layer pattern exists under the resist patterns $R_{22}$ to $R_{30}$, the amount of resist attached to and left on the coupling plate 20 is small so that contamination can be reduced. A position alignment precision of inserting the guide pins and fitting pins into the coupling plate 20 can therefore be improved.

In the above embodiments, the substrate with micro lenses and the coupling plate with guide holes through which guide pins are inserted have the structure that both the substrate and coupling plate can be dismounted from each other. They may be formed integrally.

Figure 28:
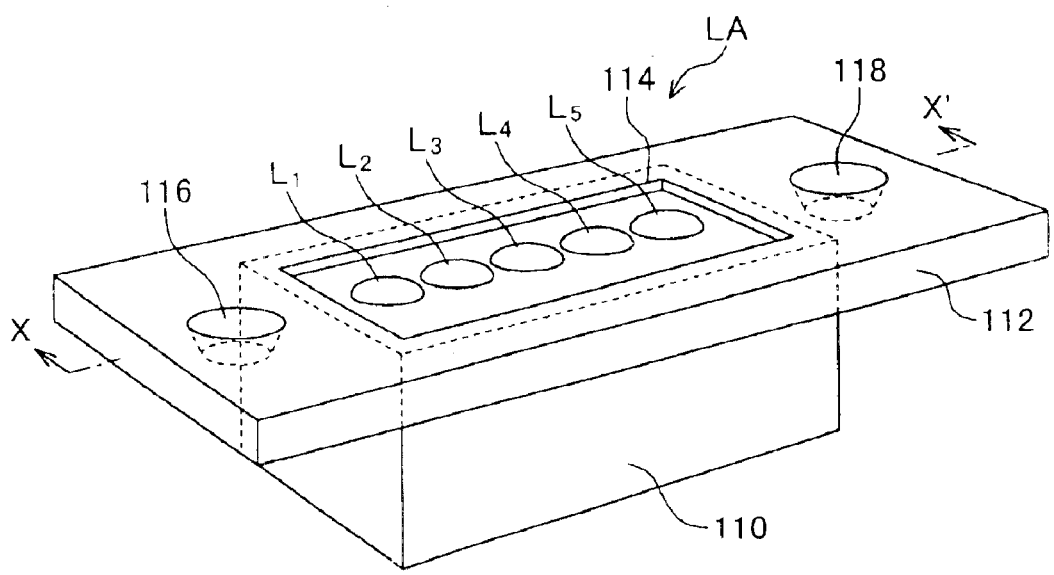
FIG. 28 is a perspective view of a micro lens array according to an embodiment of the invention.
Figure 29:
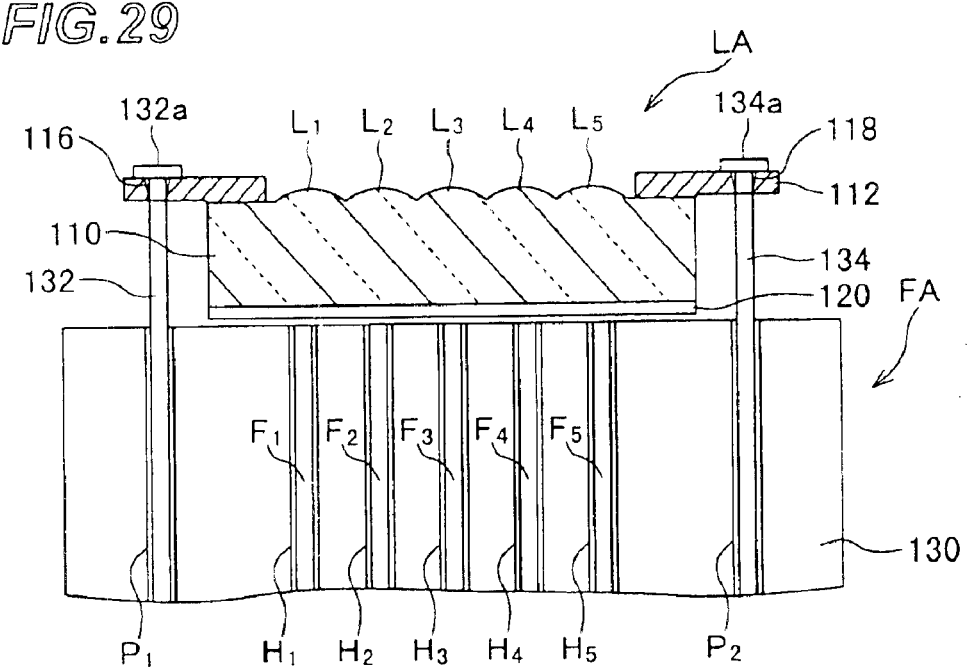
FIG. 29 is a top view partially in cross section illustrating a coupling state between the micro lens array shown in FIG. 28 and an optical fiber array.

FIG. 28 shows a micro lens array according to an embodiment of the invention. FIG. 29 shows a cross sectional view taken along line X–X' shown in FIG. 28. A micro lens array LS has a quartz substrate 110 and a coupling plate 112 made of metal and integrated with the substrate 110.

On one principal surface of the quartz substrate 110, convex lenses $L_1$ to $L_5$ are disposed in line. The lenses $L_1$ to $L_5$ are formed by etching a resist lens pattern and transferring it to the surface of the substrate 110. On the surface of the substrate 110, a plating seed film is formed surrounding the lenses $L_1$ to $L_5$. The plating seed film corresponds to an Ni—Fe alloy film 142a shown in FIG. 34 to be described later, and is omitted to be drawn in FIGS. 28 and 29. The substrate 110 is of a rectangular shape for example.

A coupling plate 112 has a stacking region to be stacked on the surface of the substrate 110 and a non-stacking region extending continuously from the stacking region and not to be stacked on the surface of the substrate 110. The stacking region is provided with a light transmission window 114 corresponding to the lenses $L_1$ to $L_5$ and the non-stacking region is provided with guide pin insertion holes 116 and 118. The coupling plate 112 is made of metal such as Ni—Fe alloy plated on the plating seed film described above on the one principal surface and its extended surface of the substrate 110. The light transmission window 114 transmits light propagated from the lenses $L_1$ to $L_5$. Such a light transmission window may be formed for each lens such as $L_1$. The guide pin insertion holes 116 and 118 are formed gradually increasing the size (diameter) at the upper level of the coupling plate 112 on the principal surface side opposite to the plating seed film. The coupling plate 112 is of a rectangular shape for example. The guide pin insertion holes 116 and 118 have a diameter of 0.125 mm for example.

Figure 52:
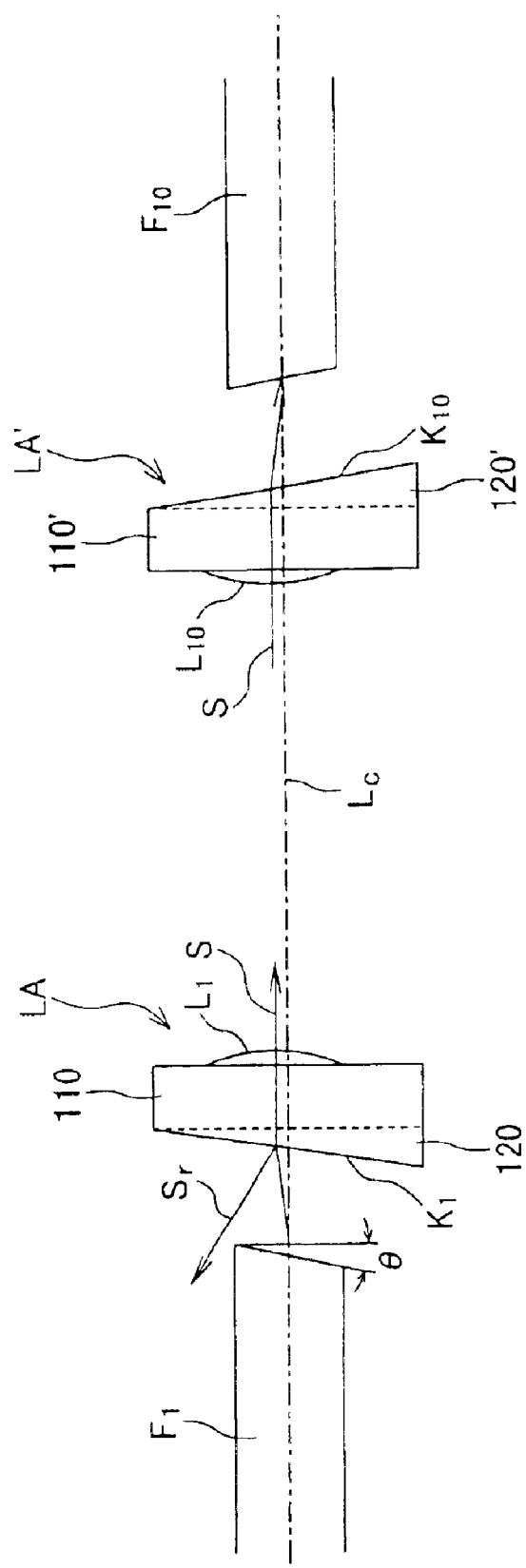
FIG. 52 is an optical path diagram showing an optical fiber coupling system using micro lens arrays.
Figure 53:
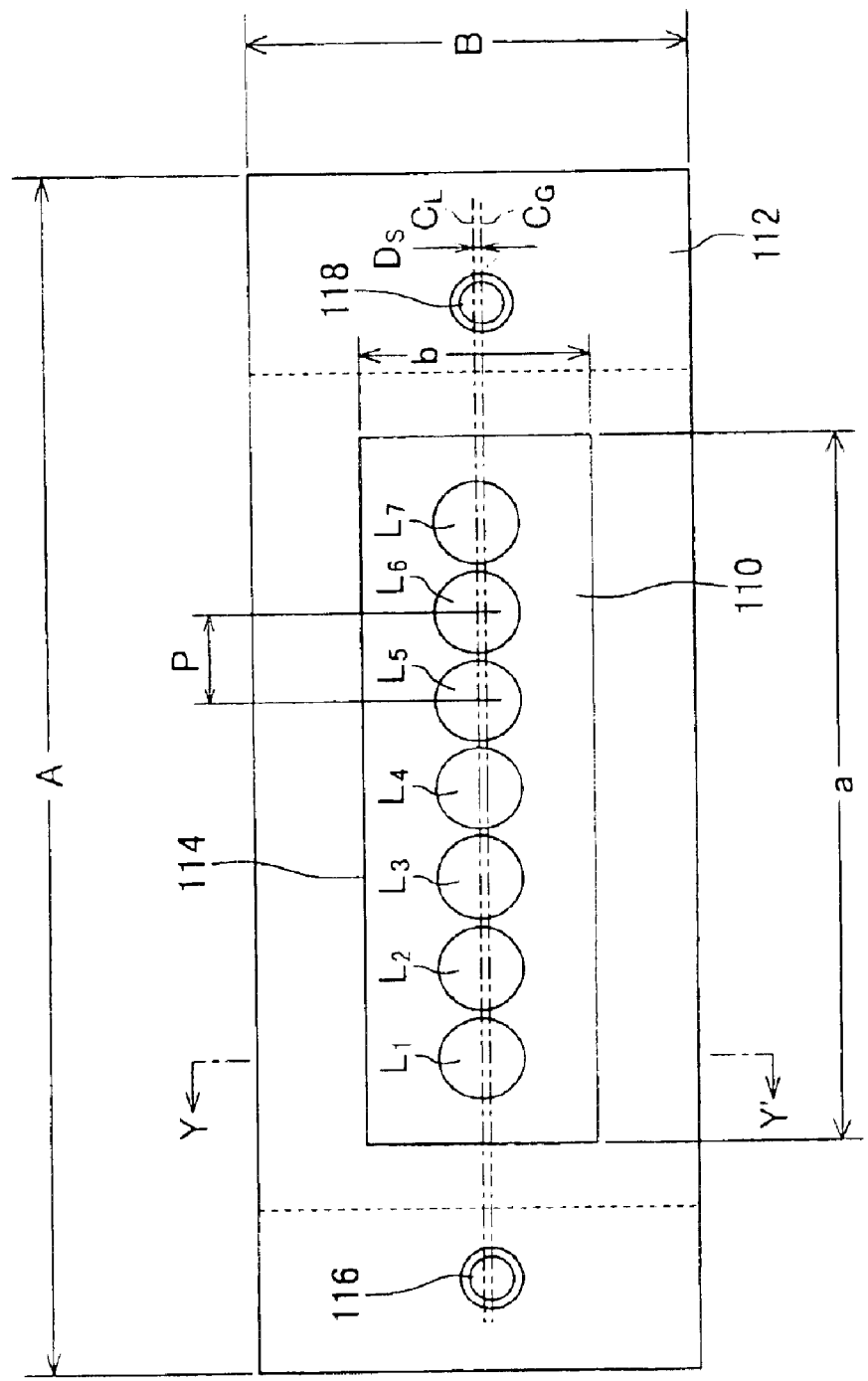
FIG. 53 is a plan view showing the plan layout of a micro lens array on the side of a lens forming surface according to another embodiment of the invention.

On the other principal surface of the substrate 110, a slanted surface forming region 120 may be formed such as shown in FIG. 29 and FIGS. 52 and 53. The slanted surface forming region 120 is formed with slanted surfaces to turn away the light, which is incident upon the lenses $L_1$ to $L_5$ from optical fibers $F_1$ to $F_5$ and reflected at the lenses, to the direction different from that of the incident light. For example, the slanted surface is formed by obliquely polishing the other principal surface of the substrate 110. The slanted surface forming region 120 will be later described with reference to FIGS. 52 to 53.

The coupling plate 112 is formed on the lens forming surface of the substrate 110 by thin film forming processes by using the lens position as a reference. It is therefore possible to set a position precision (error from a design position) of the coupling plate 112 relative to the lens position to ±0.2 μm and a position precision of the guide pin insertion holes 116 and 118 relative to the lens position to ±0.2 μm. Therefore, a fitting precision of the guide pins 132 and 134 relative to the guide pin insertion holes 116 and 118 can be set to ±0.3 μm. The guide pins 132 and 134 are made of stainless steel or ceramic and have a diameter of about 0.125 mm. The guide pins 132 and 134 have heads 132a and 134a having a diameter larger than that of the main bodies of the guide pins.

FIG. 29 shows an example of an assembly of an optical fiber array FA and the micro lens array LA. The optical fiber array FA holds the optical fibers $F_1$ to $F_5$ in holding grooves $H_1$ to $H_5$ juxtaposed in the upper region of an optical fiber holder 130. Guide pin holding grooves $P_1$ and $P_2$ are formed in the upper region of the optical holder 130 on both sides of a holding groove group including the grooves $H_1$ to $H_5$. Each of the holding grooves $H_1$ to $H_5$, $P_1$ and $P_2$ is a V-character shaped groove having a V-character shaped cross sectional view perpendicular to the longitudinal direction.

In assembling the micro lens array LA with the micro lens array LA, the guide pins 132 and 133 are inserted into (fitted in) the guide pin insertion holes 116 and 118 in the state that the surface (the surface of the slanted surface forming region 120) opposite to the lens forming surface of the substrate 110 is moved near at or in contact with the end face of the optical fiber array FA, to thereby make the guide pins 132 and 134 be held in the holding grooves $P_1$ and $P_2$ of the optical fiber holder 130. The guide pins 132 and 134 can be easily and smoothly inserted into the guide pin insertion holes 116 and 118 because the guide pins are inserted from the larger size side of the guide pin insertion holes. In the state that the optical fibers $F_1$ to $F_5$ and guide pins 132 and 134 are held in the holding grooves $H_1$ to $H_5$, $P_1$ and $P_2$, the optical fibers $F_1$ to $F_5$ and guide pins 132 and 134 are fixed by a pressure plate (not shown) such as a glass plate at the upper surface of the optical fiber holder 130 so as not to displace the fibers and guide pins in the holding grooves $H_1$ to $H_5$, $P_1$ and $P_2$.

Next, the position of the micro lens array LA is moved along the optical axis direction to make light emitted from each optical fiber and passed through the lens become collimated light. At the stage when the desired collimated light is obtained, the substrate 110 is fixed to the end face of the optical fiber array FA with adhesive. Since the adjustment work can be performed in the unit of micro lens array, the work efficiency can be improved. The micro lens array LA of this invention can achieve the position precision of ±0.5 μm or shorter relative to the optical fiber array.

The optical fiber array FA may have a plurality of holding holes for holding a plurality of optical fibers and holding holes for holding the guide pins 132 and 134 in a slidable manner. Optical components to be coupled are not limited only to an optical fiber array, but other components such as a light emitting device array and a light receiving device array may also be used. The micro lens array LA is not limited only to a one-side convex lens type but an array of a both-side convex lens type may also be used.

Next, description will be given on the manufacture method for a micro lens array of a one-side convex lens type with reference to FIGS. 30 to 54.

Figure 30:
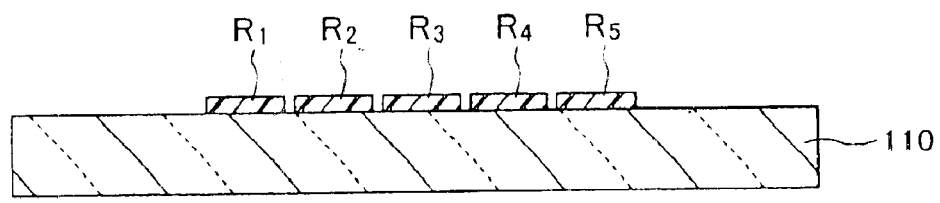
FIGS. 30 to 44 are cross sectional views illustrating an example of a micro lens array manufacture method, the method including a resist layer forming process (FIG. 30), a resist reflow process (FIG. 31), a lens forming process (FIG. 32), a resist layer forming process (FIG. 33), a sputtering process (FIG. 34), a lift-off process and a resist layer forming process (FIG. 35), a sputtering process (FIG. 36), a lift-off process and a resist layer forming process (FIG. 37), a resist layer forming process (FIG. 38), a selective plating process (FIG. 39), a sputtering process (FIG. 40), a resist removing process, a resist layer forming process and a selective plating process (FIG. 41), a mechanical working process (FIG. 42), a wax and substrate removing process and a resist removing process (FIG. 43) and a Cu film removing process (FIG. 44).

In a process shown in FIG. 30, resist layers $R_1$ to $R_5$ corresponding to five lenses are formed on one principal surface of a substrate 110 by photolithography.

Figure 31:
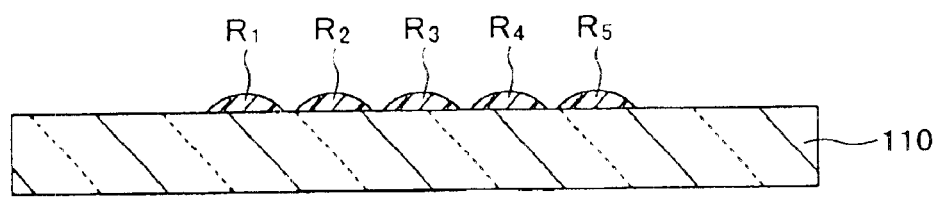

In a process shown in FIG. 31, the resist layers $R_1$ to $R_5$ are subjected to a heat reflow process to make each resist layer have a convex spherical shape.

Figure 32:
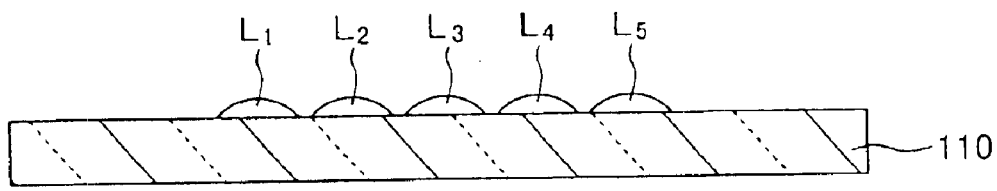

In a process shown in FIG. 32, the resist layers $R_1$ to $R_5$ and the surface of the quartz substrate 110 are subjected to a dry etching process to transfer the resist pattern of the resist layers $R_1$ to $R_5$ to the surface of the quartz substrate 110 and form convex lenses $L_1$ to $L_5$ corresponding to the resist layers $R_1$ to $R_5$.

Figure 33:
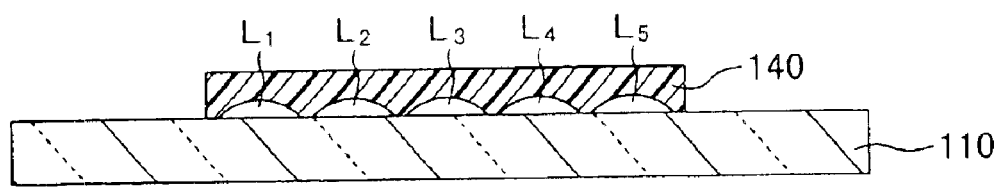

In a process shown in FIG. 33, a lift-off resist layer 140 is formed on the surface of the substrate 110 by photolithography. The resist layer 140 covers the lens group of lenses $L_1$ to $L_5$ and exposes the surface of the substrate 110 around the lens group.

Figure 34:
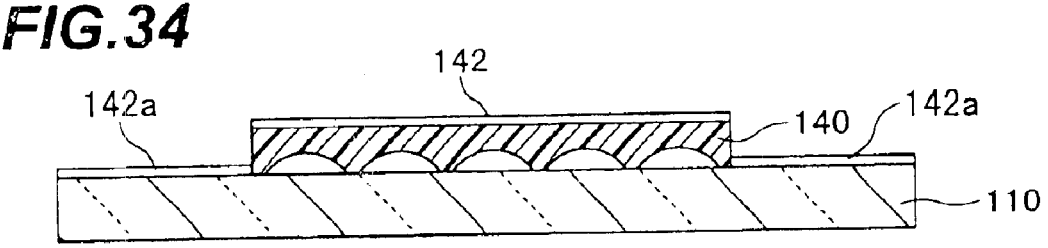

In a process shown in FIG. 34, for example, by sputtering Ni—Fe alloy on the substrate surface, Ni—Fe alloy films 142 and 142a are formed on the upper surfaces of the resist layer 140 and substrate 110, respectively. The Ni—Fe alloy film 142a surrounds the resist layer 140 and lenses $L_1$ to $L_5$ and is used as a plating seed film for a later plating process.

Figure 35:
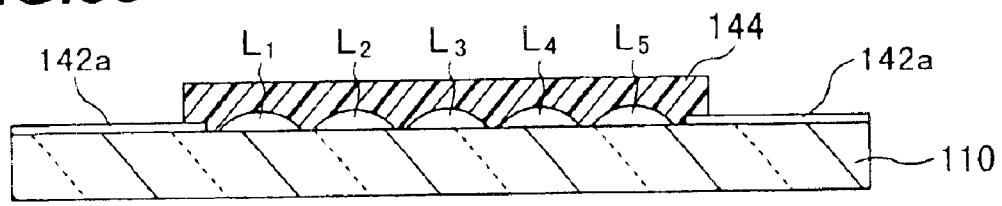

In a process shown in FIG. 35, the resist layer 140 together with the upper Ni—Fe alloy film 142 is removed and the Ni—Fe alloy film 142a on the substrate surface is left. A resist layer 144 is formed by photolithography, covering the lenses $L_1$ to $L_5$ and the inner peripheral area of the Ni—Fe alloy film 142a.

Figure 36:
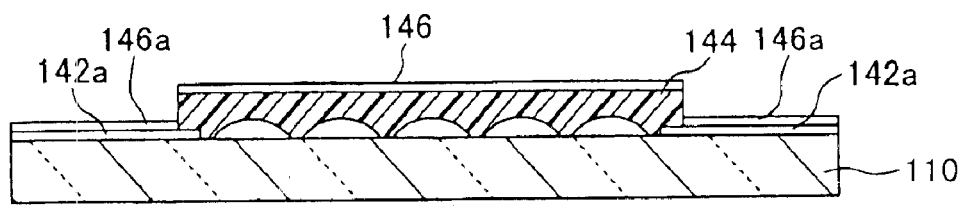

In a process shown in FIG. 36, for example, by sputtering Cu on the substrate surface, Cu films 146 and 146a are formed on the resist layer 144 and Ni—Fe alloy layer 142a, respectively. The Cu film 146a surrounds the lenses $L_1$ to $L_5$ and is used as a plating seed film in a later plating process. Although Ni—Fe alloy and Cu are used as the materials of the plating seed films 142a and 146a, other materials may be used if they are not etched at the same time.

Figure 37:
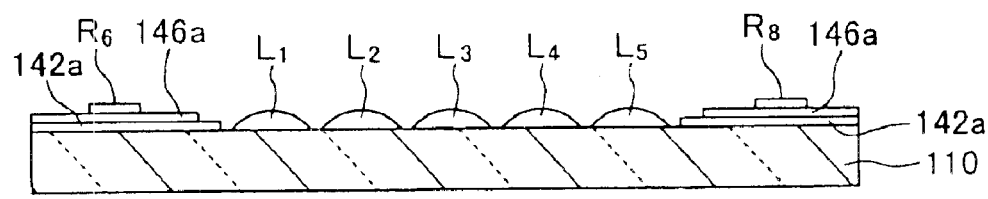

In a process shown in FIG. 37, the resist layer 144 together with the upper Cu film 146 is removed by lift-off to leave the Cu film 146a on the Ni—Fe alloy film 142a. The lenses $L_1$ to $L_5$ are therefore exposed in an area inside the N—Fe alloy film 142a.

Thereafter, resist patterns $R_6$ and $R_8$ are formed on the Cu film 146a on both sides of the lens array of lenses $L_1$ to $L_5$ by photolithography. The resist patterns $R_6$ and $R_8$ allow the size (diameter) of the opening of a guide pin insertion hole to gradually increase toward the bottom surface and have the size (diameter) slightly larger than that of the guide pin insertion hole.

Figure 38:
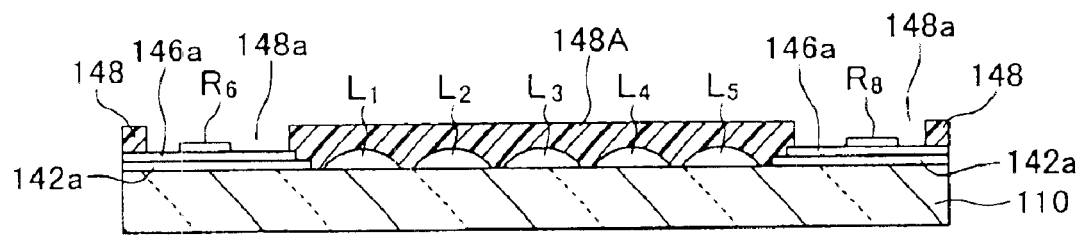

In a process shown in FIG. 38, a resist layer 148 having an opening and a resist pattern 148A in the opening are formed on the substrate surface by photolithography. The resist layer 148 is formed on the Cu film 146a and has a hole 148a corresponding to the pattern of the coupling plate. The resist pattern 148A covers in the hole 148a the lenses $L_1$ to $L_5$ and the inner peripheral area of the Ni—Fe alloy film 142a, in correspondence with the light transmission window pattern. In this case, although the resist pattern 148A covers also the inner peripheral area of the Cu film 146a, it may not cover this area.

Figure 39:
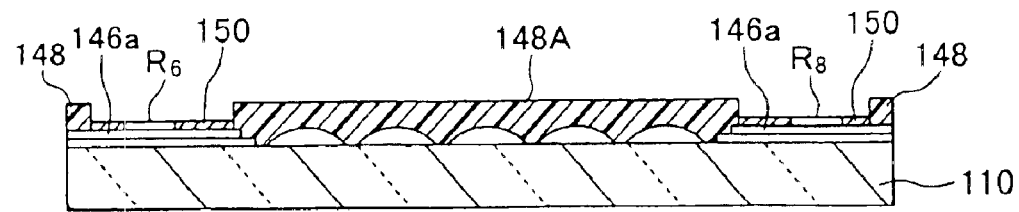

In a process shown in FIG. 39, by using as a mask, the resist layer 148, resist patterns 148A, $R_6$ and $R_8$, selective plating of Cu is performed to form a Cu film 150 to a thickness of several µm. The Cu layer 150 is used as the plating seed film in a plating process to be described later and also as a protective film for protecting the coupling plate from a dicing blade in a mechanical machining process to be described later.

Figure 40:
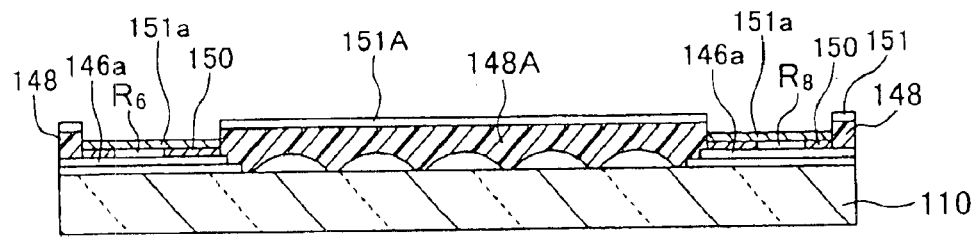

In a process shown in FIG. 40, by sputtering metal on the substrate surface, metal films 151, 151A and 151a are formed on the resist layer 148, on the resist pattern 148A and on the Cu film 150 and resist patterns $R_6$ and $R_8$, respectively. The metal to be sputtered is selected from a material which is not etched at the same time with Cu and Ni—Fe alloy, such as Cr.

Thereafter, the resist layer 148 and resist pattern 148A together with the upper metal films 151 and 151A formed on the substrate 110 shown in FIG. 40 are removed by lift-off to leave the metal film 151a covering the Cu film 150 and resist patterns $R_6$ and $R_8$. The metal film 51a is removed by etching to expose the Cu film 150 and resist patterns $R_6$ and $R_8$.

Figure 41:
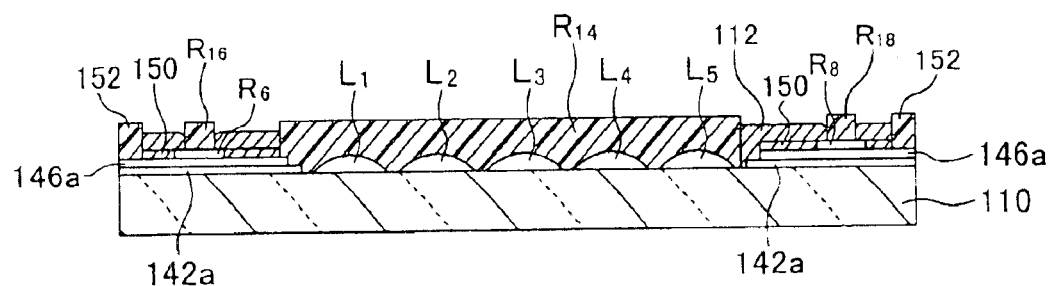

In a process shown in FIG. 41, a resist layer 152 having an opening and resist patterns $R_{14}$, $R_{16}$ and $R_{18}$ in the opening are formed on the substrate surface by photolithography. The resist layer 152 formed on the Cu film 152 has a hole similar to the hole 148a shown in FIG. 38. The resist pattern $R_{14}$ is formed in the hole of the resist layer 152, covering the lenses $L_1$ to $L_5$ in correspondence with the light transmission window pattern. The resist pattern $R_{14}$ may cover the inner peripheral area of the Ni—Fe alloy film 142a (in this case, the contact area of the plated metal with the Ni—Fe allow film 142a is large) or may not cover it. The resist patterns $R_{16}$ and $R_{18}$ are formed on the resist layers $R_6$ and $R_8$ to have a shape corresponding to the guide pin insertion hole pattern. The resist patterns $R_{16}$ and $R_{18}$ are formed to have the size (diameter) corresponding to that of the guide pin insertion hole.

Thereafter, by using the resist layer 152 and resist patterns $R_6$, $R_8$, and $R_{14}$ to $R_{18}$ as a mask, selective plating of Ni—Fe alloy is performed to form a coupling plate 112 made of Ni—Fe alloy. The upper region of the coupling plate 112 around the resist patterns $R_{16}$ and $R_{18}$ has a taper shape enlarging from the lower level to the upper level (a shape increasing the opening size at the upper level). The reason for this is that in the peripheral area of each resist pattern such as $R_{16}$, the Cu film 146a as the plating seed layer is covered with the resist pattern such as $R_{16}$ and the Cu film 150 as the plating seed layer has a circular void, so that a plating progress speed is slower in the peripheral area of the resist layer than in the area just above the Cu film 150. A thickness of the coupling plate 112 can be set to about 50 to 100 µm.

Figure 42:
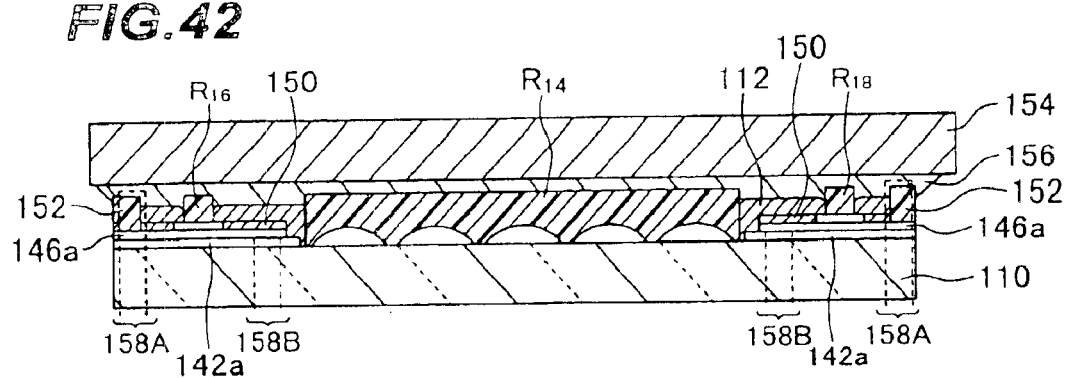

In a process shown in FIG. 42, the surface of the substrate 110 on the resist layer 152 side is fixed to the surface of a fixing plate 154 via a wax layer 156. In this fixed state, the substrate 110, Ni—Fe alloy film 142a, Cu films 146a and 150, resist pattern 152 and coupling plate 112 are cut with a dicing blade 158A along the contour of the final outer peripheral pattern (rectangular pattern) of the coupling plate 112. The substrate 110, Ni—Fe alloy film 142a and Cu film 146a are cut with a dicing blade 158B along the contour of the final outer peripheral pattern of the substrate 110. In this case, the coupling plate 112 is protected by the Cu film 150 from the dicing blade 158B. A cut groove 158b such as shown in FIG. 43 is formed in the substrate 110, Ni—Fe alloy film 142a and Cu film 146a.

Figure 43:
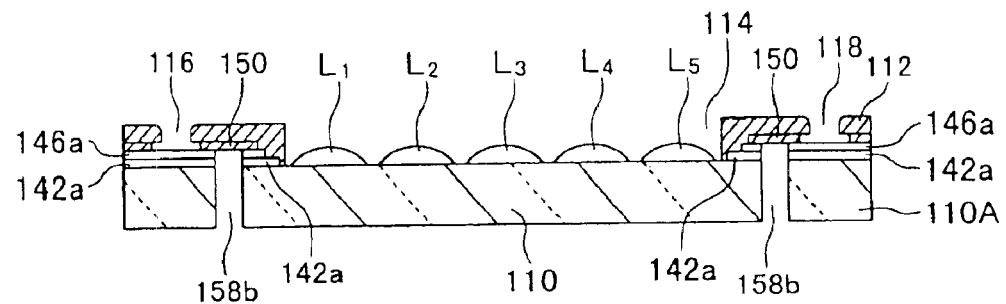

In a process shown in FIG. 43, the wax layer 156 is removed from the surface of the substrate 110 on the resist layer 152 side to separate the fixing plate 154 from the substrate 110. The region outside of the region cut with the dicing blade 158A near the peripheral region 110A of the substrate 110 is therefore removed.

Next, the resist patterns $R_{14}$, $R_{16}$, $R_{18}$, $R_6$ and $R_8$ are removed by chemicals or other means to provide the coupling plate 112 with the light transmission window 114 and guide pin insertion holes 116 and 118. The lenses $L_1$ to $L_5$ are exposed in the light transmission window 114. In the guide pin insertion holes 116 and 118, a partial surface of the Cu film 146a is exposed. Both the guide pin insertion holes 116 and 118 have the opening size gradually increasing at the upper level and have a larger size (diameter) at the position where the resist patterns $R_6$ and $R_8$ were removed.

Figure 44:
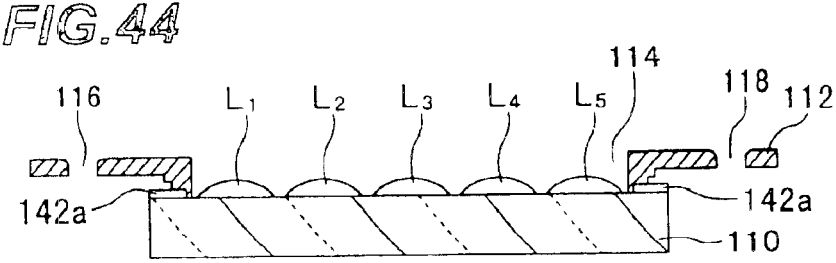

In a process shown in FIG. 44, the Cu films 146a and 150 are removed by etching. The peripheral region 110A of the substrate 110 is therefore removed along with the upper Ni—Fe alloy film 142a. A micro lens array can be formed having the coupling plate 112 made of Ni—Fe alloy integrally formed with the lens forming surface of the substrate 110 via the Ni—Fe alloy film 142a.

FIGS. 45 to 51 illustrate another manufacture method for a micro lens array. Like elements to those shown in FIGS. 30 to 44 are represented by identical reference numerals/characters and the detailed description thereof is omitted.

Figure 45:
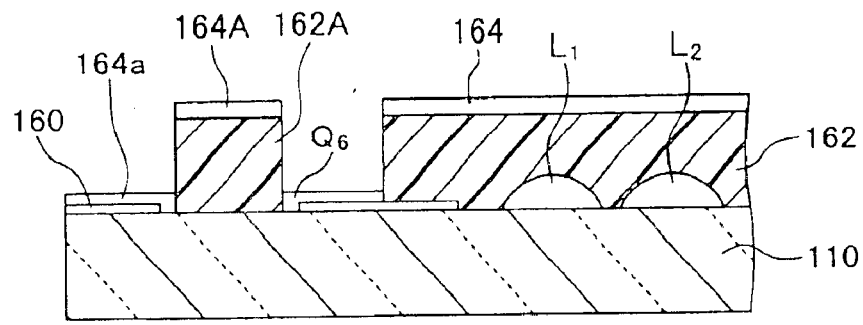
FIGS. 45 to 51 are cross sectional views illustrating another example of a micro lens array manufacture method, the method including a plating seed film forming process, a resist layer forming process and a sputtering process (FIG. 45), a lift-off process (FIG. 46), a resist reflow process (FIG. 47), a selective plating process (FIG. 48), a mechanical working process (FIG. 49), a wax and substrate removing process and a resist removing process (FIG. 50) and a Cu film removing process (FIG. 51).

In a process shown in FIG. 45, an N—Fe alloy film 160 as a plating seed film is formed on one principal surface of a quartz substrate 110 by a resist layer forming process and a sputtering and lift-off process similar to those described with reference to FIGS. 33 to 35. The Ni—Fe alloy film 160 surrounds a lens group including a lens $L_1$ and the like and has a hole $Q_6$ corresponding to a guide pin insertion hole. The size (diameter) of the hole $Q_6$ is slightly larger than that of the guide pin insertion hole.

Next, resist layers 162 and 162A are formed on the substrate surface by photolithography. The resist layer 162 covers a lens group including a lens $L_1$ and the like and the inner peripheral area of the Ni—Fe alloy film 160. The resist layer 162A has a circular column shape having a diameter slightly smaller than that of the hole $Q_6$. The hole $Q_6$ is a circular ring hole surrounding the resist layer 162A.

Thereafter, Cu is sputtered on the substrate surface to form Cu films 164, 164A and 164a on the resist layer 162, resist layer 162A and Ni—Fe alloy film 160, respectively. The Cu film 164a is filled in the hole $Q_6$. Similar to the Cu film 150 shown in FIG. 39, a thickness of the Cu film 164a is set to a total thickness of the Cu film 164a and Cu film 150 in order to provide the Cu film 164a with the function of a protective film for a dicing blade.

Figure 46:
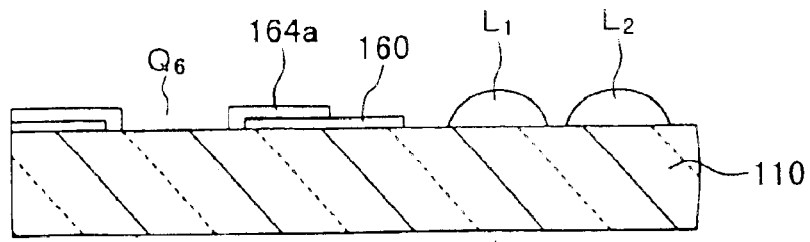

In a process shown in FIG. 46, the Cu films 164 and 164A together with the upper resist layers 162 and 162A are removed by lift-off and the Cu film 164a is left. The lenses such as $L_1$ are therefore exposed and the hole $Q_6$ has a circle shape.

Figure 47:
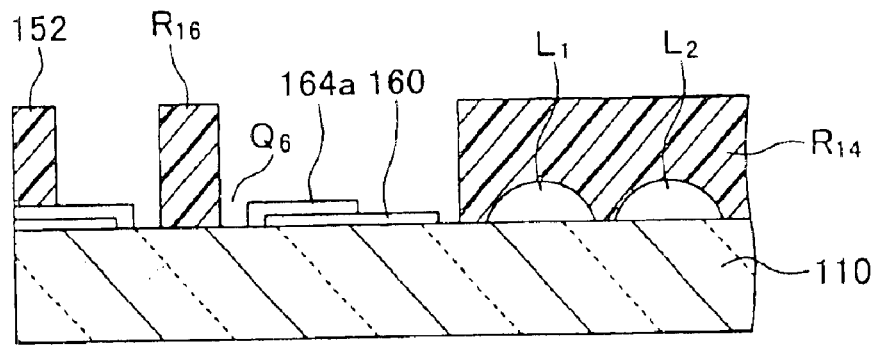

In a process shown in FIG. 47, similar to the process described with reference to FIG. 41, a resist layer 152 having resist patterns $R_{14}$ and $R_{16}$ are formed on the substrate surface. The resist layer 152 formed on the Cu film 164a has a hole similar to the hole 148a shown in FIG. 38. The resist pattern $R_{14}$ corresponds to the transmission window pattern and covers the lens group including the lens $L_1$ and the like in the hole of the resist layer 152. The resist pattern $R_{14}$ exposes a closed loop area of the substrate surface and is spaced apart slightly from the edge of the Ni—Fe alloy film 160. This layout allows the size of the light transmission window to gradually increase at the upper level and a contact area between the Cu film 160 and plated metal to increase.

The resist pattern $R_{16}$ is of a circular column shape having a pattern corresponding to the guide pin insertion hole in the hole $Q_6$. The size (diameter) of the resist pattern $R_{16}$ corresponds to that of the guide pin insertion hole and is slightly smaller than that of the hole $Q_6$. The hole $Q_6$ exposes a circular ring area of the substrate surface. This layout allows the size of the opening of the guide pin insertion hole to gradually increase at the upper level.

Figure 48:
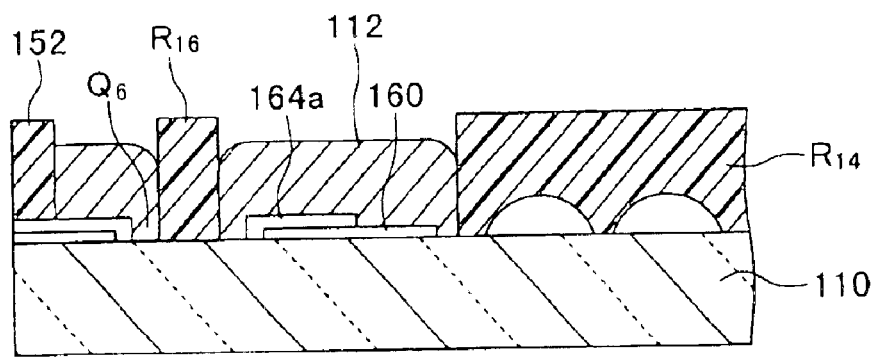

In a process shown in FIG. 48, by using the resist layer 152 and resist patterns $R_{14}$ and $R_{16}$, selective plating of Ni—Fe alloy is performed to form a coupling made of Ni—Fe alloy. The upper region of the coupling plate 112 around the resist pattern $R_{16}$ has a taper shape from the lower level to the upper level (a shape gradually increasing the size of the opening of the guide pin insertion hole at the upper level), whereas the upper region of the coupling plate 112 around the resist pattern $R_{14}$ has a taper shape enlarging from the lower level to the upper level (a shape increasing the size of the opening of the light transmission window at the upper level). The reason for this is that in the peripheral area of the resist pattern $R_{14}$ or $R_{16}$, the Ni—Fe alloy film 160 or Cu film 164a as the plating underlying layer has a closed loop void or circular ring void, so that a plating progress speed is slower in the peripheral area of the resist pattern than the area just above the Ni—Fe alloy film 160 or Cu film 164a.

Figure 49:
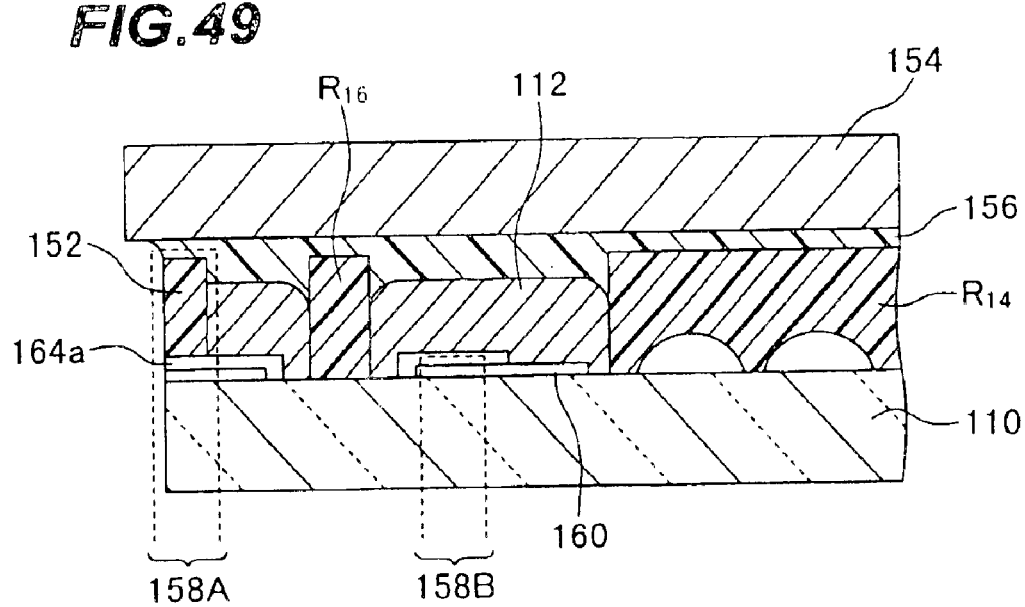
Figure 50:
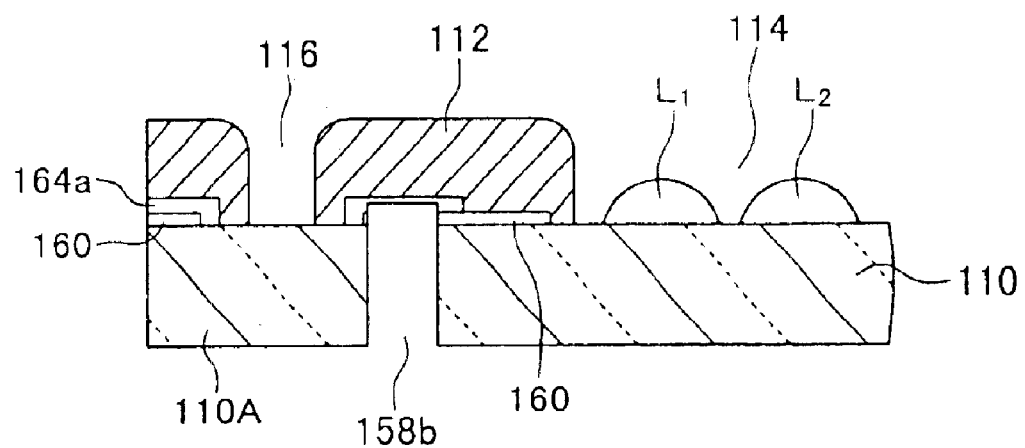

In a process shown in FIG. 49, the surface of the substrate 110 on the resist layer 152 side is fixed to the surface of a fixing plate 154 via a wax layer 156. In this fixed state, a mechanical work is performed in a manner similar to that using the dicing blades 58A and 58B and described with reference to FIG. 42. A cut groove 158b such as shown in FIG. 50 is therefore formed in the substrate 110, Ni—Fe alloy film 160 and Cu film 164a. The coupling plate 112 is protected by the Cu film 164a from the dicing blade 158B.

In a process shown in FIG. 50, the wax layer 156 and the fixing plate 154 are removed in a manner similar to that described with reference to FIG. 43. The region outside of the region cut with the dicing blade 158A, if any, near the peripheral area 110A of the substrate 110, is therefore removed. Thereafter, the resist patterns $R_{14}$ and $R_{16}$ are removed by chemicals or other means to provide the coupling plate 112 with the light transmission window 114 and guide pin insertion hole 116.

Figure 51:
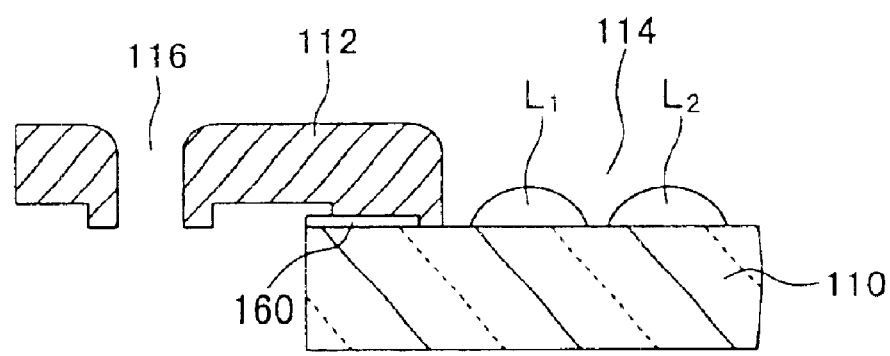

In a process shown in FIG. 51, the Cu film 164a is removed by etching. The peripheral area 110A of the substrate 110 is therefore removed along with the Ni—Fe alloy film 160. A micro lens array can be formed having the coupling plate 112 made of Ni—Fe alloy integrally formed with the lens forming surface of the substrate 110 via the Ni—Fe alloy film 160. Although a half of the micro lens array is shown in FIGS. 45 to 51, the remaining half can be manufactured in a similar manner.

According to the manufacture methods for a micro lens array described with reference to FIGS. 30 to 51, both the photolithography process for the lenses $L_1$ to $L_5$ and the photolithography process for the coupling plate 112 can be performed by using the position alignment mark M (not shown) formed on the substrate 110 as a reference of a demagnification projection aligner. A good position precision can be obtained corresponding to an error of $\pm 0.2$ μm or shorter relative to the design position, all for the lenses such as $L_1$, light transmission window 114 and guide pin insertion holes 116 and 118.

The manufacture method for a micro lens array described with reference to FIGS. 45 to 51 has the following additional effects (a) and (b) can be obtained.

In the process shown in FIG. 41, since the resist patterns $R_6$ and $R_8$ exist under the resist patterns $R_{16}$ and $R_{18}$, even if resist is etched in the process shown in FIG. 43 and Cu is etched in the process shown in FIG. 44, resist may be left in the guide pin insertion holes 116 and 118 of the coupling plate 112 so that contamination occurs easily. The contamination lowers the position alignment precision of inserting the guide pins into the guide pin insertion holes 116 and 118 of the coupling plate 112 shown in FIG. 29. In contrast, in the process shown in FIG. 48, the plating process is performed in the state that no resist layer exists under the resist pattern $R_{16}$ so that the amount of resident resist attached to the coupling plate 112 is small and contamination can be mitigated. The position alignment precision of inserting the guide pins into the guide pin insertion holes 116 and 118 of the coupling plate 112 can therefore be improved.

(b) The processes shown in FIGS. 37 to 41 are complicated because it is necessary to form the resist pattern $R_6$ and $R_8$, form the Cu film 150 and metal film 151a and remove the metal film 151a. In contrast, in the processes shown in FIGS. 45 to 48, the complicated processes are not necessary but the number of processes can be reduced and the manufacture yield of coupling plates 112 can be improved.

Figure 54:
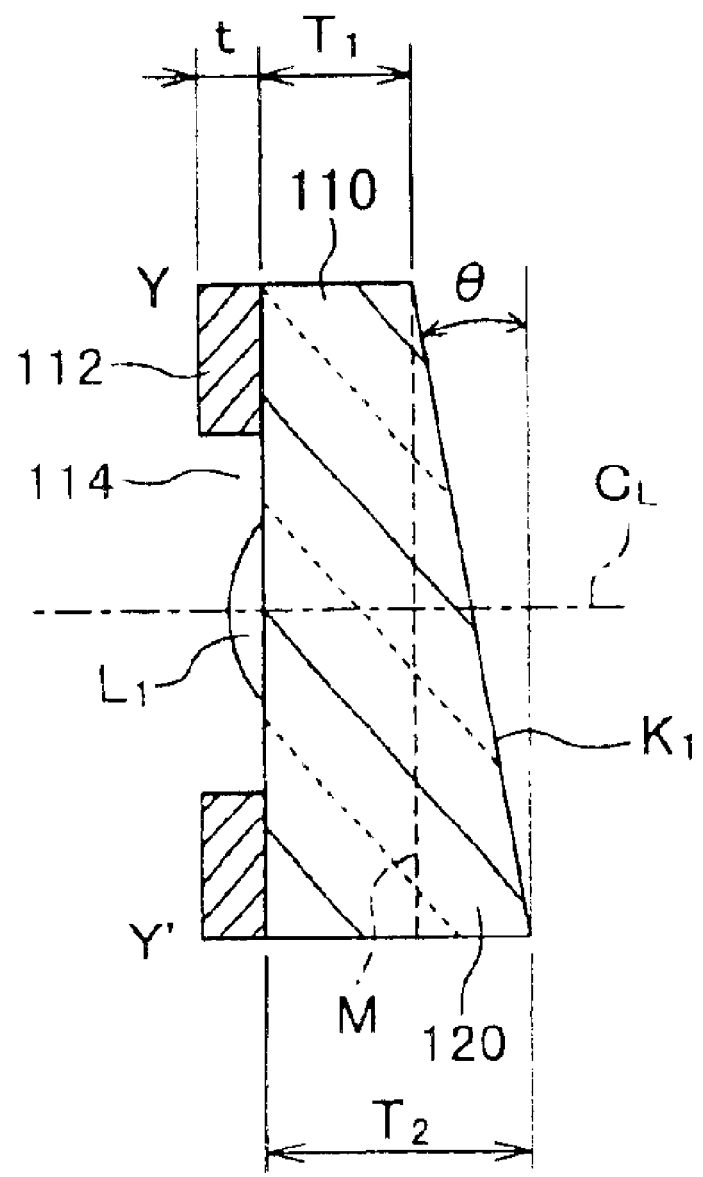
FIG. 54 is a cross sectional view taken along line Y–Y' shown in FIG. 53.

FIG. 52 shows an optical fiber coupling system using micro lens arrays. Micro lens arrays LA and LA' are used which are manufactured by a method according to another embodiment of the invention. The micro lens arrays LA and LA' have the same structure. The plan layout of the micro lens array LA on the lens forming surface side is shown in FIG. 53, and the cross sectional view taken along line Y–Y' shown in FIGS. 53 is shown in FIG. 54. Like elements to those shown in FIGS. 28 and 29 are represented by identical reference numerals/characters and the detailed description thereof is omitted.

In the optical fiber coupling system shown in FIG. 52, light emitted from an optical fiber $F_1$ is incident upon the micro lens array LA. The micro lens array LA has a quartz substrate 110. On one principal surface of the substrate 110, convex lenses $L_1$ to $L_7$ are formed in line as shown in FIGS. 52 to 54, and on the other principal surface of the substrate 110, a slanted surface forming region 120 having a slanted surface $K_1$ is formed as shown in FIGS. 52 and 54. The slanted surface $K_1$ is provided to make the direction of light Sr emitted from the optical fiber $F_1$ and reflected at the lens $L_1$ be different from that of incident light upon the lens $L_1$. In this embodiment, one slanted surface forming region 120 common to all seven lenses $L_1$ to $L_7$ is provided to turn the reflection light Sr to the direction perpendicular to the array direction of the lenses $L_1$ to $L_7$. For example, the slanted surface forming region 120 can be formed by obliquely polishing the surface of the substrate 110. Assuming that a plane M is parallel to the surface of the substrate 110 as shown in FIG. 54, an angle θ of the slanted surface $K_1$ relative to the plane M is about 5 to 15° (preferably 8°). If the plane M is the surface of the substrate 110 (θ=0°), the lens center of the lens $L_1$ is coincident with the optical axis $L_C$.

As the slanted surface $K_1$ is used as the other principal surface of the substrate 110, light is refracted by the slanted surface $K_1$ as shown in FIG. 52 so that the center of the lens $L_1$ is shifted from the optical axis $L_C$. In order to obtain an optical path along which light S emitted from the optical fiber $F_1$ passes straightforward along the center of the lens $L_1$, the front face of the optical fiber $F_1$ is made to have a slanted surface having the angle θ and be parallel to the slanted surface $K_1$. In this case, light refracted slightly upward from the optical axis $L_C$ is made incident upon the slanted surface $K_1$ in order to output light refracted slightly downward at the slanted surface $K_1$ from the center of the lens $L_1$.

In the micro lens array LA', on one principal surface of a quartz substrate 110' corresponding to the substrate 110, a convex lens $L_{10}$ corresponding to the lens $L_1$ is formed, and on the other principal surface of the substrate 110', a slated surface forming region 120' corresponding to the slanted surface forming region 120' is formed. Similar to the slanted surface $K_1$, the slanted surface forming region 120' forms a slanted surface $K_{10}$ having an angle θ. Light S output from the lens $L_1$ propagates straightforward in parallel to the optical axis $L_C$ and becomes incident upon the center of the lens $L_{10}$. The light is slightly refracted at the slanted surface $K_{10}$ and becomes incident upon an optical fiber $F_{10}$ along the optical axis.

The different points of the micro lens array LA shown in FIGS. 52 to 54 from the micro lens array LA shown in FIGS. 28 and 29 reside first in that instead of the five lenses formed on the surface of the substrate 110, seven lenses $L_1$ to $L_7$ are in line in such a manner the line interconnecting the centers of the lenses $L_1$ to $L_7$ forms a straight line $C_L$, and second in that the centers of the guide pin insertion holes 116 and 118 are disposed on a straight line $C_G$ shifted in parallel by a distance $D_S$ from a straight line $C_L$ on both sides of the lens group including the lenses $L_1$ to $L_7$. The distance $D_S$ is determined by a shift of the optical axis from the lens center to be caused by the slanted surface $K_1$.

In the micro lens array LA, the diameter of each lens such as $L_1$ formed on the quartz substrate 110 may be 0.5 mm, and the pitch adjacent lenses (distance between adjacent lens centers) P may be 0.5 mm. The longer side length A of the coupling plate 112 may be 8.5 mm and the shorter side length B may be 1.5 mm. The longer side length a of the light transmission window 114 may be 3.5 mm and the shorter side length b may be 1 mm. The guide pin insertion holes 116 and 118 may be 0.125 mm and the thickness may be 0.1 mm. If the angle θ is set to 8°, the thickness $T_1$ of the substrate 110 is 1.04 mm at one side, the thickness $T_2$ at the opposing side is about 1.25 mm, and the distance $D_S$ between the straight lines $C_L$ and $C_G$ is about 13 μm.

Instead of providing one slanted surface forming region 120 common to all lenses $L_1$ to $L_7$, the slanted surface forming region 120 may be provided for each lens. The direction of the slanted surface $K_1$ is not limited only to that perpendicular to the array direction of the lenses $L_1$ to $L_7$, but any direction may be adopted so long as the reflection light turns away from the optical fiber.

Figure 55:
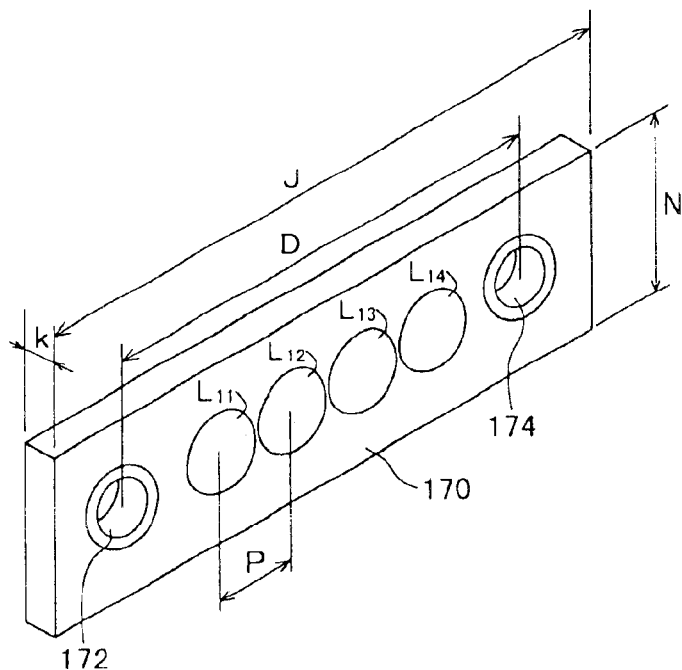
FIG. 55 is a perspective view of a micro lens array according to another embodiment of the invention.

FIG. 55 shows a micro lens array according to another embodiment of the invention. This micro lens array is made of a silicon substrate 170.

On one principal surface of the substrate 170, convex lenses $L_{11}$ to $L_{14}$ are disposed in line. On both sides of the lens array including the lenses $L_{11}$ to $L_{14}$, guide pin insertion holes 172 and 174 are formed. The guide pin insertion holes 172 and 174 are formed increasing the size (diameter) toward the one principal surface.

For example, the substrate 170 is rectangular and may have a longer side length J of 8 mm, shorter side length N of 2 mm and a thickness of 0.28 mm. The diameter of the lenses $L_{11}$ to $L_{14}$ may be 0.99 mm and the pitch P between adjacent lenses may be 1 mm. The distance between the guide pin insertion holes 172 and 174 may be 7 mm.

In coupling an optical component such as an optical fiber to the micro lens array shown in FIG. 55, similar to the manner described with reference to FIG. 29, in the state that guide pins are inserted in the guide pin insertion holes 172 and 174, the guide pins are inserted into two guide pin insertion grooves (or holes) of the optical component. Similar to the micro lens array shown in FIG. 28, coupling to the optical component can be achieved at a position alignment precision of ±0.5 μm.

The micro lens array shown in FIG. 55 may adopt the structure similar to that described with reference to FIGS. 52 to 54. Namely, the lenses $L_{11}$ to $L_{14}$ are disposed in line on one principal surface of the substrate 170 along a straight line interconnecting the centers of the lenses, and a slanted surface for suppressing reflection return light is formed on the other principal surface of the substrate 170. The guide pin insertion holes 172 and 174 are formed on both sides of the lens array including the lenses $L_{11}$ to $L_{14}$, at such positions as the centers of the guide pin insertion holes are shifted from the straight line interconnecting the lens centers by an amount corresponding to the shift of the optical axis from the lens centers caused by the slanted surface. With this layout, similar to that described with reference to FIGS. 52 to 54, a proper optical path coincident with the lens center can be attained by simply coupling the micro lens array to the optical component by using a plurality of guide pins.

FIGS. 56 to 62 illustrate a manufacture method for the micro lens array shown in FIG. 55.

Figure 56:
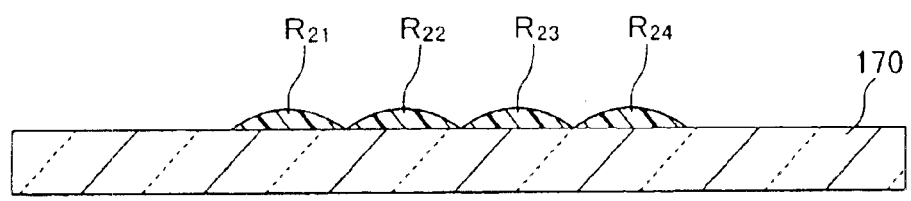
FIGS. 56 to 62 are cross sectional views illustrating an example of a method of manufacturing the micro lens array shown in FIG. 55, the method including a resist layer forming process (FIG. 56), a lens forming process (FIG. 57), a resist layer forming process (FIG. 58), a selective etching process (FIG. 59), a resist removing process and a resist layer forming process (FIG. 60), a selective etching process (FIG. 61) and a resist removing process and a polishing process (FIG. 62).

In a process shown in FIG. 56, resist patterns $R_{21}$ to $R_{24}$ corresponding to four lenses are formed on one principal surface of a silicon substrate 170 by photolithography. The resist patterns are subjected to a heat reflow process to make each resist pattern have a convex spherical shape.

Figure 57:
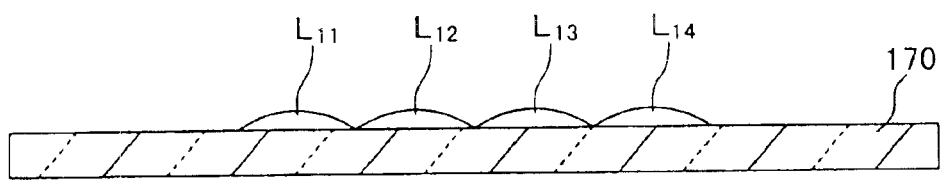

In a process shown in FIG. 57, the resist patterns $R_{21}$ to $R_{24}$ and the surface of the substrate 170 are subjected to a dry etching process to transfer the lens patterns of the resist patterns $R_{21}$ to $R_{24}$ to the substrate surface to form convex lenses $L_{11}$ to $L_{14}$ corresponding to the resist patterns $R_{21}$ to $R_{24}$.

Figure 58:
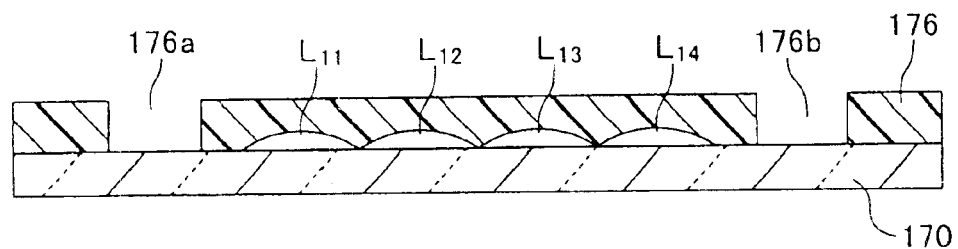

In a process shown in FIG. 58, a resist layer 176 is formed on the surface of the substrate 170 by photolithography, the resist layer covering the lenses $L_{11}$ to $L_{14}$ and having holes 176a and 176b corresponding to two guide pin insertion holes.

Figure 59:
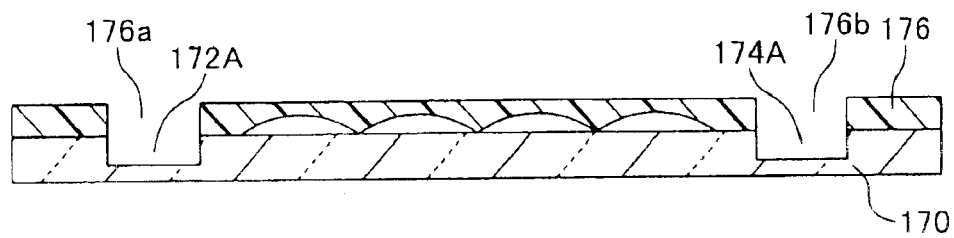

In a process shown in FIG. 59, by using the resist layer 176 as a mask, the substrate 170 is dry-etched to form recesses 172A and 174A corresponding to the holes 176a and 176b.

Figure 60:
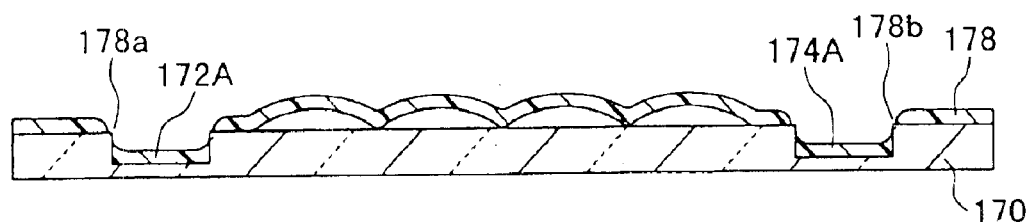

In a process shown in FIG. 60, after the resist layer 176 is removed by chemicals or other means, a resist layer 178 is formed on the surface of the substrate 170 by photolithography. The resist layer 78 is formed in such a manner that holes 178a and 178b exposing the corners of the recesses 172A and 174A formed by utilizing the phenomenon that resist stays in the recesses 172A and 174A.

Figure 61:
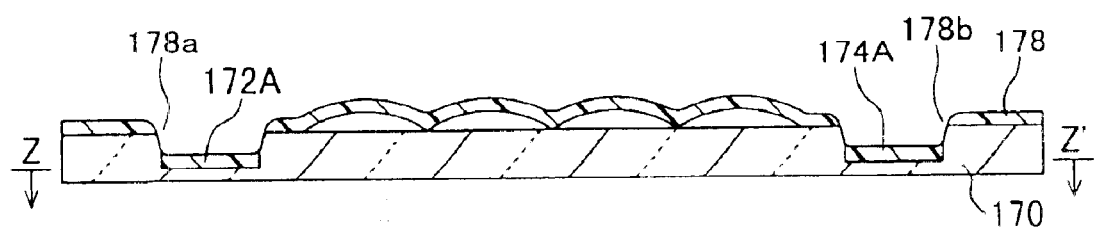

In a process shown in FIG. 61, by using the resist layer 178 as a mask, the corners exposed in the recesses 172A and 174A are rounded by dry- or wet-etching. The sizes of the openings of the recesses 172A and 174A gradually increase toward the upper level.

Figure 62:
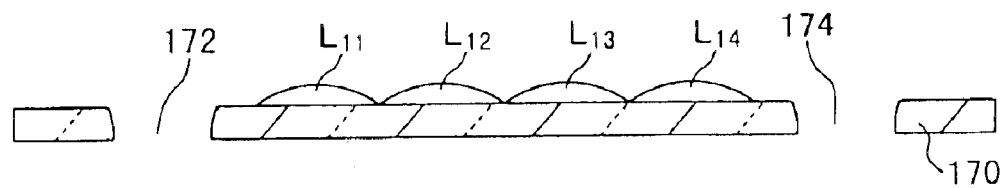

In a process shown in FIG. 62, after the resist layer 178 is removed by chemicals or other means, the other principal surface of the substrate 170 is polished to the bottom surfaces of the recesses 172A and 174A to remove the substrate 170 to line Z–Z' shown in FIG. 61 and obtain a flat bottom surface. A micro lens array is therefore obtained having the lenses $L_{11}$ to $L_{14}$ formed on the surface of the substrate 170 and the guide pin insertion holes 172 and 174 formed on both sides of the lens array including the lenses $L_{11}$ to $L_{14}$.

In the micro lens array manufacture methods described above, although the linear array of the micro lenses $L_1$ to $L_5$ or the lenses $L_{11}$ to $L_{14}$ is used, a two-dimensional array of a plurality of lenses may be manufactured in a similar manner.

In the above-described embodiment, a high precision of the size and position of guide pin insertion holes can be obtained because the guide pin insertion holes are formed by thin film forming processes. If the substrate is made of quartz or silicon, while the guide pins are inserted in or pulled out of the guide pin insertion holes, the region defining the holes may be cleaved or cracked. In the following, embodiments suppressing cleavage and crack will be described.

Figure 63:
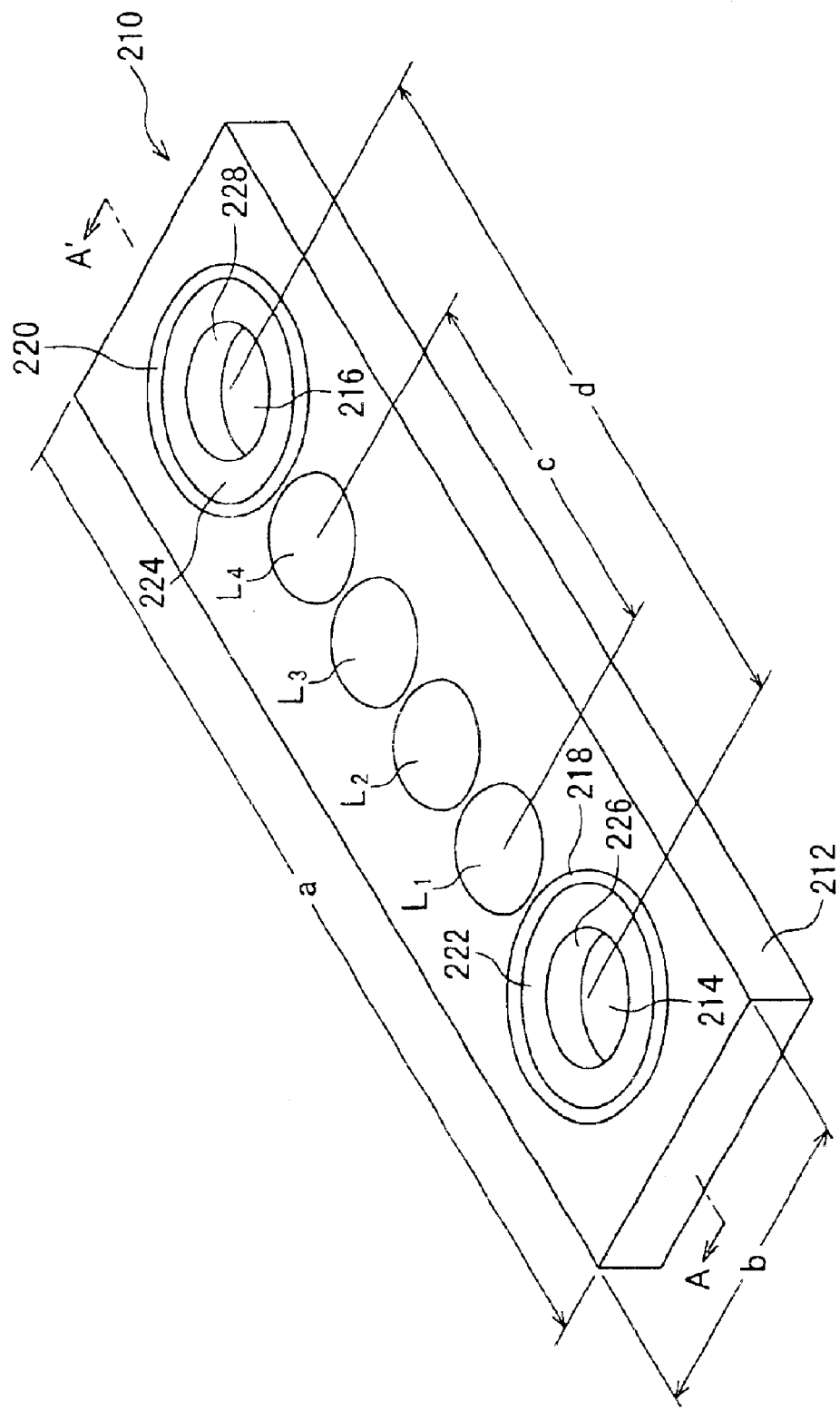
FIG. 63 is a perspective view of a micro lens array according to another embodiment of the invention.
Figure 64:
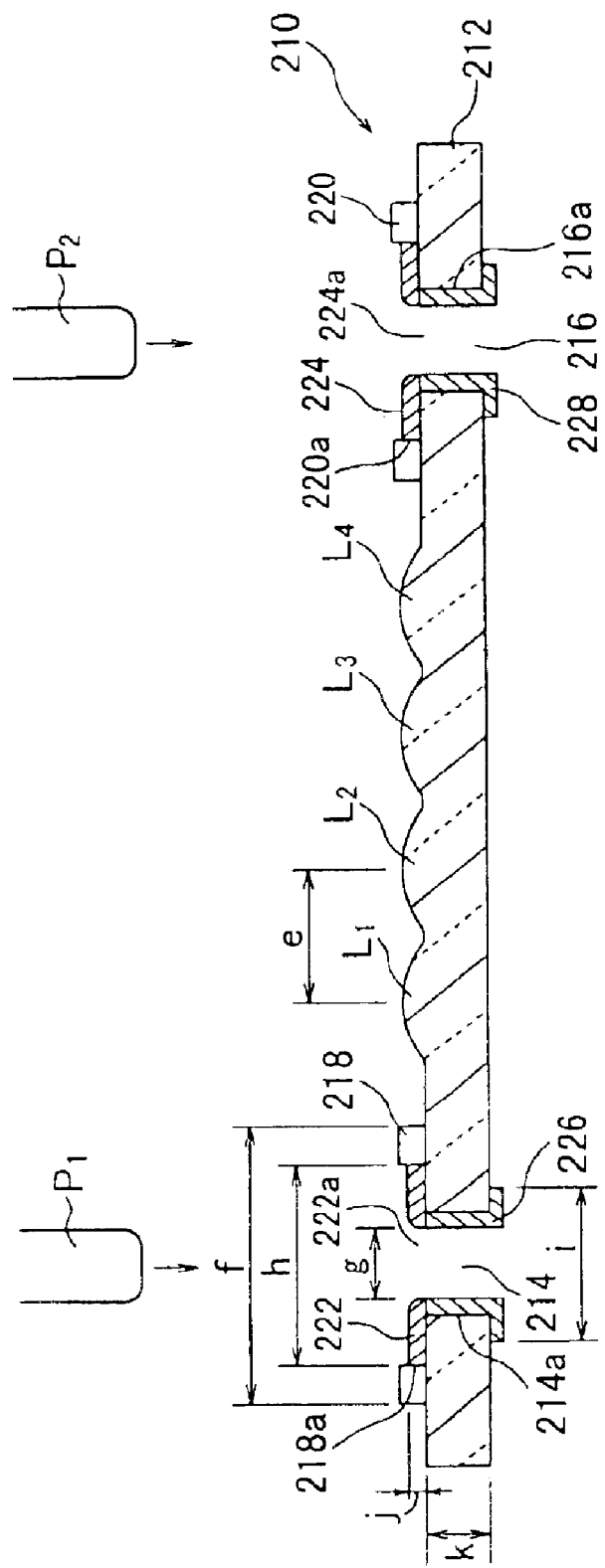
FIG. 64 is a cross sectional view taken along line A–A' shown in FIG. 63.

FIG. 63 shows a micro lens array according to an embodiment of the invention, and FIG. 64 is a cross sectional view of the micro lens array taken along line A–A' shown in FIG. 63.

A micro lens array 210 has a transparent substrate 212 made of nonmetal material such as quartz and convex spherical lenses $L_1$ to $L_4$ disposed in line on one principal surface of the substrate 212. Each lens such as $L_1$ is formed by transferring the convex spherical lens pattern made of resist to the surface of the substrate by dry etching.

Ring-shape positioning layers 218 and 220 made of, for example, resist, are formed on both sides of the lens array including the lenses $L_1$ to $L_4$. Since the positioning layers 218 and 220 can be formed at a good position precision (at a precision of submicron) by photolithography, the position precision of the lenses $L_1$ to $L_4$ is also good. Through holes 214a and 216a for forming guide pin insertion holes are formed through the substrate at the centers of the positioning layers 218 and 220 by using a precision drill or the like. The through holes 214a and 216a pass through the substrate 212 from the one surface to other surface.

Ring-shape metal plates 222 and 224 made of, for example, Ni—Fe alloy, are fitted around inner holes 218a and 220 of the positioning layers 218 and 220. The metal plates 222 and 224 have pin insertion holes 222a and 224a and are formed by thin film forming processes at a precision of submicron. The pin insertion holes 222a and 224a have a smaller size (diameter) than that of the through holes 214a and 216a, and gradually increase the size outward (at an upper level) at the inner wall on the side opposite to the through holes.

Metal layers 226 and 228 made of, for example, Ni—Fe alloy, cover the inner walls of the through holes 214a and 216a. This covered surfaces define the guide pin insertion holes 214 and 216. The guide pin insertion holes 214 and 216 have a size (diameter) smaller than that of the through holes 214a and 216a by an amount corresponding to the thickness of the metal layers 226 and 228. The metal layers 226 and 228 are formed continuously with the metal plates 222 and 224, and cover the opening end peripheral areas of the through holes 214a and 216a (like flanges) on the other surface of the substrate 212. These the metal layers 226 and 228 are formed in the following manner for example. Nonmetal hole forming pins are inserted into the pin insertion holes 222a and 224a and protruded from the other surface of the substrate 212 via the through holes 214a and 216a. In this state, by using the metal plates 222 and 224 as plating seed layers, a plating process is performed to form the plated layers 226 and 228. Thereafter, the hole forming pins are pulled out of the pin insertion holes 222a and 224a and metal layers 226 and 228. The guide pin insertion holes 214 and 216 have the size (diameter) approximately equal to that of the pin insertion holes 222a and 224a and are formed continuously with the pin insertion holes 222a and 224a. In the use state of the micro lens array 210, the guide pins $P_1$ and $P_2$ are inserted into the guide pin insertion holes 214 and 216.

The micro lens array 210 shown in FIGS. 63 and 64 has the following size for example. The length a, width b and thickness k of the substrate 212 are 6.5 mm, 1.5 mm and 0.5 mm, respectively. The opening diameter of each lens such as $L_1$ is 0.24 mm, the distance c between the centers of the lenses $L_1$ and $L_4$ is 0.75 mm, and the pitch (between the centers) e of adjacent lenses such as $L_1$ and $L_2$ is 0.25 mm. The inner diameter h, outer diameter f and thickness j of the positioning layer such as the layer 218 are 2.0 mm, 2.4 mm and 0.08 mm, respectively. The diameter g of the guide pin insertion hole such as the hole 214 is 0.7 mm, the distance d between the centers of the guide pin insertion holes 214 and 216 is 4.6 mm, the outer diameter i of the flange portion of the through hole such as the hole 214a is 1 mm, and the diameter of the guide pin such as the pin $P_1$ is 0.7 mm.

In coupling an optical component such as an optical fiber to the micro lens array 210, in the state that guide pins $P_1$ and $P_2$ are inserted in the guide pin insertion holes 214 and 216, the guide pins $P_1$ and $P_2$ are inserted into two guide pin insertion grooves (or holes) of the optical component, and they are fixed together when necessary. A positioning error of the metal plate such as the plate 222 relative to the positioning layer such as the layer 218 is about 1 μm. Even if this error is added to the outer diameter error of the guide pin such s the $P_1$ and the size error of the pin insertion hole such as the hole 222a, the guide pin such as the pin $P_1$ can be fixed at a precision of 2 μm or smaller relative to the center of the lens such as the lens $L_1$.

When the guide pin such as the pin $P_1$ is inserted into and pulled out of the guide pin insertion hole such as the hole 214, the guide pin such as the pin $P_1$ contacts the metal layer such as the layer 226. It is possible to prevent cleavage and crack at the opening end of the through hole such as the hole 214a of the quartz substrate 212. The metal layer such as the layer 226 is terminated at the metal plate such as the plate 226 on the one principal surface side of the substrate 212 and at the flange portion of the metal layer such as the layer 226 on the other principal surface side of the substrate 212 so that it is possible to prevent the metal layer such as the layer 226 from being removed while the guide pin such as the pin $P_1$ is inserted into or pulled out of the guide pin insertion hole. Since the pin insertion hole such as the hole 122a increases the size outward on the side metal plate side opposite to the through hole, it is easy to insert a hole forming pin into the pin insertion hole such as the hole 222a, ensure tight fitting between the pin and hole and insert the guide pin into the guide pin insertion hole such as the hole 214.

Next, with reference to FIGS. 65 to 75, an example of the manufacture method for such a micro lens array will be described. In FIGS. 65 to 75, like elements to those shown in FIGS. 63 and 64 are represented by using identical reference numerals/characters.

Figure 65:
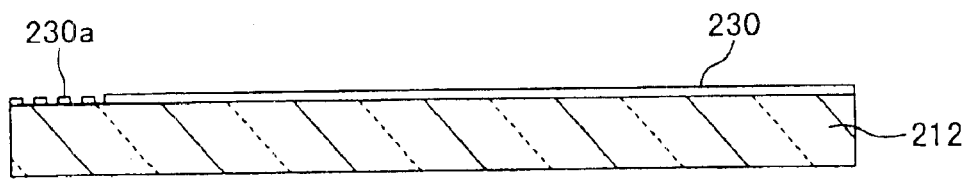
FIGS. 65 to 75 are cross sectional views illustrating an example of a micro lens array manufacture method according to the invention, the method including a resist layer forming process (FIG. 65), a sputtering process and a lift-off process (FIG. 66), a resist layer forming process (FIG. 67), a heat reflow process and a protective film forming process (FIG. 68), a dry etching process (FIG. 69), a positioning layer forming process (FIG. 70), a hole forming process (FIG. 71), a lower surface polishing process (FIG. 72), a preparatory plating process (FIG. 73), a plating process (FIG. 74) and a plating mask removing process (FIG. 75).
Figure 66:
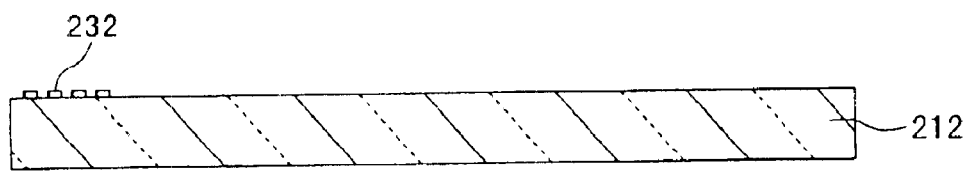

In a process shown in FIG. 65, on one principal surface (upper surface) of a transparent substrate 212 made of quartz for example, a resist layer 230 is formed which has a position alignment mark forming pattern 230a.

In a process shown in FIG. 64, a Cr layer is formed by sputtering on the upper surface of the substrate 212, covering the pattern 230a and resist layer 230. A thickness of the Cr layer may be 300 nm. After the Cr layer is formed, the resist layer 230 and upper Cr layer are removed (lifted off) to form a Cr position alignment mark 232 corresponding to the pattern 230a on the upper surface of the substrate 212.

Figure 67:
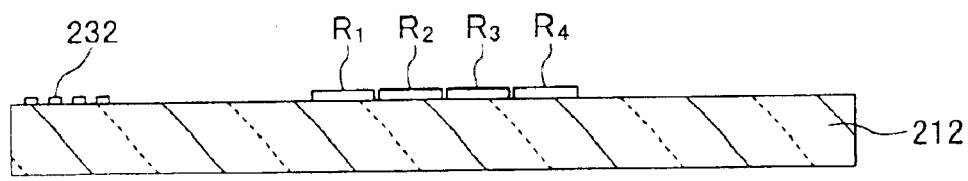

In a process shown in FIG. 67, resist patterns $R_1$ to $R_4$ corresponding to four lenses are formed on the upper surface of the substrate 212 by photolithography. This photolithography process is performed by using the position alignment mark 232 as a reference.

Figure 68:
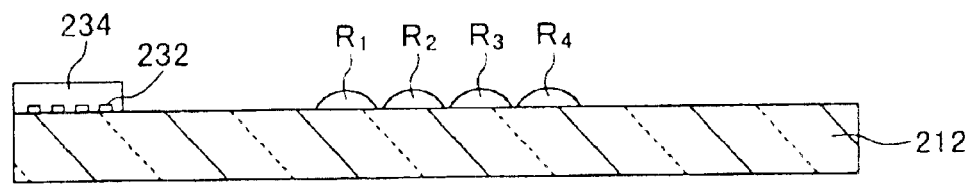

In a process shown in FIG. 68, the resist patterns $R_1$ to $R_4$ are subjected to a heat reflow process to make them have a convex spherical shape. A protective layer 234 such as a Kapton tape is formed covering the position alignment mark 232. This protective layer prevents the position alignment mark 232 from being removed in an etching process shown in FIG. 69.

Figure 69:
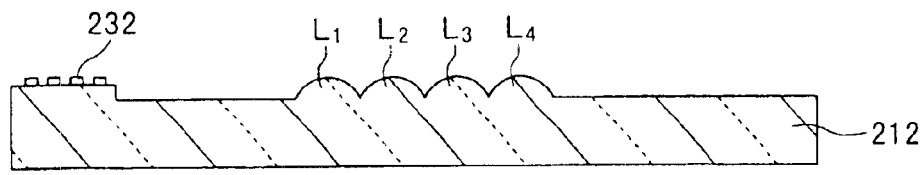

In a process shown in FIG. 69, convex spherical lens patterns of the resist patterns $R_1$ to $R_4$ are transferred to the upper surface of the substrate 212 by dry etching to form convex spherical lenses $L_1$ to $L_4$. Etching gas to be used in this dry etching process may be fluorine containing etching gas such as $CHF_3$, $CF_4$ and $C_3F_8$ or mixture gas of this fluorine containing gas and gas such as Ar, $O_2$ and $H_2$. After the lenses $L_1$ to $L_4$ are formed, the protective layer 234 is removed to expose the position alignment mark 232.

Figure 70:
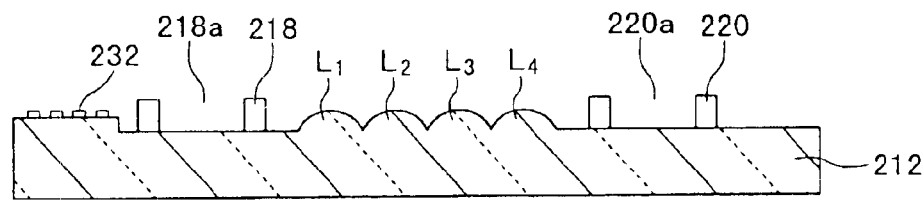
Figure 76:
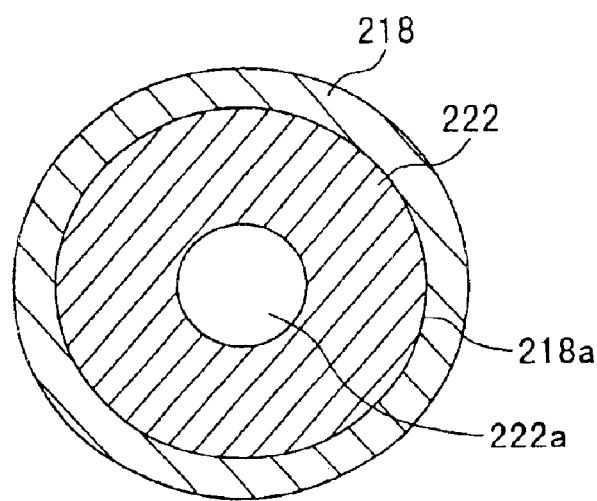
FIG. 76 is a top view showing the state that a metal plate is fitted in an inner hole of a positioning layer.

In a process shown in FIG. 70, positioning patterns 218 and 220 made of, for example, resin, are formed on the upper surface of the substrate 212 on both sides of the lens array including the lenses $L_1$ to $L_4$ by photolithography. The photolithography process is performed by using the position alignment mark 232 as a reference. The positioning patterns 218 and 220 are formed to have a pattern such as shown in FIG. 76. The positioning patterns 218 and 220 are formed at a precision of submicron and have a good position precision relative to the lenses such as the lens $L_1$.

Figure 71:
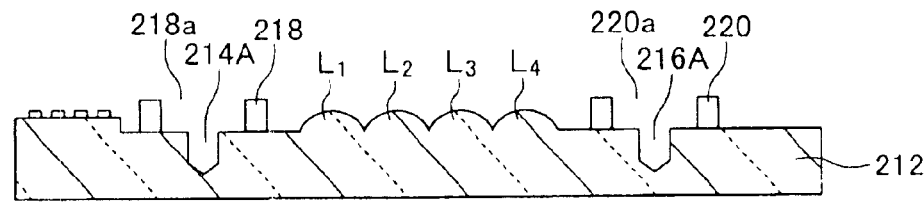

In a process shown in FIG. 71, half-through holes 214A and 216A are formed in the upper surface of the substrate 212 in the central areas of the positioning patterns 218 and 220 by using a precision drill. If through holes are formed, crack is likely to be formed at the opening end peripheral area of the thorough hole when the precision drill penetrates through the substrate 212. From this reason, the half-through holes are formed. The size (diameter) of the half-through hole such as the hole 214A has a margin relative to the guide pin such as the pin $P_1$. If the diameter of the guide pin such as the pin $P_1$ is 0.7 mm, the size of the half-through hole may be 0.8 mm.

Figure 72:
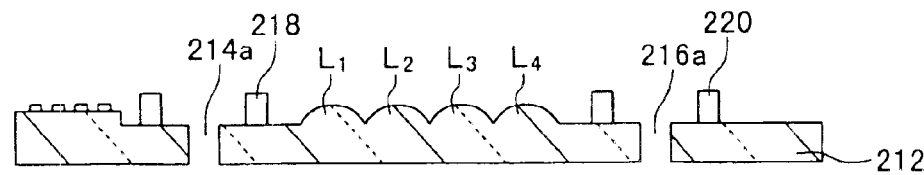

In a process shown in FIG. 72, the lower surface of the substrate 212 is polished to the effective depth of the half-through holes 214A and 216A to change the half-through holes 214A and 216A to through holes 214a and 216a.

Figure 73:
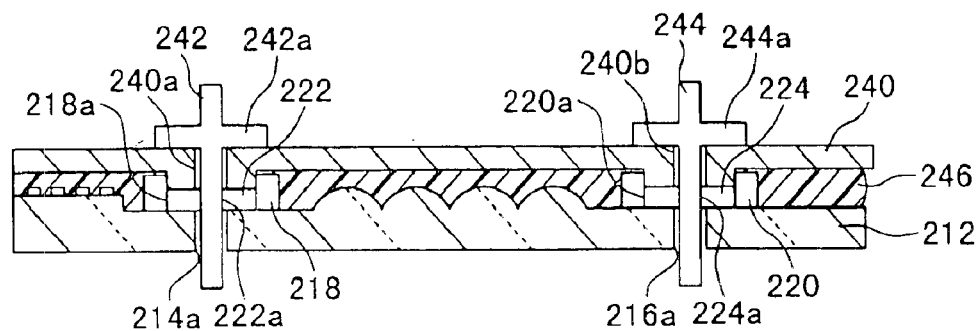

In a process shown in FIG. 73, ring-shape metal plates 222 and 224 are fitted in inner holes 218a and 220a of the positioning patterns 218 and 220. FIG. 76 is a top view showing the metal plate 222 fitted in the inner hole 218a of the positioning pattern 218. The metal plate 224 fitted in the inner hole 220a of the positioning pattern 220 has a similar view to that of FIG. 76. The metal plates 222 and 224 have pin insertion holes 222a and 224a which can be formed at high precision by a thin film forming process to be described later.

A plating electrode plate 240 has the size and shape covering the upper surface of the substrate 212 and has first and second downward projections capable of being fitted in the inner holes of the positioning patterns 218 and 220. The plating electrode plate 240 has a first insertion hole 240a passing through the plating electrode plate from the upper surface thereof and through the second projection, and a second insertion hole 240b passing through the plating electrode plate from the upper surface thereof and through the first projection. Nonmetal hole forming pins 242 and 244 made of ceramic for example are inserted into the first and second pin insertion holes 240a and 240b. The hole forming pins 242 and 244 have flanges 242a and 244a.

The first and second downward projections are fitted in the positioning patterns 218 and 220 (placed on the metal plates 222 and 224) to stack the plating electrode 240 on the upper surface of the substrate 212, and thereafter the hole forming pins 242 and 244 are inserted into the pin insertion holes 240a and 240b and pin insertion holes 222a and 224a and extended out of the other surface of the substrate 212 via the through holes 214a and 216a. The hole forming pins 242 and 244 abut on the upper surface of the plating electrode plate 240 because of the flanges 242a and 244a. A plating mask material is filled in a space between the outer region of the downward projections of the plating electrode plate 240 and the substrate 212 to thereby form a plating mask layer 246. Plating mask material such as resin is also filled in the spaces between the hole forming pin 242 and the inner wall of the pin insertion hole 240a and between the hole forming pin 244 and the inner wall of the pin insertion hole 240b.

Figure 74:
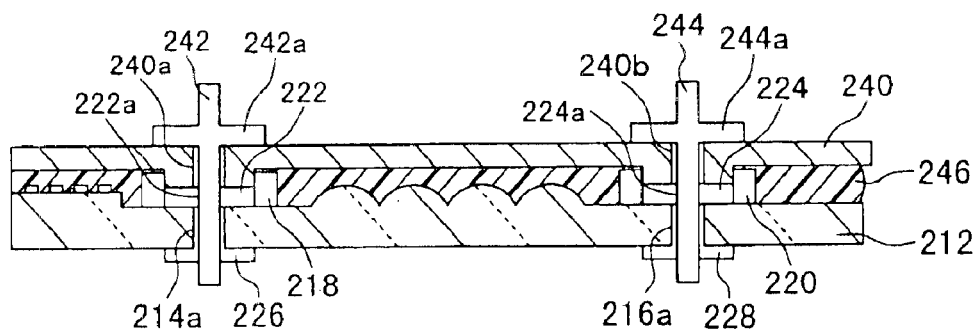

In a process shown in FIG. 74, in the plating standby state described with reference to FIG. 73, current is flowed to the plating electrode plate 240 to perform plating of Ni—Fe alloy for example, by using the metal plates 222 and 224 as plating seed plates, to thereby form metal layers 226 and 228 of N—Fe alloy. The metal layers 226 and 228 cover the inner walls of the through holes 214a and 216a and cover (form flanges) the opening end peripheral areas of the through holes 214a and 216a on the other surface side of the substrate 212.

Figure 75:
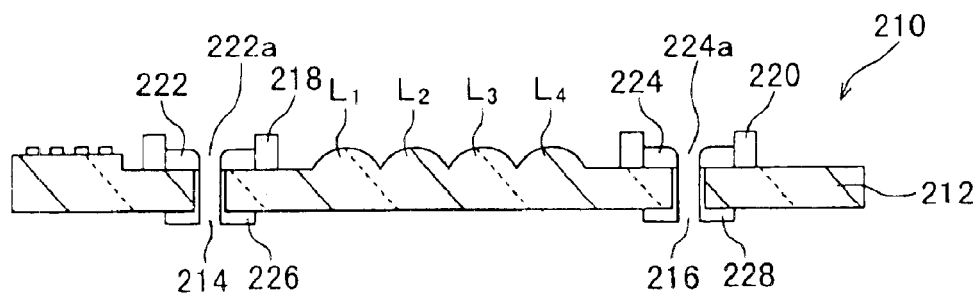

In a process shown in FIG. 75, the hole forming pin 242 is pulled out of the pin insertion holes 240a and 222a and the metal layer 226, and the hole forming pin 244 is pulled out of the pin insertion holes 240b and 224a and the metal layer 228. The plating mask material such as resist in the pin insertion holes 240a and 240b as well as the plating mask layer 246 is removed by using organic solvent to separate the plating electrode plate 240 from the upper surface of the substrate 212. A micro lens array 210 can therefore be manufactured which has on one principal surface of the substrate 212 the lenses $L_1$ to $L_4$, positioning patterns 218 and 220 and metal plates 222 and 224, and the guide pin insertion holes 214 and 216 continuous with the pin insertion holes 222a and 224a in the metal layers 226 and 216.

Since the positioning patterns 218 and 220 are made of negative resist, it cannot be removed by organic solvent. The positioning patterns 218 and 220 are left so that they can be used as the spacers for an optical device (laser diodes, photodiodes or the like) disposed on the upper surface (surface for forming the lenses $L_1$ to $L_4$) of the substrate 212.

Figure 77:
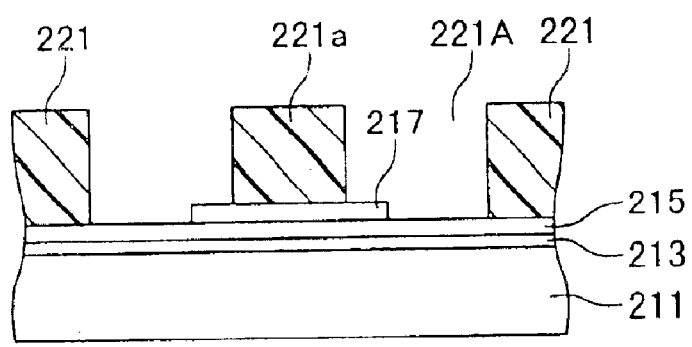
FIGS. 77 to 79 are cross sectional views illustrating an example of a metal plate forming method, the method including a resist layer forming process (FIG. 77), a plating process (FIG. 78) and a resist removing process and a metal plate separating process (FIG. 79).
Figure 78:
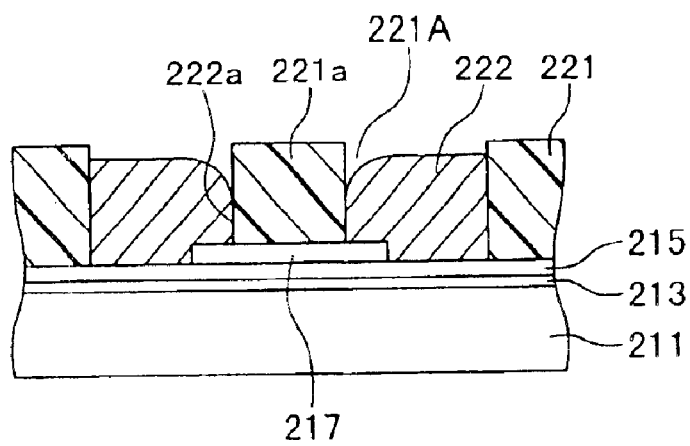
Figure 79:
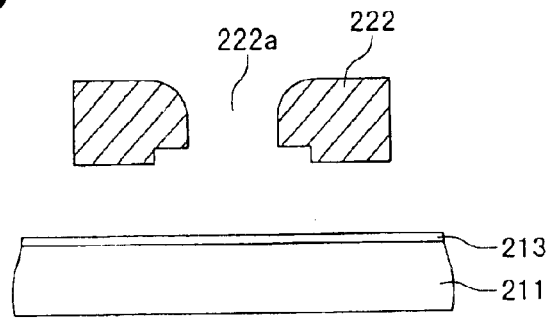

FIGS. 77 to 79 illustrate an example of a method of forming the metal plate.

In a process shown in FIG. 77, on one principal surface of a substrate 211 made of quartz for example, a Cr layer 213 and a Cu layer 215 are sequentially formed by sputtering. The thicknesses of the Cr layer 213 and Cu layer 215 may be 30 nm and 300 nm, respectively. The Cr layer 213 is used for improving tight adhesion of the Cu layer 215, and the Cu layer 215 is used as a plating seed layer.

Next, a resist layer 217 is formed on the Cu layer by photolithography. The resist layer 217 is formed in order to allow the pin insertion hole 222a shown in FIG. 79 to gradually increase its opening size at the upper level. The resist layer 217 has a circular plan pattern and has a size (diameter) slightly larger than that of the pin insertion hole 222a. Thereafter, a resist layer 221 is formed on the Cu layer and a resist pattern 221a is formed on the resist layer 217 by photolithography. The resist layer 221 has a circular hole 221A corresponding to the outer shape of the metal plate 222 shown in FIGS. 76 and 79 and surrounding the resist pattern 217. The resist pattern 221a is provided in order to form the pin insertion hole 222a shown in FIGS. 76 and 79, and has a circular plan pattern and the size (diameter) nearly equal to that of the pin insertion hole 222a.

In a process shown in FIG. 78, by using the resist layers 217 and 221 and resist pattern 221a as a mask, selective plating of Ni—Fe alloy is performed to form a metal plate 222 made of Ni—Fe alloy on the Cu layer 215. Since the resist layer 217 exists, the plating speed becomes slow in the peripheral area of the resist pattern 221a so that the pin insertion hole 222a of the metal plate 222 gradually increases its opening size at the upper level.

In a process shown in FIG. 79, the resist layer 221, resist pattern 221a and resist layer 217 are removed by chemicals or other means. The Cu layer 215 is removed by etching to separate the metal plate 222 from the substrate 211. The metal plate 222 having the pin insertion hole 222a can therefore be obtained. The metal plate 222 shown in FIG. 73 can also be formed at a precision of submicron similar to the metal plate 222. The substrate 211 having the Cr layer 213 can be reused by forming the Cu layer 215 in the process shown in FIG. 77.

Figure 80:
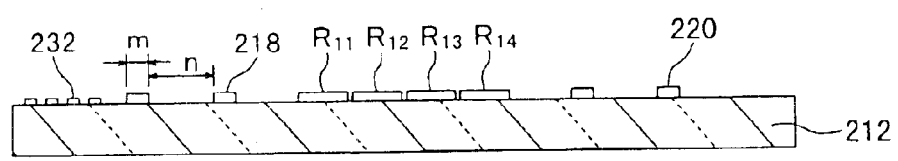
FIGS. 80 to 93 are cross sectional views illustrating another example of a micro lens array manufacture method according to the invention, the method including a resist layer forming process (FIG. 80), a heat reflow process (FIG. 81), a protective layer forming process (FIG. 82), a dry etching process (FIG. 83), a hole forming process (FIG. 84), a lower surface polishing process (FIG. 85), a substrate fixing process (FIG. 86), a resist coating process (FIG. 87), a resist patterning process (FIG. 88), a resist coating process (FIG. 89), a resist patterning process (FIG. 90), a plating process (FIG. 91), a resist removing process (FIG. 92) and a substrate separating process (FIG. 93).

FIGS. 80 to 93 illustrate another example of a method of forming a micro lens array. In a process shown in FIG. 80, on one principal surface (upper surface) of a transparent substrate 212 made of quartz for example, a position alignment mark 232 is formed in a manner similar to that described with reference to FIGS. 65 to 66.

Next, resist patterns $R_{11}$ to $R_{14}$ and resist positioning patterns 218 and 220 are formed on the upper surface of the substrate 212 by photolithography. This photolithography process is performed by using the position alignment mark 232 as a reference. The resist layers $R_{11}$ to $R_{14}$ correspond to four lenses. The positioning pattern 218 has a ring plan pattern such as shown in FIG. 76. The width m of the positioning layer 218 may be 100 μm, and the diameter a of an inner hole 218a thereof may be 0.8 mm. The positioning layer 220 is formed in the manner similar to the positioning layer 218.

Figure 81:
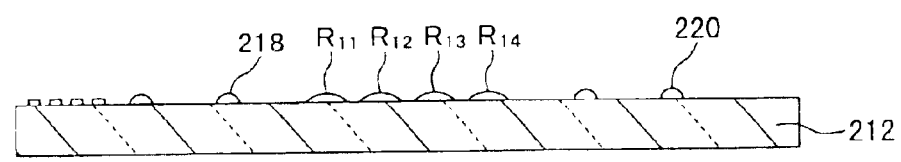

In a process shown in FIG. 81, the resist patterns $R_{11}$ to $R_{14}$ and the positioning patterns 218 and 220 are subjected to a heat reflow process to make the resist patterns have a convex spherical shape and make the positioning patterns have a semicircle cross section along a width direction.

Figure 82:
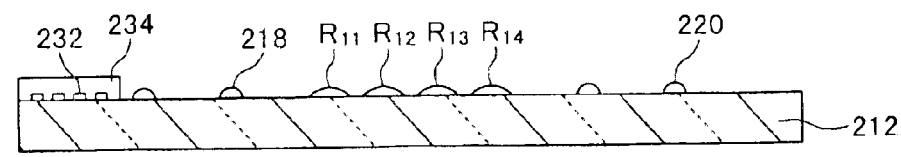

In a process shown in FIG. 82, a protective layer 234 such as a Kapton tape is formed on the upper surface of the substrate 212, covering the position alignment mark 232. This protective layer prevents the position alignment mark 232 from being removed in an etching process shown in FIG. 83.

Figure 83:
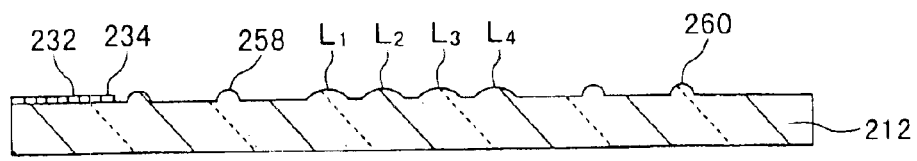

In a process shown in FIG. 83, convex spherical lens patterns of the resist patterns $R_{11}$ to $R_{14}$ are transferred to the upper surface of the substrate 212 by dry etching in a manner similar to that described with reference to FIG. 69, to form convex spherical lenses $L_1$ to $L_4$. With this etching process, the ring-shape patterns of the positioning layers 218 and 220 are also transferred to the upper surface of the substrate 212 to form ring-shape positioning projections 258 and 260. The positioning projections 258 and 260 have the similar cross section as that of the positioning patterns 218 and 220 shown in FIG. 82 and their cross section along the width direction is a semicircle. After the dry etching process, the protective layer 234 is removed to expose the position alignment mark 232.

Figure 84:
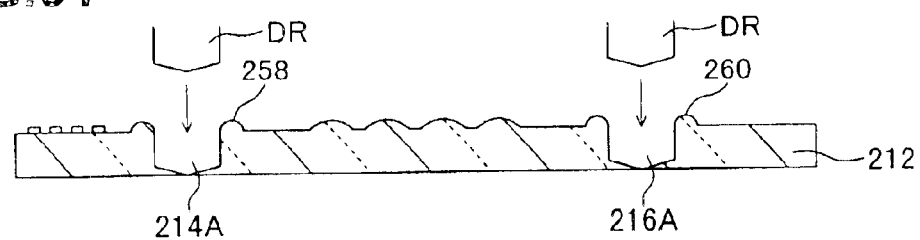

In a process shown in FIG. 84, half-through holes 214A and 216A are formed in the inner holes of the ring-shape positioning projections 258 and 260 by using a precision drill DR. The diameter of the half-through holes 214A and 216A may be nearly equal to a diameter (e.g., 0.8 mm) of the inner holes of the positioning projections 258 and 260.

Figure 85:
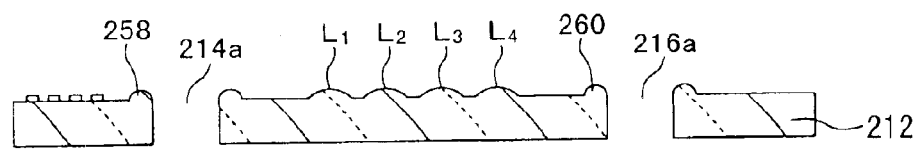

In a process shown in FIG. 85, the lower surface of the substrate 212 is polished to the effective depth of the half-through holes 214A and 216A to change the half-through holes 214A and 216A to through holes 214a and 216a. Since the through holes 214a and 216a are formed continuously with the inner holes of the positioning projections 258 and 260, they have the shape gradually increasing the opening size at the upper level on the upper surface side of the substrate 212. With the process shown in FIG. 85, the substrate 212 can be obtained which has the lenses $L_1$ to $L_4$ and positioning projections 258 to 260 on the upper surface and the through holes 214a and 216a passing through the substrate 212 from the upper surface to the lower surface.

Figure 86:
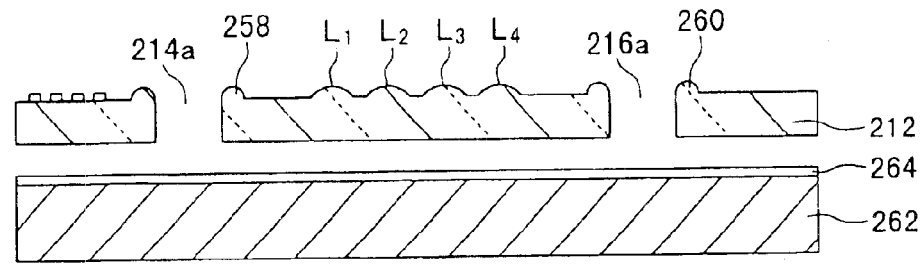
Figure 94:
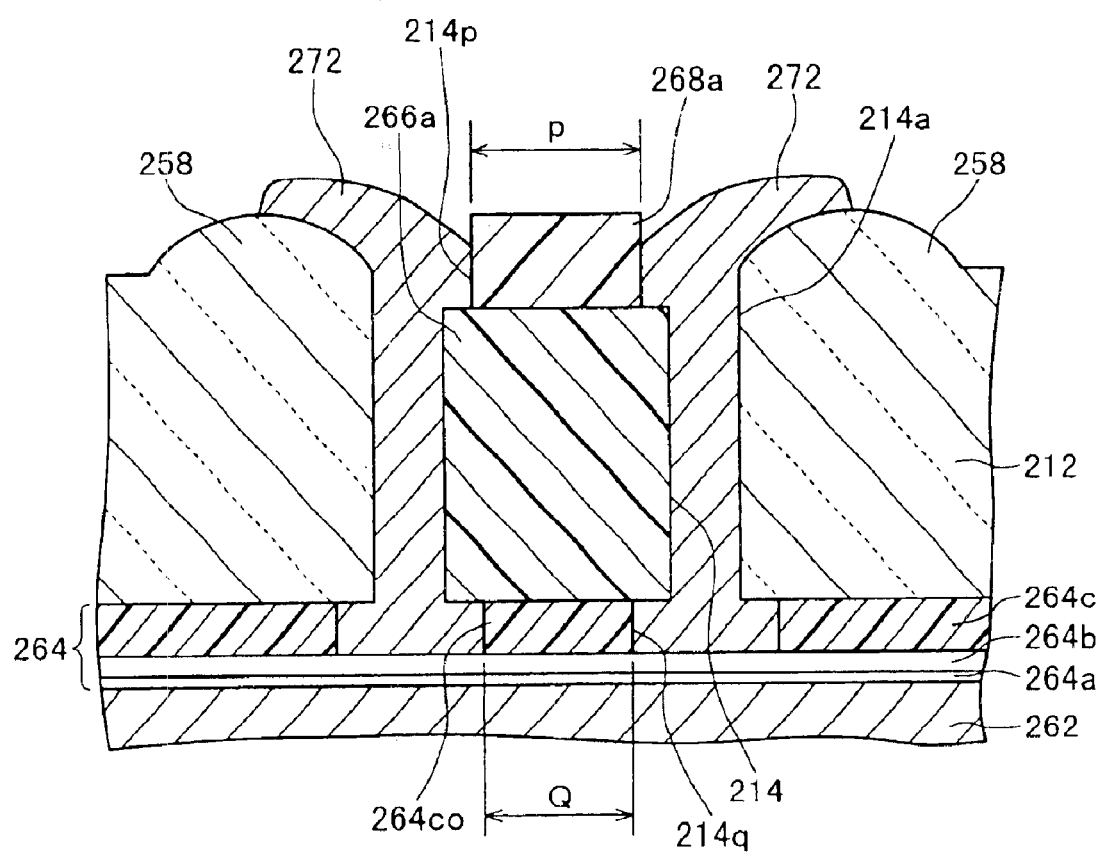
FIG. 94 is an enlarged cross sectional view showing a plated region.

In a process shown in FIG. 86, a fixing plate 262 made of, for example, quartz, is prepared. On the upper surface of the fixing plate 262, a resist/Cu/Cr lamination layer 264 is formed which is constituted of a Cr layer 264a, a Cu layer 264b and a resist layer 264c stacked in this order from the bottom as shown in FIG. 94. The Cr layer 264a and Cu layer 264b are formed by sputtering in a manner similar to that described with reference to FIG. 77 to thicknesses of 30 nm and 300 nm, respectively. The resist layer 264c is formed to a thickness of 2 μm by coating. By using the resist layer 264c as an adhesive layer, the lower surface of the substrate 212 shown in FIG. 85 is adhered to the upper surface of the fixing plate 262. This fixed state is illustrated in FIG. 87.

Figure 87:
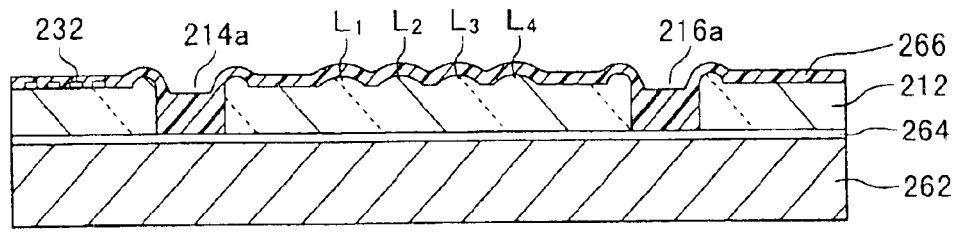

In a process shown in FIG. 87, a resist layer 266 is coated on the upper surface of the substrate 212, covering the position alignment mark 232, lenses $L_1$ to $L_4$ and through holes 214a and 216a.

Figure 88:
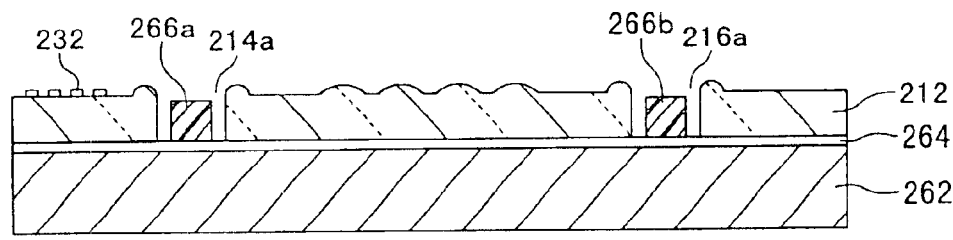

In a process shown in FIG. 88, the resist layer 266 is exposed and developed to pattern it and form resist patterns 266a and 266b in the through holes 214a and 216a. The resist patterns 266a and 266b are used for forming guide pin insertion holes 214 and 216 shown in FIG. 92, and have the size (diameter) smaller than that of the through holes 214a and 216a. In the developing process, as shown in FIG. 94, the resist layer 264c is etched in a ring shape around the resist pattern 266a. A similar etched ring shape is also formed around the resist pattern 266b.

Figure 89:
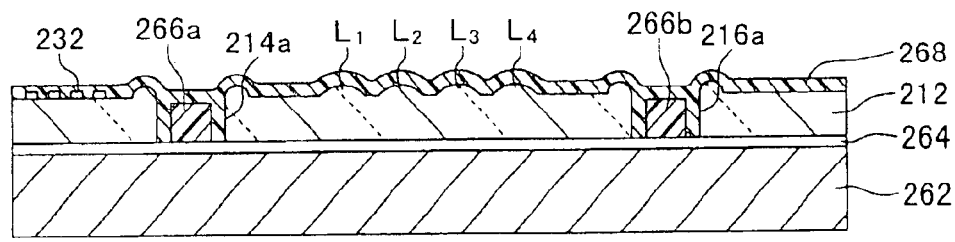

In a process shown in FIG. 89, a resist layer 268 is formed on the upper surface of the substrate 212, the resist layer 268 covering the position alignment mark 232, lenses $L_1$ to $L_4$, through holes 214a and 216a and resist patterns 266a and 266b.

Figure 90:
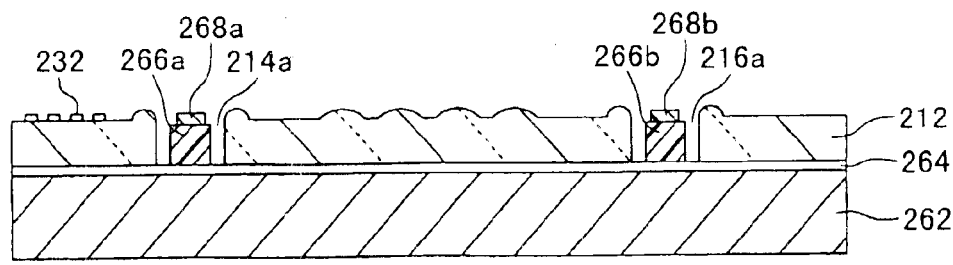

In a process shown in FIG. 90, the resist layer 268 is exposed and developed to pattern it and form resist patterns 268a and 268b in the through holes 214a and 216b (on the resist patterns 266a and 266b). The resist pattern 268a is used for forming one opening 214p of the guide pin insertion hole 214 shown in FIG. 94 and has the size (diameter) slightly smaller than that of the resist pattern 266a so as to allow the opening size (diameter) of the opening 214p to gradually increase at the upper level. This is also true for the case of the resist pattern 268b. Similar to forming the resist layer 266a shown in FIG. 94, in the development process, the resist layer 264c is etched in a ring shape around the resist pattern 266a. The resist layer 264c etched in a ring shape is also formed around the resist pattern 266b.

With the developing processes shown in FIGS. 88 and 90, an isolated portion 264co of the resist layer 264c exists under the resist pattern 266a. Since the outer circumference of the resist layer 264c under the resist pattern 266a is side-etched, the resist pattern 264co has the size (diameter) Q slightly smaller than that of the resist pattern 266a. Since the inner circumference of the resist layer 264c is side-etched under the resist pattern 266a, the size (diameter) of the inner hole of the resist layer 264c is larger than that of the through holes 214a. The size Q of the resist pattern 264co is, for example, 0.7 mm. The size (diameter) P of the resist pattern 268a is slightly larger than the size Q of the resist pattern 264co (P>Q). Depending upon the temperature condition when the resist layer 64c is adhered, it is possible to side-etch neither the outer circumference of the resist pattern 264co nor the inner circumference of the resist layer 264c. In this case, as shown in FIG. 90, the lower shape of the through holes 214a ad 216b is upright. The etching state of the resist pattern 266b at the lower level is similar to that of the resist pattern 266a described above.

Figure 91:
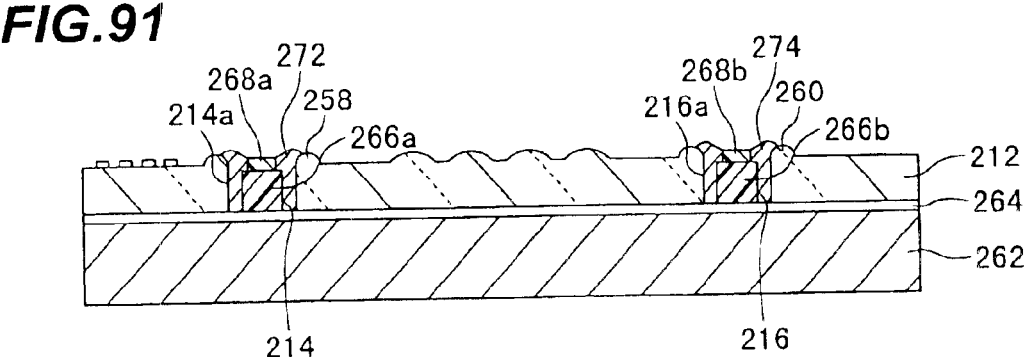

In a process shown in FIG. 91, by using the substrate 212 and resist patterns 266a, 266b, 268a and 268b as a mask, selective plating of Ni—Fe alloy for example is performed to form metal layers 272 and 274 made of Ni—Fe alloy in the through holes 214a and 216a. The plating state of the through hole 214a is shown in FIG. 94. The metal layer 272 is formed covering the inner wall of the through hole 214a and has a guide pin insertion hole 14 having a size (diameter) corresponding to the outer diameter of the resist pattern 266a.

On the surface of the substrate 212, the metal layer 272 is formed covering the inner circumferential area (area where the opening size increases gradually) of the positioning protrusion 258 and has an opening 214p having a size (diameter) corresponding to the outer diameter of the resist pattern 268a. While the metal layer 272 is formed covering the inner circumferential area of the positioning protrusion 258, since the resist pattern 266a exists around the resist pattern 268a, the plating growth becomes slow so that the metal layer 272 gradually increases the opening size (diameter) at the upper level.

On the other surface of the substrate 212, the metal layer 272 is formed covering the opening peripheral area of the through hole 214a (forming a flange) and having an opening 214q corresponding to the outer diameter of the resist pattern 264co. The opening 214q forms the other opening of the guide pin insertion hole 214. The plating state of the region near the resist patterns 266b and 268b is similar to that described with reference to the resist patterns 266a and 268a.

Figure 92:
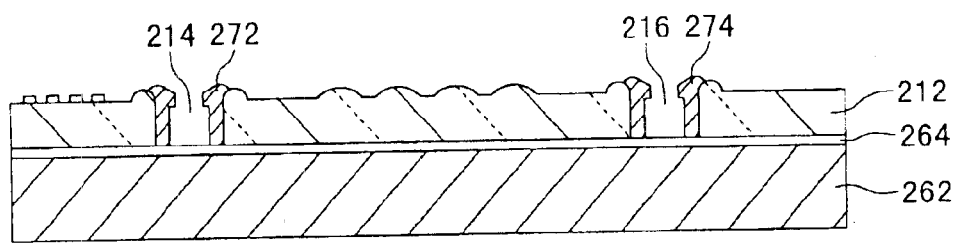

In a process shown in FIG. 92, the resist patterns 268a, 268b, 266a and 266b are removed by chemicals or other means to provide the metal layers 272 and 274 with the guide pin insertion holes 214 and 216. At this time, the resist layer 64co shown in FIG. 94 is also removed.

Figure 93:
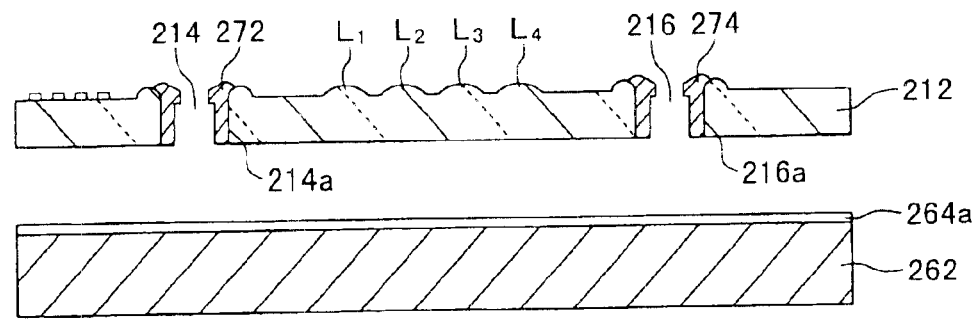

In a process shown in FIG. 93, the Cu layer 246b shown in FIG. 94 is etched and removed to separate the substrate 212 from the fixing plate 262. The resist layer 264c shown in FIG. 94 is removed by chemicals or other means. As shown in FIG. 93, a micro lens array can therefore be manufactured which has on one principal surface of the substrate 212 the lenses $L_1$ to $L_4$, positioning protrusions 258 and 260 and the guide pin insertion holes 214 and 216 formed in the through holes 214a and 216a of the substrate 212 and defined by the metal layers 272 and 274.

The micro lens array obtained at the process shown in FIG. 93 can be coupled to another optical device by inserting the guide pins into the guide pin insertion holes 214 and 216 similar to the micro lens array 210 shown in FIGS. 63 and 64. Since the thin film forming process is used, the size and position of the guide pin insertion hole 214 having the openings 214p and 214q can be formed at high precision.

When the guide pin is inserted in and pulled out of the guide pin insertion hole such as the pin 214, the guide pin contacts the metal layer such as the layer 272. It is therefore possible to prevent cleavage and crack at the opening end of the through hole such as the hole 214a of the quartz substrate 212. The metal layer such as the layer 226 is terminated at the flange stacked on the positioning projection 258 on the one surface side of the substrate 212 and at the flange stacked on the opening end peripheral area of the through hole 214a on the other surface side of the substrate 212. It is possible to prevent the metal layer such as the layer 272 from being removed while the guide pin is inserted into or pulled out of the guide pin insertion hole. Since the opening 214p gradually increases its size at the upper level and has an opening size slightly larger than that of the opening 214p, it is easy to insert the guide pin into the guide pin insertion hole such as the hole 214.

Figure 95:
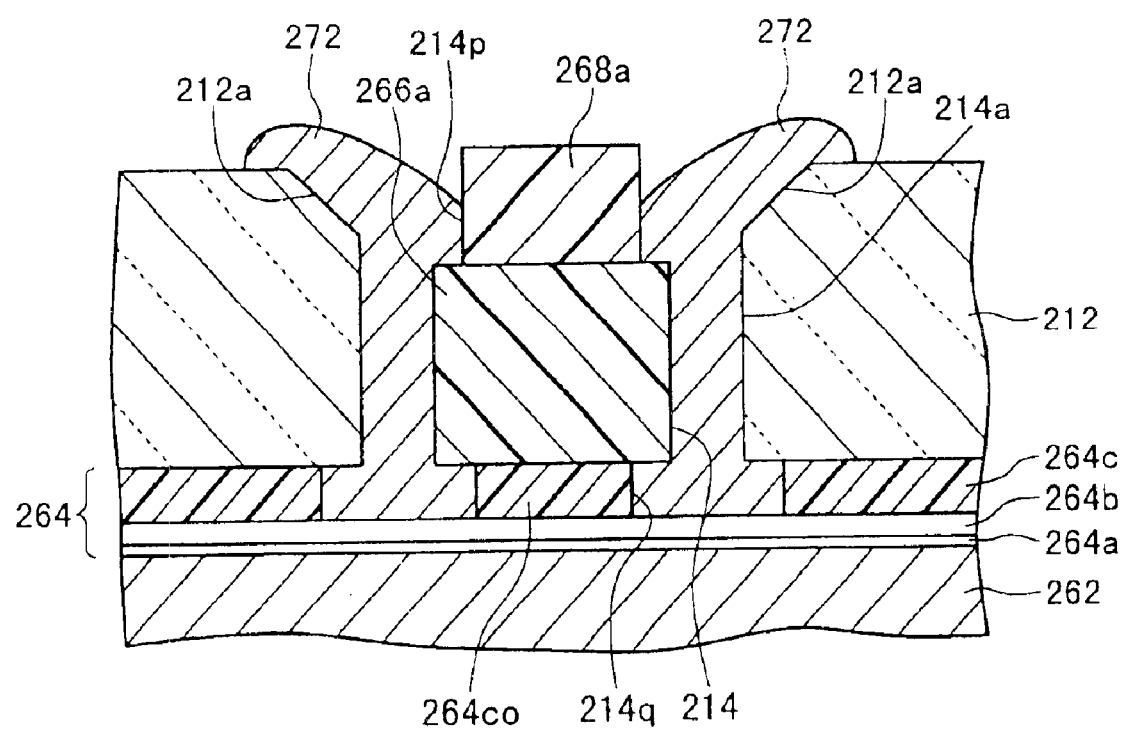
FIG. 95 is an enlarged cross sectional view showing a modification of a plated region.

FIG. 95 shows an example of a modification of the plated region of a micro lens array. Like elements to those shown in FIG. 94 are represented by using identical reference numerals and characters, and the detailed description thereof is omitted.

The different point of the plated region shown in FIG. 95 from that shown in FIG. 94 resides in that instead of forming the positioning projection 258 on the one surface of the substrate 212, an opening 212a of the through hole 214a is formed gradually increasing the opening size at the upper level.

The opening 212a is formed in the following manner. After the etching process shown in FIG. 83, in the process shown in FIG. 84 a hole position is determined by photolithography using a resist layer and the position alignment mark 232 as a reference. A half-through hole is formed at the determined hole position by using a precision drill DR. After a resist layer is formed exposing the corner of the opening end of the half-through hole, the corner of the opening end of the half-through hole is removed by etching using the resist layer as a mask to obtain the opening 212a. The following processes are similar to those described with reference to FIGS. 85 to 93. In the process shown in FIG. 85, instead of forming the half-through hole with the precision drill, the half-through hole may be formed by selective dry etching using a resist layer as a mask. The resist layer mask is formed by photolithography by using the position alignment mark 232 as a reference.

As the metal layer 272 is formed covering the opening 212a of the plated region shown in FIG. 95, the metal layer 272 gradually increases the opening size (diameter) at the upper level since the resist pattern 266a exists near the resist pattern 268a and the plating growth becomes slow. The guide pin insertion hole 214 in the plated region shown in FIG. 95 provides the operation and effects similar to those described with reference to the guide pin insertion hole 214 in the plated region shown in FIG. 94.

Figure 96:
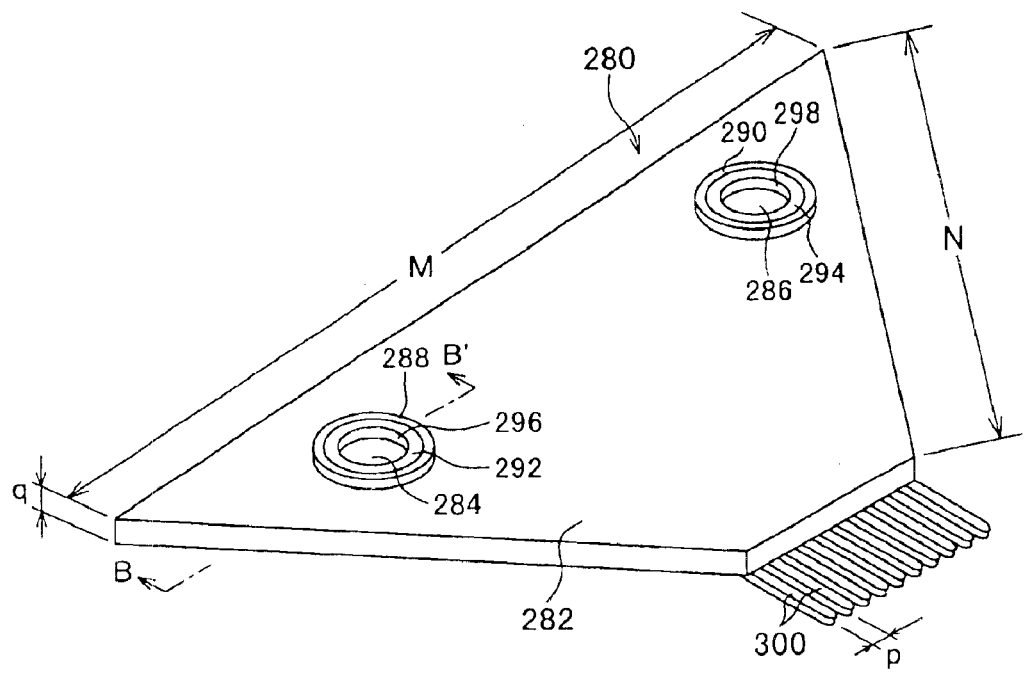
FIG. 96 is a perspective view of a contact probe according to another embodiment of the invention.
Figure 97:
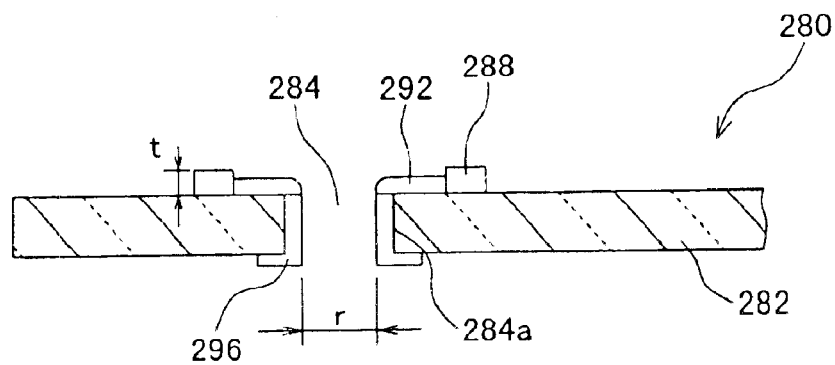
FIG. 97 is a cross sectional view taken along line B–B' shown in FIG. 96.

FIG. 96 shows a contact probe according to another embodiment of the invention, and FIG. 97 is a cross sectional view taken along line B–B' shown in FIG. 96. The contact probe is used for inspection and evaluation of LSI and the like.

A contact probe 280 has a trapezoidal probe substrate 282 made of aluminum for example. The substrate 282 has guide pin insertion holes 284 and 286. On one principal surface of the substrate 282, positioning layers 288 and 290 made of resist for example are formed near the longer side of parallel two sides. As shown in FIG. 97, in the central area of the positioning layer 88 a through hole 284a is formed passing through the substrate 282 from the one principal surface to the other principal surface. A through hole (not shown) similar to the through hole 284a is also formed in the central area of the positioning layer 290.

On the one principal surface of the substrate 282, ring-shape metal plates 292 and 294 are fitted in the inner holes of the positioning layers 288 and 290. As shown in FIG. 97, the inner wall of the through hole 284a is covered with a metal layer 296 and defines a guide pin insertion hole 284. Similar to the inner wall of the through hole 284a, the inner wall of the through hole formed in the central area of the positioning layer 290 is covered with a metal layer 298 which defines a guide pin insertion hole 286. The metal layers 296 and 298 are continuous with the metal plates 292 and 294 on the side of the one principal surface of the substrate 282. The metal layer 296 covers the peripheral area of the opening of the through hole 284a on the other principal surface side of the substrate 282 (the metal layer forming a flange), and the metal layer 298 also covers the peripheral area of the opening of the through hole 284a on the other principal surface side of the substrate 282 (the metal layer forming a flange).

On the other surface of the substrate 282, ten contact pins 300 are formed protruding from the shorter side of two parallel sides, and a wiring layer integral with the contact pins is formed. For example, each contact pin and each wiring line are made of Ni—Fe alloy.

An example of the dimension of the contact probe 280 is as follows. A length M of the longer side of two parallel sides of the substrate 282 is 20 mm, a length N of a side between the two parallel sides is 15 mm and a thickness q is 1 mm. A thickness t of the positioning layer such as the layer 288 is 80 μm and a pitch p between adjacent contact pins 300 (a distance between centers of adjacent contact pins) is 40 μm.

The size and position of the guide pin insertion holes 284 and 286 of the contact probe 280 can be set precisely by using the processes described with reference to FIGS. 68 to 69. Alternatively, the size and position of the guide pin insertion holes 284 and 286 can be set precisely by using the processes described with reference to FIGS. 84 to 95.

The contact probe 280 can be mounted on a probe arm by inserting guide pins into the guide pin insertion holes and into guide pin insertion holes of the probe arm. The guide pin insertion holes 284 and 286 can obtain the operation and effects similar to those described with reference to the guide pin insertion holes 214 and 216. It is particularly effective that cleavage and crack in the peripheral area of the opening end of the guide pin insertion holes 284 and 286 can be prevented which are otherwise caused when the guide pins are inserted or pulled out for the replacement of the contact probe 280.

Figure 98:
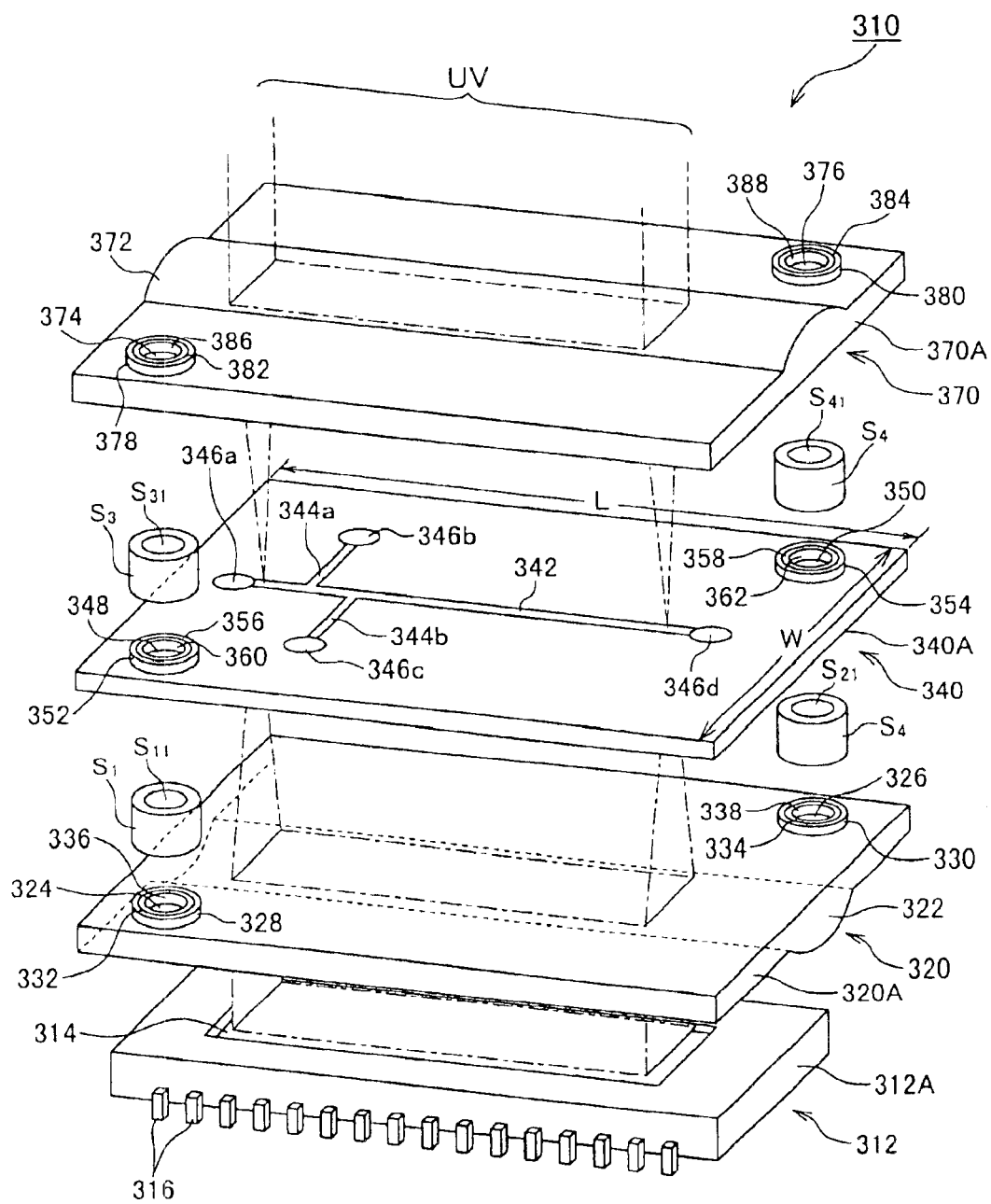
FIG. 98 is a broken cross sectional view of a cataphoresis analyzer according to another embodiment of the invention.
Figure 99:
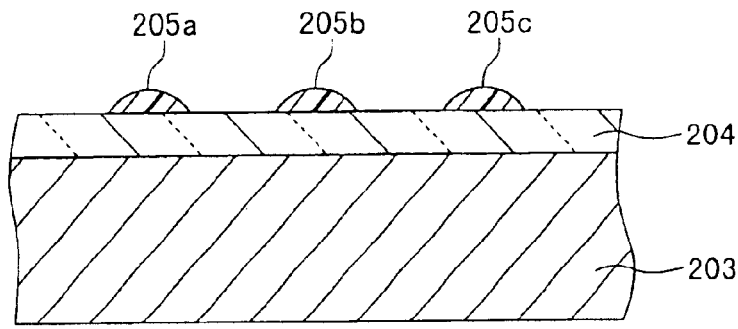
FIGS. 99 to 101 are cross sectional views illustrating a conventional micro lens array manufacture method including a resist layer forming process (FIG. 99), a lens forming process and a resist layer forming process (FIG. 100) and a selective etching process (FIG. 101).
Figure 100:
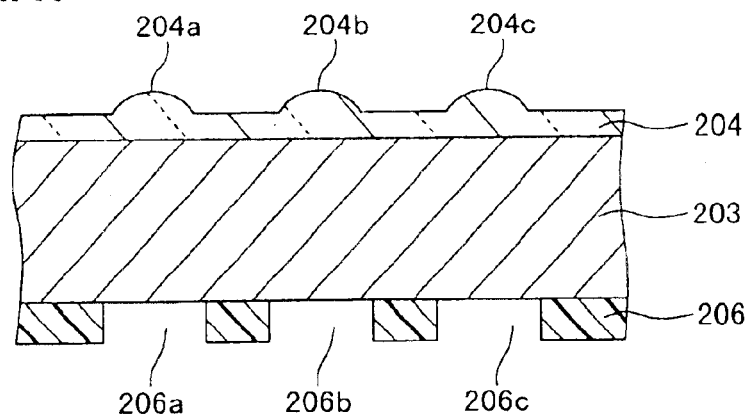
Figure 101:
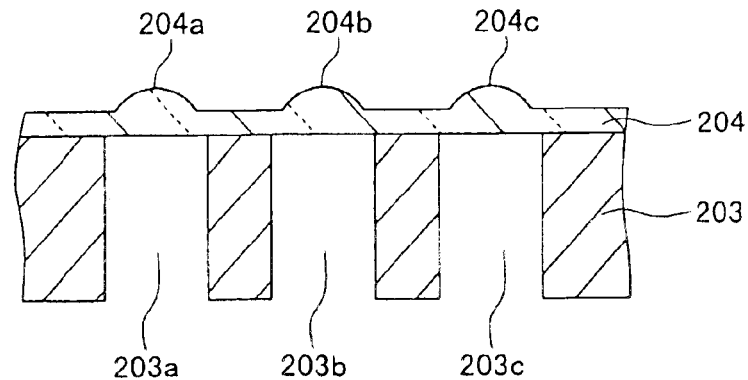
Figure 102:
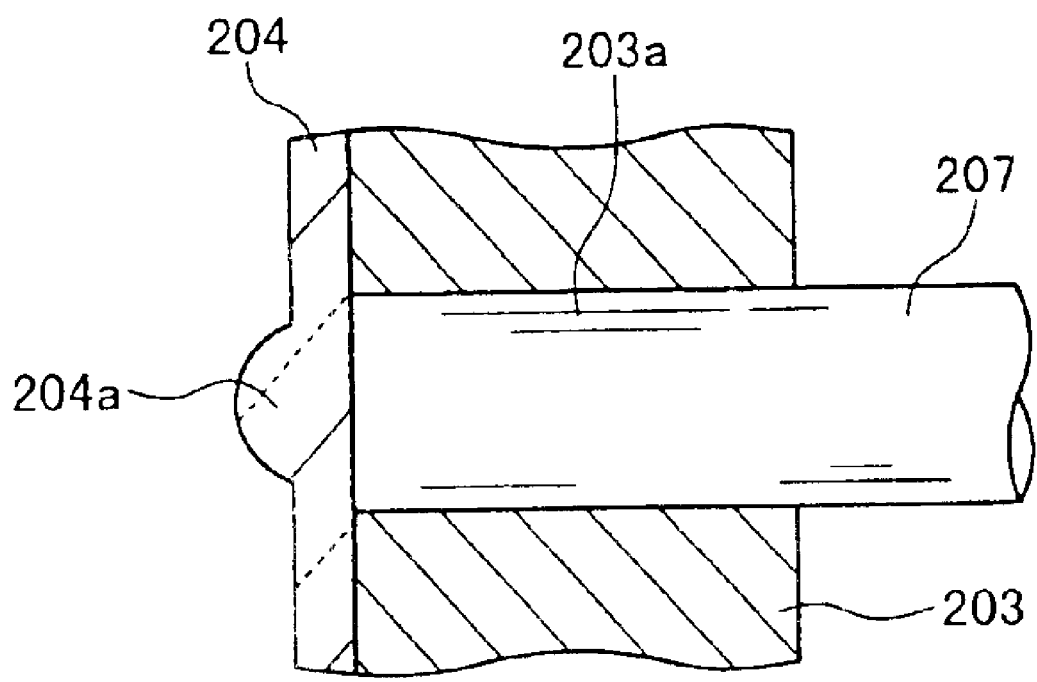
FIG. 102 is a cross sectional view showing the state that an optical fiber is mounted on the optical fiber array shown in FIG. 101.

FIG. 98 is a broken perspective view of a cataphoresis analyzer according to another embodiment of the invention. The cataphoresis analyzer is used for analyzing a very small amount of protein, nucleic acid or the like at high speed and at high resolution.

The cataphoresis analyzer 310 has a photodetector 312, a cylindrical lens 320, a cataphoresis microchip 340 and a cylindrical lens 370. The photodetector 312 has a photocell array 314 housed in a package 312A and a number of terminals 316 are connected to the photocell array 314 at the side of the package 312A.

The cylindrical lens 320 has a lens 312 formed on a rectangular lens substrate (transparent substrate) 320A. Guide pin insertion holes 324 and 326 are formed through the substrate 320A near at two corners on a diagonal line. The cross sectional structure of the guide pin insertion holes 324 and 326 is similar to that of the guide pin insertion holes 314 and 316 shown in FIG. 64. Reference numerals 328 and 330 represent positioning layers made of resist for example. Reference numerals 332 and 334 represent metal plates fitted in inner holes of the positioning layers 328 and 330. Reference numerals 336 and 338 represent metal layers covering the inner walls of the two through holes of the substrate 320A. Similar to the metal layer 226 shown in FIG. 64, the metal layers 336 and 338 are continuous with the metal plates 332 and 334 on one principal surface of the substrate 320A, and cover the opening peripheral areas of the two through holes on the other principal surface of the substrate 320A.

The microchip 340 has a chip substrate (transparent substrate) 340A constituted of two transparent plates stacked one upon another. The surface of the first transparent plate is formed with a long capillary groove 342 and short capillary grooves 344a and 344b continuous with the long capillary groove 142. The second transparent substrate has reservoir holes 346a, 346b, 346c and 346d corresponding to one end of the capillary groove 342, one end of the capillary groove 344a, one end of the capillary groove 344b and the other end of the capillary groove 342. The second transparent plate is stacked on the surface of the first transparent plate and fixed to the first transparent plate by maintaining the correspondence between such grooves and holes.

The rectangular chip substrate 340A has guide pin insertion holes 348 and 350 at positions corresponding to the guide pin insertion holes 324 and 326 of the lens substrate 320A. The cross sectional structure of the guide pin insertion holes 348 and 350 is similar to that of the guide pin insertion holes 214 and 216 shown in FIG. 64. Reference numerals 352 and 354 represent positioning layers made of resist for example. Reference numerals 356 and 358 represent metal plates fitted in inner holes of the positioning layers 352 and 354. Reference numerals 360 and 362 represent metal layers covering the inner walls of the two through holes of the substrate 340A. Similar to the metal layer 226 shown in FIG. 64, the metal layers 360 and 362 are continuous with the metal plates 356 and 358 on one principal surface of the substrate 340A, and cover the opening peripheral areas of the two through holes on the other principal surface of the substrate 340A.

The cylindrical lens 370 has a lens 372 formed on a rectangular lens substrate (transparent substrate) 370A. Guide pin insertion holes 374 and 376 are formed at positions corresponding to the guide pin insertion holes 348 and 350 of the chip substrate 340A. The cross sectional structure of the guide insertion holes 374 and 376 is similar to that of the guide insertion holes 214 and 216 shown in FIG. 64. Reference numerals 378 and 380 represent positioning layers made of resist for example. Reference numerals 382 and 384 represent metal plates fitted in inner holes of the positioning layers 378 and 380. Reference numerals 386 and 388 represent metal layers covering the inner walls of the two through holes of the substrate 370A. Similar to the metal layer 126 shown in FIG. 64, the metal layers 386 and 388 are continuous with the metal plates 382 and 384 on one principal surface of the substrate 370A, and cover the opening peripheral areas of the two through holes on the other principal surface of the substrate 370A.

An example of the dimension of the microchip 340 is as follows. A length L of the substrate 340 is 60 mm, a width W is 30 mm, a diameter and a depth of the reservoir hole such as the hole 346 are both 1 mm, a width and a depth of the capillary groove such as the groove is 50 μm and 10 μm, respectively, and the inner diameter of the guide pin insertion hole such as the hole 348 is 1 mm. An inner diameter of the guide pin insertion hole such as the hole 348 of the substrate 320A and an inner diameter of the guide pin insertion hole such as the hole 374 of the substrate 370A are both 1 mm.

The size and position of the guide pin insertion holes 324, 326, 348, 350, 374 and 376 of the cylindrical lenses 320 and 370 and microchip 340 can be formed precisely by the processes shown in FIGS. 70 to 79. Alternatively, the size and position of the guide pin insertion holes 324, 326, 348, 350, 374 and 376 can be formed precisely by the processes shown in FIGS. 84 to 95.

In assembling the cataphoresis analyzer 310, a first guide pin (not shown) is inserted into the guide pin insertion hole 324, a hole $S_{11}$ of a spacer $S_1$, the guide pin insertion hole 348, a hole $S_{31}$ of a spacer $S_3$ and the guide pin insertion hole 374, whereas a second guide pin (not shown) is inserted into the guide pin insertion hole 326, a hole $S_{21}$ of a spacer $S_2$, the guide pin insertion hole 350, a hole $S_{41}$ of a spacer $S_4$ and the guide pin insertion hole 376. In this insertion state, the cylindrical lens 320 and microchip 340 are placed near each other with the spacers $S_1$ and $S_2$ being interposed therebetween, whereas the microchip 340 and cylindrical lens 370 are placed near each other with the spacers $S_3$ and $S_4$ being interposed therebetween. In this position alignment and nearby state, the cylindrical lens 320, microchip 340 and cylindrical lens 370 are fixed together by a fixing means (not shown). Thereafter, an assembly of the fixed cylindrical lens 320, microchip 340 and cylindrical lens 370 is coupled to the photodetector 312 on the lens 320 side.

If the width of the capillary groove such as the groove 342 is about 50 μm, it is desired that the position alignment precision of each cylindrical lens such as the lens 320 relative to the microchip 340 is several μm or smaller. By inserting the guide pins into the guide pin insertion holes 324, 348 and 374 and the guide pin insertion holes 326, 350 and 376 as described above to set position alignment, the position alignment of each lens such as the lens 320 relative to the chip 340 can be performed at a precision of several μm or smaller.

In using the cataphoresis analyzer 310, cataphoresis liquid is flowed into the capillary grooves 342, 344a and 344b from any one of the reservoir holes 346a to 346d. After a sample is supplied from any one of the reservoir holes 346b and 346c, electrodes are inserted into the reservoir holes 346b and 346c to apply a high voltage for a predetermined time and disperse the sample in the capillary grooves 344a and 344b. Thereafter, electrodes are inserted into the reservoir holes 346a and 346b to apply a cataphoresis voltage and make the sample undergo cataphoresis in the capillary groove 342.

In this state, parallel ultraviolet rays UV are made incident upon the capillary groove 342 via the cylindrical lens 370 and light transmitted through the groove 342 is made incident upon the photocell array 314 via the cylindrical lens 320. The photocell array 314 detects absorption of ultraviolet rays to detect target components. After such analysis, the assembly of the cylindrical lenses 320 and 370 and microchip 340 is disconnected from the photodetector and the fixing means is dismounted. Then, the guide pins are pulled out of the guide pin insertion holes 324, 348 and 374 and the guide pin insertion holes 326, 350 and 376 to disassemble the assembly into constituent parts such as the lenses 320 and 370 and chip 340 and wash them. The guide pin insertion holes 324, 326, 348, 350, 374 and 376 can have the operation and effects similar to those of the guide pins 214 and 216 described earlier. It is particularly effective that cleavage and crack at the opening end portion of each guide pin insertion hole can be prevented which are otherwise caused when the guide pin is inserted or pulled out.

The present invention has been described in connection with the preferred embodiments. The invention is not limited only to the above embodiments. It will be apparent to those skilled in the art that other various modifications, improvements, combinations, and the like can be made.

What is claimed is:

1. A micro lens array comprising:
   a transparent substrate having a plurality of lenses formed on one principal surface of said substrate; and
   a positioning plate coupled to said substrate and having a plurality of guide pin insertion through holes formed through said positioning plate at locations outside said transparent substrate.

2. A micro lens array according to claim 1, wherein said substrate and said positioning plate have a mutual fitting structure allowing said substrate and said positioning plate to be fitted in together and to be mounted or dismounted.

3. A micro lens array according to claim 2, wherein said fitting structure has a pin and a pin holding hole for holding said pin.

4. A micro lens array according to claim 3, wherein said pin holding hole has a taper on a pin guiding opening side.

5. A micro lens array according to claim 1, wherein said plurality of guide pin insertion through holes all gradually increase a size toward the one principal surface of said substrate.

6. A micro lens array according to claim 1, further comprising:
   an optical fiber array having positioning guide pin guiding through holes; and
   guide pins to be inserted into said guide pin insertion through holes and said guide pin guiding through holes.

7. A micro lens array according to claim 1, wherein:

said plurality of lenses are disposed in line in such a manner that a line interconnecting centers of said plurality of lenses is a straight line on the one principal surface;

another principal surface of said substrate is formed with a slanted plane for directing light incident upon said plurality of lenses and reflected therefrom in a direction different from an array direction of said plurality of lenses; and said plurality of guide pin insertion through holes are formed on both sides of the lens array including said plurality of lenses, centers of said plurality of guide pin insertion through holes being set to positions displaced from said straight line by an amount corresponding to a displacement of an optical axis from each lens center caused by said slanted plane.

8. A micro lens array comprising:

a transparent substrate having a plurality of lenses formed on one principal surface of said substrate; and a coupling plate made of metal and having a stacking region to be stacked on the one principal surface and a non-stacking region extending continuously with said stacking region and not to be stacked on the one principal surface, said stacking region having a transparent window corresponding to said plurality of lenses and said non-stacking region having a plurality of guide pin insertion holes.

9. A micro lens array according to claim 8, wherein said coupling plate is fixed to said substrate.

10. A micro lens array according to claim 9, wherein said plurality of guide pin insertion holes are all gradually increase a size toward a principal surface of said coupling plate on a side opposite to said substrate.

11. A micro lens array according to claim 9, wherein said plurality of lenses are disposed in line in such a manner that a line interconnecting centers of said plurality of lenses is a straight line on the one principal surface;

another principal surface of said substrate is formed with a slanted plane for directing light incident upon said plurality of lenses and reflected therefrom in a directions different from an array direction of said plurality of lenses; and said plurality of guide pin insertion holes are formed on both sides of the lens array including said plurality of lenses, centers of said plurality of guide pin insertion holes being set to positions displaced from said straight line by an amount corresponding to a displacement of an optical axis from each lens center caused by said slanted plane.

12. A micro lens array according to claim 9, wherein further comprising:

an optical fiber array having positioning guide pin guiding holes; and guide pins to be inserted into said guide pin insertion holes and said guide pin guiding holes.

13. A micro lens array comprising:

a transparent substrate having a plurality of lenses and a plurality of fitting pins made of metal, respectively formed on one principal surface of said substrate; and a coupling plate made of metal and having a stacking region to be stacked on the one principal surface and a non-stacking region extending continuously with said stacking region and not to be stacked on the one principal surface, said stacking region having a transparent window corresponding to said plurality of lenses and a plurality of fitting holes corresponding to said plurality of fitting pins, said non-stacking region having a plurality of guide pin insertion holes, and said coupling plate being mounted on said substrate by fitting said plurality of fitting pins in said plurality of fitting holes in a state that said stacking region is stacked upon the one principal surface.

14. A micro lens array according to claim 13, wherein said plurality of fitting holes are all formed gradually increasing a size toward a principal surface of said coupling plate on a side of said substrate.

15. A micro lens array according to claim 13, wherein said plurality of guide pin insertion holes are all formed gradually increasing a size toward a principal surface of said coupling plate on a side of said substrate.

16. A device with guide pin insertion holes, comprising:

a substrate made of nonmetal and formed with through holes for forming the guide pin insertion holes; and a metal layer covering an inner wall of each of said through holes to form a guide pin insertion hole having a size smaller than a size of said through hole.

17. A device with guide pin insertion holes according to claim 16, wherein:

a metal plate having a pin insertion hole having a size smaller than a size of said through hole is disposed on one of two principal surfaces of said substrate, said metal plate covering a peripheral area of one opening end of said through hole and said pin insertion hole is aligned in position with said through hole; and said metal layer is formed continuously with said metal plate and covers a peripheral area of another opening end of sid through hole on the other principal surface of said substrate.

18. A device with guide pin insertion holes according to claim 16, wherein said metal layer is formed covering peripheral areas of an opening of said through hole on both two principal surfaces of said substrate.

19. A method of manufacturing a micro lens array comprising steps of:

(a) preparing a transparent substrate formed with a plurality of lenses on one principal surface of said substrate;

(b) forming a plating seed film on the one principal surface of said substrate, said plating seed film surrounding said plurality of lens;

(c) forming a coupling plate made of metal on said plating seed film by selective plating, said coupling plate having a transparent window corresponding to said plurality lenses and a plurality of guide pin insertion holes; and (d) removing said substrate stacked on said plurality of guide pin insertion holes so as to make open said plurality of guide pin insertion holes on a side of said substrate.

20. A method of manufacturing a micro lens array according to claim 19, wherein said step (c) plates metal on said plating seed film in an opening of a plating area defining mask including a plating area defining pillar, said plating area defining pillar being spaced apart from said plating seed film and having a diameter same as a diameter of a guide pin.

21. A method of manufacturing a micro lens array according to claim 20, wherein said step (b) does not form said plating seed film under and around said plating area defining pillar.

22. A method of manufacturing a micro lens array according to claim 20, wherein after said plating seed film is formed, said step (b) forms a thin resist pattern under and around said plating area defining pillar.

23. A method of manufacturing a micro lens array comprising steps of:
preparing a transparent substrate formed with a plurality of lenses on one principal surface of said substrate;
forming a plurality of recesses in the one principal surface of said substrate by selective etching; and
polishing another principal surface of said substrate bottoms of said plurality of recesses to change said plurality of recesses to a plurality of guide pin insertion holes.

24. A method of manufacturing a micro lens array according to claim 23, further comprising a step of, after said plurality of recesses are formed, making an opening of each of said plurality of recesses gradually increase a size at an upper level by selective etching before the other principal surface of said substrate is polished.

25. A method of manufacturing a micro lens array comprising steps of:
(a) preparing a transparent substrate and a coupling plate, said transparent substrate having a plurality of lenses and a plurality of fitting pins made of plated metal, respectively formed on one principal surface of said substrate, and said coupling plate made of plated metal and having a stacking region to be stacked on the one principal surface and a non-stacking region extending continuously with said stacking region and not to be stacked on the one principal surface, said stacking region having a transparent window corresponding to said plurality of lenses and a plurality of fitting holes corresponding to said plurality of fitting pins, said non-stacking region having a plurality of guide pin insertion holes; and
(b) mounting said coupling plate on said substrate by fitting said plurality of fitting pins in said plurality of fitting holes in a state that said stacking region is stacked upon the one principal surface.

26. A method of manufacturing a micro lens array according to claim 25, wherein said step (a) forms a plating seed film and a plating area defining mask on a dummy substrate, and plates metal on said plating seed film.

27. A method of manufacturing a micro lens array according to claim 26, wherein said step (a) plates metal on said plating seed film in an opening of a plating area defining mask including a plating area defining pillar, said plating area defining pillar being spaced apart from said plating seed film and having a diameter same as a diameter of a guide pin.

28. A method of manufacturing a micro lens array according to claim 27, wherein said step (a) does not form said plating seed film under and around said plating area defining pillar.

29. A method of manufacturing a micro lens array according to claim 27, wherein after said plating seed film is formed, said step (b) forms a thin resist pattern under and around said plating area defining pillar.

30. A method of manufacturing a device with guide pin insertion holes, comprising:
preparing a substrate made of nonmetal and formed with through holes for forming the guide pin insertion holes;
disposing a metal plate having a pin insertion hole having a size smaller than a size of said through hole is disposed on one of two principal surfaces of said substrate, said metal plate covering a peripheral area of one opening end of said through hole and said pin insertion hole is aligned in position with said through hole, and disposing hole forming pins made of nonmetal, and disposing hole forming pins in such a manner that while said hole forming pins are inserted into said pin insertion holes of said metal plate, said hole forming pins are extended toward the other of the two principal surfaces of said substrate via said through holes;
performing a metal plating process by using said metal plate as a plating seed layer to form a metal layer made of plated metal and covering an inner wall of each of said through holes, in a state that said metal plated is disposed in a manner described above and said hole forming pins are disposed in a manner described above; and
dismounting said hole forming pins from said pin insertion holes of said metal plate and said metal layer to provide said metal layer with the guide pin insertion holes having a size corresponding to a size of said hole forming pins.

31. A method of manufacturing a device with guide pin insertion holes according to claim 30, wherein said pin insertion holes of said metal plate to be used in said step of disposing said metal plate gradually increase a size toward a surface of said metal plate opposite to a side of said through holes.

32. A method of manufacturing a device with guide pin insertion holes, comprising:
forming a plating seed layer on one principal surface of a fixing plate;
adhering a substrate made of nonmetal and formed with through holes for forming guide pin insertion holes to said plating seed layer via an adhesive layer and fixing said substrate to said fixing plate;
forming a resist layer smaller than a size of each of said through holes and thicker than a thickness between two principal surfaces of said substrate in each of said through holes, in a state that said substrate is fixed to said fixing plate, and selectively removing said adhesive layer around said resist layer by using said resist layer as a mask to expose a portion of said plating seed layer in a pattern surrounding said resist layer and leave a portion of said adhesive layer under said resist layer;
by using as a mask said resist layer, the portion of said adhesive layer under said resist layer, said adhesive layer and said substrate, plating metal on said plating seed layer to form a metal layer made of plated metal and covering an inner wall of said through holes;
providing said metal layer with the guide pin insertion holes by removing said resist layer and the portion of said adhesive layer;
removing said plating seed layer to separate said fixing plate from said substrate having said metal layer provided with the guide pin insertion holes.

33. A method of manufacturing a device with guide pin insertion holes according to claim 32, wherein said substrate to be used in said step of fixing said substrate to said fixing plate has each of said through holes gradually increasing a size toward a principal surface of said substrate on a side opposite to a side where said substrate is fixed to said fixing plate.

* * * * *